(12) United States Patent
Marynowski et al.

(10) Patent No.: US 8,732,048 B2
(45) Date of Patent: May 20, 2014

(54) AUTOMATED TRADING SYSTEM IN AN ELECTRONIC TRADING EXCHANGE

(75) Inventors: John M. Marynowski, Buffalo, NY (US); Catalin D. Voinescu, London (GB); Stefan Puscasu, Bucharest (RO); Thomas M. O'Donnell, Woodstock, IL (US)

(73) Assignee: Edge Capture, LLC, Woodstock, IL (US)

( * ) Notice: Subject to any disclaimer, the term of this patent is extended or adjusted under 35 U.S.C. 154(b) by 0 days.

(21) Appl. No.: 13/096,182

(22) Filed: Apr. 28, 2011

(65) Prior Publication Data

US 2012/0030087 A1    Feb. 2, 2012

Related U.S. Application Data

(60) Division of application No. 11/705,157, filed on Feb. 12, 2007, which is a continuation of application No. 09/618,222, filed on Jul. 18, 2000, now Pat. No. 7,177,833.

(51) Int. Cl.
*G06Q 40/00* (2012.01)

(52) U.S. Cl.
USPC ............... 705/35; 705/36 R; 705/37; 705/38

(58) Field of Classification Search
USPC .................................. 705/35, 36 R, 37, 38
See application file for complete search history.

(56) References Cited

U.S. PATENT DOCUMENTS

| 2,046,381 A | 7/1936 | Hicks |
| 3,082,402 A | 3/1963 | Scantlin |

(Continued)

FOREIGN PATENT DOCUMENTS

| EP | 0573991 | 12/1993 |
| GB | 2277177 A | 10/1994 |

(Continued)

OTHER PUBLICATIONS

"Self-Regulatory Organizations; New York Stock Exchange LLC; Order Approving Proposed Rule Change, as Modified by Amendment No. 1 Thereto, Relating to NYSE Rule 1500"; Federal Register, vol. 73 No. 003, dated Jan. 4, 2008; Securities and Exchange Commission; Release No. 34-57058; File No. SR-NYSE-2007-102; pp. 903-909.

(Continued)

*Primary Examiner* — Daniel Felten
(74) *Attorney, Agent, or Firm* — Edell, Shapiro & Finnan, LLC

(57) ABSTRACT

An electronic exchange system network includes a trader site having an automated trading system capable of submitting orders and/or quotes to an exchange site. The automated trading system determines whether an order or quote should be submitted based on, for example, the current market price of an option and theoretical buy and sell prices. The theoretical buy and sell prices are derived from, among other things, the current market price of the security underlying the option. The theoretical buy and sell prices are calculated when underlying factors that contribute to the theoretical prices change. Computation times of the theoretical prices may be reduced by using precalculated values and/or using interpolation and extrapolation. Other techniques may be used in addition or in the alternative to speed automatic decision-making. In addition, a system of checks may be conducted to ensure accurate and safe automated trading. The automated trading system may be capable of automatically submitting orders in connection with the underlying security in order to hedge part of the delta risk associated with the automated option trades.

53 Claims, 9 Drawing Sheets

(56) References Cited

U.S. PATENT DOCUMENTS

| | | |
|---|---|---|
| 3,296,597 A | 1/1967 | Scantlin |
| 3,573,747 A | 4/1971 | Adams |
| 3,581,072 A | 5/1971 | Nymeyer |
| 4,412,287 A | 10/1983 | Braddock, III |
| 4,674,044 A | 6/1987 | Kalmus |
| 4,823,265 A | 4/1989 | Nelson |
| 4,903,201 A | 2/1990 | Wagner |
| 5,038,284 A | 8/1991 | Kramer |
| 5,063,507 A | 11/1991 | Lindsey |
| 5,077,665 A | 12/1991 | Silverman |
| 5,101,353 A | 3/1992 | Lupien |
| 5,151,103 A | 9/1992 | Tepic |
| 5,161,103 A | 11/1992 | Kosaka |
| 5,258,908 A | 11/1993 | Hartheimer |
| 5,267,148 A | 11/1993 | Kosaka et al. |
| 5,270,922 A | 12/1993 | Higgins |
| 5,297,032 A | 3/1994 | Trojan |
| 5,313,560 A | 5/1994 | Maruoka |
| 5,315,634 A | 5/1994 | Tanaka |
| 5,339,392 A | 8/1994 | Risberg |
| 5,375,055 A | 12/1994 | Togher |
| 5,497,317 A | 3/1996 | Hawkins |
| 5,500,793 A | 3/1996 | Deming, Jr. |
| 5,557,517 A | 9/1996 | Daughterty, III |
| 5,630,126 A | 5/1997 | Redpath |
| 5,655,088 A | 8/1997 | Midorikawa |
| 5,732,397 A | 3/1998 | DeTore |
| 5,774,880 A | 6/1998 | Ginsberg |
| 5,787,402 A | 7/1998 | Potter |
| 5,799,287 A | 8/1998 | Dembo |
| 5,809,483 A | 9/1998 | Broka |
| 5,819,238 A | 10/1998 | Fernholz |
| 5,845,266 A | 12/1998 | Lupien |
| 5,857,176 A | 1/1999 | Ginsberg |
| 5,870,730 A | 2/1999 | Furuya |
| 5,873,071 A | 2/1999 | Ferstenberg |
| 5,884,286 A | 3/1999 | Daughtery, III |
| 5,905,974 A | 5/1999 | Fraser |
| 5,926,801 A | 7/1999 | Matsubara |
| 5,940,810 A | 8/1999 | Traub |
| 5,950,176 A | 9/1999 | Keiser |
| 5,963,923 A | 10/1999 | Garber |
| 6,016,483 A | 1/2000 | Rickard |
| 6,049,783 A | 4/2000 | Segal |
| 6,058,391 A | 5/2000 | Gardner |
| 6,061,662 A | 5/2000 | Makivic |
| 6,064,985 A | 5/2000 | Anderson |
| 6,134,535 A | 10/2000 | Belzberg |
| 6,173,270 B1 | 1/2001 | Cristofich |
| 6,236,980 B1 | 5/2001 | Reese |
| 6,263,321 B1 | 7/2001 | Daughtery, III |
| 6,304,858 B1 | 10/2001 | Mosler |
| 6,317,728 B1 | 11/2001 | Kane |
| 6,347,307 B1 | 2/2002 | Sandhu |
| 6,377,940 B2 | 4/2002 | Tilfors et al. |
| 6,405,180 B2 | 6/2002 | Tilfors et al. |
| 6,415,269 B1 | 7/2002 | Dinwoodie |
| 6,418,417 B1 | 7/2002 | Corby |
| 6,418,419 B1 | 7/2002 | Nieboer et al. |
| 6,519,574 B1 | 2/2003 | Wilton |
| 6,546,375 B1 | 4/2003 | Pang et al. |
| 6,594,643 B1 | 7/2003 | Freeny, Jr. |
| 6,618,707 B1 | 9/2003 | Gary |
| 6,832,210 B1 | 12/2004 | Li |
| 6,839,686 B1 | 1/2005 | Galant |
| 6,990,467 B1 | 1/2006 | Kwan |
| 7,024,387 B1 | 4/2006 | Nieboer et al. |
| 7,103,569 B1 | 9/2006 | Groveman |
| 7,155,410 B1 | 12/2006 | Woodmansey |
| 7,162,448 B2 | 1/2007 | Madoff |
| 7,165,043 B2 | 1/2007 | Keyes |
| 7,236,952 B1 | 6/2007 | D'zmura |
| D551,675 S | 9/2007 | Noviello |
| 7,315,838 B2 | 1/2008 | Gershon |
| 7,356,499 B1 | 4/2008 | Amburn |
| 7,383,220 B1 | 6/2008 | Keith |
| 7,383,222 B2 | 6/2008 | Keith |
| 7,398,244 B1 | 7/2008 | Keith |
| 7,412,416 B2 | 8/2008 | Friesen |
| 7,472,087 B2 | 12/2008 | Keith |
| 7,496,533 B1 | 2/2009 | Keith |
| 7,539,638 B1 | 5/2009 | Keith |
| 7,613,647 B1 | 11/2009 | Cushing |
| 2001/0005835 A1 | 6/2001 | Kodama |
| 2002/0010673 A1 | 1/2002 | Muller |
| 2002/0019779 A1 | 2/2002 | Healey |
| 2002/0019794 A1 | 2/2002 | Katz et al. |
| 2002/0023048 A1 | 2/2002 | Buhannic |
| 2002/0026321 A1 | 2/2002 | Faris |
| 2002/0120555 A1 | 8/2002 | Lerner |

FOREIGN PATENT DOCUMENTS

| | | |
|---|---|---|
| WO | 9010910 A1 | 9/1990 |
| WO | 9506918 | 3/1995 |
| WO | 9710559 | 3/1997 |
| WO | 9737735 A1 | 10/1997 |
| WO | 0051043 | 8/2000 |
| WO | 0062212 | 10/2000 |

OTHER PUBLICATIONS

Brad Adelberg; "STRIP: A Soft Real-Time Main Memory Database for Open Systems"; Sep. 1997, 213 pages.

Brad Adelberg & Hector Garcia-Molina, "Project Synopsis: Evaluating STRIP", date unknown, 5 pages.

Brad Adelberg et al.; "Database Support for Efficiently Maintaining Derived Data"; Feb. 21, 2002, 25 pages.

Aley, "Way of Wall Street: Extreme Investing", Fortune Magazine, Feb. 5, 1996, pp. 114-120.

Fred D. Arditti, "Derivatives: A Comprehensive Resource for Options, Futures, Interest Rate Swaps, and Mortgage Securities", Harvard Business School Press, 1996.

Paul Asquith et al., "Short Sales and Trade Classification Algorithms", Jun. 16, 2008, 32 pages.

Howard Banks, "Great Expectations: Europe's rush to create its own Nasdaq is putting the cart before the horse", Forbes, Dec. 2, 1996, pp. 110-112.

Thomas A. Bass, "The Predictors: How a Band of Maverick Physicists Used Chaos Theory to Trade Their Way to a Fortune on Wall Street", Henry Holt and Company, 1999, 321 pages.

Brandon Becker et al., "Automated Securities Trading", Journal of Financial Services Research, 1992, pp. 327-341.

Daniel Beunza & David Stark, "Tools of the Trade: The Socio-Technology of Arbitrage in a Wall Street Trading Room", New York Conference on Social Studies of Finance, Columbia University and the Social Science Research Council, May 3-4, 2002.

Daniel Beunza & David Stark, "The Organization of Responsiveness: Innovation and Recovery in the Trading Rooms of Lower Manhattan", Socio-Economic Review, vol. 1 Issue 2, 2003, pp. 135-164.

Daniel Beunza & David Stark, "A Sociology of Arbitrage: Market Instruments in a Trading Room", New York Conference on Social Studies of Finance, Columbia University and the Social Science Research Council, May 3-4, 2002 (Draft).

Geir Høidal Bjønnes & Dagfinn Rime, "FX Trading . . . LIVE! Dealer Behavior and Trading Systems in Foreign Exchange Markets" Aug. 2000, 43 pages.

Geir Høidal Bjønnes & Dagfinn Rime, "Dealer Behavior and Trading Systems in Foreign Exchange Markets", Norges Bank, Nov. 27, 2003, 35 pages.

Fischer Black, "Toward a Fully Automated Stock Exchange", Financial Analysis Journal, Nov.-Dec. 1971, pp. 24-28, 86-87.

Fischer Black, "Toward a Fully Automated Stock Exchange", Financial Analysis Journal, Jul.-Aug. 1971, pp. 29-35, 44.

Fischer Black and Myron Scholes, "The Pricing of Options and Corporate Liabilities", Journal of Political Economy, May 9, 1972.

Richard Bookstaber, "The Complete Investment Book: Trading Stocks, Bonds, and Options with Computer Applications", Scott, Foresman and Company, 1985, 413 pages.

(56) References Cited

OTHER PUBLICATIONS

Rachel A. Bourne & Rehan Zaidi, "A Quote-Driven Automated Market", date unknown, 6 pages.
T. Huynh & C. Lassez, "A CLP(R) Options Trading Analysis System", in "Logic Programming: Proceedings of the Fifth International Conference and Symposium", vol. 1, MIT Press Series in Logic Programming (Robert A. Kowalski & Kenneth A. Bowen eds., 1988).
Adam Bradbery, "Chaos Breeds Complexity", date unknown, 1 page.
William J. Broad, "Swords Have Been Sheathed But Plowshares Lack Design", The New York Times International, Feb. 5, 1992.
Cynthia A. Brown et al., "TRADER" An Expert System for Trading Commodities Futures, 1991, pp. 92-96.
Sonja Butzengeiger et al., "Making GHG Emissions Trading work—crucial issues in designing national and international Emissions Trading Systems", HWWA Discussion Paper, Hamburg Institute of International Economics, 2001, 53 pages.
Nicholas Chan et al., "Information Dissemination and Aggregation in Asset Markets with Simple Intelligent Traders", Massachusetts Institute of Technology Artificial Intelligence Laboratory and Center for Biological and Computational Learning Department of Brain and Cognitive Sciences, A.I. Memo No. 1646, C.B.C.K. paper No. 164, Sep. 1998, 31 pages.
Rakesh Chandra & Arie Segev, "Managing Temporal Financial Data in an Extensible Database", Walter A. Haas School of Business University of California at Berkeley and Information and Computing Sciences Division, Lawrence Berkeley Laboratory, date unknown, 12 pages.
Peter Chapman, "Order Out of Chaos on Buy-Side Desks: Proliferating Order Management Systems", Tradersmagazine.com, Sep. 1999.
Dimitris N. Chorafas, "Simulation, Optimization and Expert Systems: How Technology is Revolutionizing the Way Securities are Underwritten, Analyzed and Traded", Institutional Investor Publication, 1992, 422 pages.
Neil A. Chriss, "Black-Scholes and Beyond: Option Pricing Models", Irwin Professional Publishing, 1997, Chapters 4-10.
N. F. Maxemchuck & D. H. Schur, "An Internet Multicast System for the Stock Market", AT&T Labs—Research, date unknown, 19 pages.
Barry A. Cipra, "A Chaotic Walk on Wall Street", SIAM News, May 1992.
Eric K. Clemons & Bruce W. Weber, "Information Technology and Screen-Based Securities Trading: Pricing the Stock and Pricing the Trade", Management Science, vol. 43 No. 12, Dec. 1997.
Jennifer Conrad & Gautam Kaul, "An Anatomy of Trading Strategies", The Review of Financial Studies, Fall 1998, vol. 11 No. 3, pp. 489-519.
Jennifer Conrad et al., "Institutional trading and alternative trading systems", Journal of Financial Economics, vol. 70, 2003, pp. 99-134.
Anne Constable, "Marking Predictions Make Money", date unknown.
Karen Corcella, "Automated Execution as Springboard to Growth", Wall Street & Technology, vol. 11 Issue 3, Sep. 1993.
Karen Corcella, "Market Prediction Turns the Tables on Random Walk", Wall Street & Technology, vol. 12 Issue 13, May 1, 1995.
Karen Corcella, "Symphony plays a solo", Wall Street & Technology, vol. 12 Issue 11, Mar. 1995.
John C. Cox, "Option Pricing: A Simplified Approach", Journal of Financial Economics, vol. 7, 1979, pp. 229-263.
Marianne Demarchi & Theirry Foucault, "Equity Trading Systems in Europe: A survey of recent changes", Feb. 1998.
M.A.H. Dempster & D.G. Richards, "Pricing Exotic American Options Fitting the Volatility Smile", Centre for Financial Judge Institute of Management Studies, University of Cambridge, Mar. 1999, 35 pages.
Sanjeev Dewan & Haim Mandelson, "Information Technology and Time-Based Competition in Financial Markets", Management Science, vol. 44 No. 5, May 1998, pp. 595-609.
Ian Domowitz, "A taxonomy of automated trade execution systems", Journal of International Money and Finance, vol. 12, 1993, pp. 607-631.
Ian Domowitz & Ruben Lee, "The Legal Basis for Stock Exchanges: The Classification and Regulation of Automated Trading Systems", Mar. 1998, 57 pages.
Bernard Dumas et al., "Implied Volativity Functions: Empirical Tests", The Journal of Finance, vol. 22 No. 6, Dec. 1998.
John F. Ehlers, "Mesa and Trading Market Cycles: Forecasting and Trading Strategies from the Creator of Mesa", Wiley Trader's Advantage, 1992.
Wolfgang Emmerich et al., "Markup Meets Middleware", 1999, 6 pages.
"Comparing the Performance of Stock Exchange Trading Systems", in "The Internationalisation of Capital Markets and the Regulatory Response" (John Fingleton & Dirk Schoenmaker eds., 1992).
Joan Junkus, Ph.D., "US Options Exchange", in "The Handbook or Equity Derivatives" (Jack Clark Francis et al. eds., 1995).
Michael P. Wellman & Peter R. Wurman, "A Trading Agent Competition for the Research Community", IJCAI Workshop on Agent-Mediated Electronic Commerce (1999), 14 pages.
Colin C. Williams, "Local purchasing scheme and rural development: an evaluation of local exchange and trading systems (LETS)", Journal of Rural Studies, vol. 12 No. 3, pp. 213-244, 1996.
C. L. Wilson, "Self-Organizing Neural Network System for Trading Commons Stocks", IEEE World Congress on Computational Intelligence, 1994 IEEE International Conference on Neural Networks, vol. 6, pp. 3651-3654, Jun. 27-Jul. 2, 1994.
M. Anthony Wong & Robert High, "Fixed-Income Arbitrage: Analytical Techniques and Strategies", A Wiley Finance Edition, (1993), 254 pages.
Patrick Young & Thomas Theys, "Capital Market Revolution: The Future of Market in an Online World", Financial Times Prentice Hall, (1999), 212 pages.
Yi-Cheng Zhang, "One Hundred Years of Physics in Finance", Europhysics News, Jan./Feb. 1998.
Sharon Begley et al., "Chaos Grows Up: Scientists seek practical uses for the new hidden order", Newsweek, date unknown.
Barry James, "Betting on Chaos in Markets: Physicists Aim to Predict the Unpredictable", Herald International Tribune, No. 33,959, May 5, 1992.
"Expression (mathematics)", Wikipedia, the free encyclopedia, available at http://en.wikipedia.org/wiki/Mathematical_expression, last visited on Jun. 15, 2006.
"Function (mathematics)", Wikipedia, the free encyclopedia, available at http://en.wikipedia.org/wiki/Mathematical_Function, last visited on Jun. 15, 2006.
"KPMG Seminar Brings Clarity to FASB 133", PR Newswire, Oct. 1, 1998, available at http://www.thefreelibrary.com/KPMG+Seminar+Brings+Clarity+to+FASB+133.-a053047 . . . .
"TradeNow! May 17-21, 1999", TradeNow!—Archive, available at http://internettrading.net/tradenow/arch/ex12.shtml, last visited on Nov. 30, 2004.
"Dictionary of Finance and Investment Terms", Barrons, pp. 116-117, (John Downes ed., 1998).
Dian Hymer, "Starting Out: The Complete Home Buyer's Guide", Chapter 8: Strategies for Repeat Home Buyers, pp. 221-234, (1997).
Defendant UBS Financial Services Inc.'s Answer, Affirmative Defenses, and Counterclaims in Response to Plaintiffs Edge Capture L.L.C. and Edge Specialists, L.L.C.'s Amended Complaint, *Edge Capture LLC* and *Edge Specialists, LLC* v. *Barclays Bank PLC et al.*, (1:09-cv-01521—US DC for the Northern District of IL), Mar. 23, 2011.
Defendant UBS Securities LLC's Answer, Affirmative Defenses, and Counterclaims in Response to Plaintiffs Edge Capture L.L.C. and Edge Specialists, L.L.C.'s Amended Complaint, *Edge Capture LLC* and *Edge Specialists, LLC* v. *Barclays Bank PLC et al.*, (1:09-cv-01521—US DC for the Northern District of IL), Mar. 23, 2011.
Defendant UBS AG's Answer and Affirmative Defenses in Response to Plaintiffs Edge Capture L.L.C. and Edge Specialists, L.L.C.'s Amended Complaint, *Edge Capture LLC* and *Edge Specialists, LLC* v. *Barclays Bank PLC et al.*, (1:09-cv-01521—US DC for the Northern District of IL), Mar. 23, 2011.
The Barclays and UBS Defendants' Opposition to Plaintiff Edge Capture L.L.C.'s and Edge Specialists, L.L.C.'s Motion to Strike Defendants' Renewed Motion to Bifurcate,*Edge Capture LLC* and

(56) References Cited

OTHER PUBLICATIONS

*Edge Specialists, LLC v. Barclays Bank PLC et al.*, (1:09-cv-01521—US DC for the Northern District of IL), Mar. 25, 2011.
Plaintiffs' Memorandum of Law in Opposition to Defendants' Motion to Bifurcate Patent Invalidity and Unenforceability from Alleged Infringement and Damages, *Edge Capture LLC and Edge Specialists, LLC v. Barclays Bank PLC et al.*, (1:09-cv-01521—US DC for the Northern District of IL), Mar. 25, 2011.
Plaintiffs Edge Capture L.L.C.'s and Edge Specialists, L.L.C.'s Reply Brief in Support of Their Motion to Strike Defendants' Renewed Motions to Bifurcate, *Edge Capture LLC and Edge Specialists, LLC v. Barclays Bank PLC et al.*, (1:09-cv-01521—US DC for the Northern District of IL), Apr. 1, 2011.
Wolverine Trading, L.L.C. and Wolverine Execution Services, L.L.C.'s Reply Memorandum in Support of Renewed Motion to Bifurcate Patent Invalidity and Unenforceability from Alleged Infringement and Damages,*Edge Capture LLC and Edge Specialists, LLC v. Barclays Bank PLC et al.*, (1:09-cv-01521—US DC for the Northern District of IL), Apr. 1, 2011.
The Barclays and UBS Defendants' Reply in Support of Their Renewed Motion to Bifurcate Patent Invalidity and Unenforceability from Alleged Infringement and Damages,*Edge Capture LLC and Edge Specialists, LLC v. Barclays Bank PLC et al.*, (1:09-cv-01521—US DC for the Northern District of IL), Apr. 1, 2011.
The Barclays and UBS Defendants' Sur-Reply in Opposition to Plaintiff Edge Capture L.L.C.'s and Edge Specialists, L.L.C.'s Motion to Strike Defendants' Renewed Motion to Bifurcate, *Edge Capture LLC and Edge Specialists, LLC v. Barclays Bank PLC et al.*, (1:09-cv-01521—US DC for the Northern District of IL), Apr. 7, 2011.
Notification of Docket Entry, Order Denying Defendants' Renewed Motion to Bifurcate and Plaintiffs' Motion to Strike Defendants' Renewed Motion, *Edge Capture LLC and Edge Specialists, LLC v. Barclays Bank PLC et al.*, (1:09-cv-01521—US DC for the Northern District of IL), Apr. 21, 2011.
Memorandum Opinion and Order, *Edge Capture LLC and Edge Specialists, LLC v. Barclays Bank PLC et al.*, (1:09-cv-01521—US DC for the Northern District of IL), Apr. 21, 2011.
Memorandum of Law in Support of Plaintiffs' Motion to Dismiss Defendant Barclays' and Defendant UBS's State Law and Inequitable Conduct Counterclaims and Affirmative Defenses, *Edge Capture LLC and Edge Specialists, LLC v. Barclays Bank PLC et al.*, (1:09-cv-01521—US DC for the Northern District of IL), May 4, 2011.
Memorandum of Law in Support of Plaintiffs' Motion to Dismiss Defendant Wolverine's State Law and Inequitable Conduct Counterclaims and Affirmative Defenses, *Edge Capture LLC and Edge Specialists, LLC v. Barclays Bank PLC et al.*, (1:09-cv-01521—US DC for the Northern District of IL), May 4, 2011.
Wolverine Trading, LLC and Wolverine Execution Services, LLC's Opposition to Plaintiffs' Motion to Dismiss Defendant Wolverine's State Law and Inequitable Conduct Counterclaims, *Edge Capture LLC and Edge Specialists, LLC v. Barclays Bank PLC et al.*, (1:09-cv-01521—US DC for the Northern District of IL), May 25, 2011.
Barclays and UBS Defendants' Opposition to Plaintiffs' Motion to Dismiss Barclays' and UBS' State Law and Inequitable Conduct Counterclaims and Affirmative Defenses, *Edge Capture LLC and Edge Specialists, LLC v. Barclays Bank PLC et al.*, (1:09-cv-01521—US DC for the Northern District of IL), May 25, 2011.
Reply Memorandum of Law in Support of Plaintiffs' Motion to Dismiss Defendant Wolverine's State Law and Inequitable Conduct Counterclaims and Affirmative Defenses, *Edge Capture LLC and Edge Specialists, LLC v. Barclays Bank PLC et al.*, (1:09-cv-01521—US DC for the Northern District of IL), Jun. 8, 2011.
Reply Memorandum of Law in Support of Plaintiffs' Motion to Dismiss Defendant Barclays' and Defendant UBS's State Law and Inequitable Conduct Counterclaims and Affirmative Defenses, *Edge Capture LLC and Edge Specialists, LLC v. Barclays Bank PLC et al.*, (1:09-cv-01521—US DC for the Northern District of IL), Jun. 8, 2011.
The Barclays and UBS Defendants' Sur-Reply in Opposition to Plaintiff Edge Capture L.L.C.'s and Edge Specialists, L.L.C.'s Motion to Dismiss Barclays' and UBS' State Law and Inequitable Conduct Counterclaims and Affirmative Defenses, *Edge Capture LLC and Edge Specialists, LLC v. Barclays Bank PLC et al.*, (1:09-cv-01521—US DC for the Northern District of IL), Jun. 15, 2011.
Notification of Docket Entry, Order Granting In Part and Denying In Part Plaintiffs' Motion to Dismiss Defendant Wolverine's State Law and Inequitable Conduct Counterclaims and Affirmative Defenses, *Edge Capture LLC and Edge Specialists, LLC v. Barclays Bank PLC et al.*, (1:09-cv-01521—US DC for the Northern District of IL), Jul. 26, 2011.
Memorandum Opinion and Order,*Edge Capture LLC and Edge Specialists, LLC v. Barclays Bank PLC et al.*, (1:09-cv-01521—US DC for the Northern District of IL), Jul. 27, 2011.
Plaintiffs Edge Capture L.L.C. and Edge Specialists, L.L.C.'s Answer and Affirmative Defenses to Defendants Wolverine Trading, L.L.C. and Wolverine Execution Services, L.L.C.'s Counterclaims, *Edge Capture LLC and Edge Specialists, LLC v. Barclays Bank PLC et al.*, (1:09-cv-01521—US DC for the Northern District of IL), Aug. 16, 2011.
"Web POP: Online Options Risk Analysis for Traders and Brokers"; by PMpublishing; available at http://www.pmpublishing.com/webpopt; date unknown; 2 pages.
Giovanni Barone-Adesi & Robert E. Whaley "Efficient Analytic Approximation of American Option Values" in The Journal of Finance, vol. 42 Issue 2; pp. 301-320 (Jun. 1987); 20 pages.
"Electronic Trading System Matches Buyers, Sellers" by Zach Coleman, Atlanta Business Chronicle, vol. 20 No. 12, p. 37A, Aug. 1997.
The Chicago Mercantile Exchange, "Globex: Expanding Futures and Options Trading Around the World, Around the Clock", Mar. 30, 1989, 24 pages.
"Trading Pad" by GL Trade, Operational Manual, date unknown, 8 pages.
A High-Level Protocol and System for Computer Controlled Financial Trading, Massimo Bigliardo et al, Carnegie Mellon University Information Networking Institute, Technical Report, TR 1993-9, date unknown, 156 pages.
A Hybrid Approach to Automated Trading Systems, Raymond k Wong & Patty N. Ng, Proceedings of the 1994 Second Australian and New Zealand Conference on Intelligent Information Systems, pp. 278-282, Nov. 29-Dec. 2, 1994.
Aurora: A Replication of Proven Market Efficiency, Chicago Board of Trade, date unknown, 11 pages.
Welcome to the AZX Arizona Stock Exchange: The Online Stock Auction, Presentation, The Arizona Stock Exchange, date unknown, 39 pages.
"Canadian Brokerage Hedges with On-line Expertise", Trading Technology in the Wall Street Computer Review, Dec. 1990, 3 pages.
"Introducing the OptiMark System", The Chicago Board Options Exchange, date unknown, 3 pages.
"ITG Pairs and Long/Short Trading Strategies", ITG QuantEX, available at http://web.archive.org/web/20000925182843/www.itginc.com/products/quantex/qtx99-pai...1/13, date unknown, last visited on Jan. 13, 2010.
The "Mesa User's Guide" (Release 1.5); 431 pages.
"O'Connor Funds Chaos Research", Frontlines, date unknown, 1 page.
"POSIT: Portfolio System for Institutional Trading: User's Guide", date unknown, 93 pages.
"Optimization of Trading Rules: with a Penalty Term for Increased Risk-Adjusted Performance", by Thomas Hellström, Department of Computing Science Umeå University, Sweden, Power Point Presentation, date unknown.
"QuantEX: Electronic Trading Made Intelligent", ITG QuantEX, available at http://web.archive.org/web/20000414060938/www.itginc.com/products/quantex/quantex.h...1/13, date unknown, last visited on Jan. 13, 2010.
"RealTick: Trading Guide", Townsend Analytics, Ltd., TAL Trading Tools, Edition 4, May 2000, 39 pages.
"The Berkeley Options Data Base User's Guide", Institute of Business and Economic Research #1922, Release 3.0, University of California, Berkeley, Aug. 1998, 70 pages.

(56) References Cited

OTHER PUBLICATIONS

"Telekurs Investdata System Manual", Edition '94/E, date unknown, 108 pages.
"Canadian Quantex User Manual: vol. 1 Trade Execution", Canadian Quantex, Release Version 1.1, RBC Dominion Securities Inc.: Quantitative Integrated Trading Technologies Inc., date unknown, 115 pages.
Automation in the Futures Industry: Proceedings of a Conference Sponsored by Commodity Futures Trading Commission, Jun. 15, 1977, Washington, D.C.
"CATS: Computer Assisted Trading System Trader's Manual", The Toronto Stock Exchange, 1979, 9 pages.
"CATS Project Notice—79-3—Re: CATS Service and Information Centre", The Toronto Stock Exchange, Mar. 2, 1979, 132 pages.
"Late But Hopeful, Intex Looks for Summer Start Up", Futures World, Jun. 14, 1984, 3 pages.
"Automated Trading Works: Now for the Next Hurdle", Futures World, Nov. 22, 1984, 3 pages.
"Multi-Talented System Opens Windows for Trader's World", The Wall Street Computer Review, vol. 5 No. 7, Apr. 1988, pp. 86-90.
"How Computer Assisted Trading is Making the Toronto Stock Exchange Purr", The Wall Street Computer Review, vol. 5 No. 3, Dec. 1987, pp. 71-78 and 97.
"Davidge Debuts DOT/PC Order Routing for NYSE Members", Trading Systems Technology, Aug. 26, 1987, 1 page.
Letter to Sharon Lawson of the SEC from Nancy Nielsen, the Chicago Board Options Exchange, dated Mar. 31, 1994 re File No. SR-CBOE-94-12 including File No. SR-CBOE-94-12, entitled Proposed Rule Change by the Chicago Board Options Exchange, Inc., pp. 1-17.
Letter to John Ayanian of the SEC from Michael L. Meyer, Schiff Hardin & Waite, dated Feb. 17, 1995, re File Nos. SR-CBOE-95-05 and 95-06.
Letter to Sharon Lawson of the SEC from Nancy Nielsen, the Chicago Board Options Exchange, dated Jan. 17, 1995, re File No. SR-CBOE-95-06 including File No. SR-CBOE-95-06, entitled Proposed Rule Change by the Chicago Board Options Exchange, Inc., pp. 1-16.
Federal Register, vol. 62, No. 250, dated Dec. 31, 1997, pp. 68326-68327, re SR-CBOE-97-61.
The Chicago Board Options Exchange, Regulatory Bulletin, vol. RB9, No. 1, dated Jan. 14, 1998, pp. 1-16.
Letter to Howard Kramer of the SEC from Nancy Nielsen, the Chicago Board Options Exchange, dated Dec. 1, 1997, re SR-CBOE-97-61 including File No. SR-CBOE-97-61, entitled Proposed Rule Change by the Chicago Board Options Exchange, Inc., pp. 1-44.
Letter to Richard Strasser of the SEC from Joanne Moffic-Silver, the Chicago Board Options Exchange, dated Dec. 24, 1997, re SR-CBOE 97-61 including draft charters for all Market Performance Committees and Floor Procedure Committees, 8 pages.
Letter to Sharon Lawson of the SEC from Michael L. Meyer, Schiff Hardin & Waite, dated Aug. 31, 1993, re Amendment No. 2 to File No. SR-CBOE-93-22; RAES Anti-Trade-Through Procedures including Exhibit A, Chapter VI Doing Business on the Exchange Floor, one page.
Letter to Sharon Lawson of the SEC from Michael L. Meyer, Schiff Hardin & Waite, dated Jun. 10, 1993, re Amendment No. 1 to File No. SR-CBOE-93-22 including Exhibit A, Chapter VI Doing Business on the Exchange Floor, one page.
Letter to Sharon Lawson of the SEC from Nancy Nielsen, the Chicago Board Options Exchange, dated May 7, 1993, re File No. SR-CBOE-93-22 including File No. SR-CBOE-93-22, entitled Proposed Rule Change by the Chicago Board Options Exchange, Inc., pp. 1-12.
Federal Register, vol. 58, No. 182, dated Sep. 22, 1993, pp. 49342-49343.
The Chicago Board Options Exchange, Regulatory Bulletin, vol. RB5, No. 19, dated Oct. 13, 1993, pages.

Memo to C. Henry from N. Nielsen, the Chicago Board Options Exchange, dated May 5, 1993, re Rule Change File No. SR-CBOE-93-22.
Letter to Nancy Nielsen, the Chicago Board Options Exchange, from Michael L. Meyer, Schiff Hardin & Waite, dated May 4, 1993 re Amendment No. 1 to file 92-40.
Letter to John Ayanian of the SEC from Timothy Thompson, the Chicago Board Options Exchange, dated Sep. 16, 1997, re Amendment No. 1 to SR-CBOE-97-45 including Exhibit A—Chicago Board Options Exchange, Inc. Rules, Chapter VIII—Market-Makers, Trading Crowds and Modified Trading Systems and Exhibit B—Memo to Exchange Membership from Legal Department re Schedule of fines that may be imposed pursuant to Rule 17.50 for violations of DJX Crowd standards of trading conduct, 6 pages total.
Letter to Howard Kramer of the SEC from Nancy Nielsen, the Chicago Board Options Exchange, dated Sep. 4, 1997, re SR-CBOE-97-45 including File No. SR-CBOE-97-45, entitled Proposed Rule Change by the Chicago Board Options Exchange, Inc., pp. 1-28.
Federal Register, vol. 62, No. 198, dated Oct. 14, 1997, pp. 53358-53361, re SR-CBOE-97-45.
Letter to John Ayanian of the SEC from Timothy Thompson, the Chicago Board Options Exchange, dated Sep. 24, 1997, re SR-CBOE-97-45, 3 pages.
The Chicago Board Options Exchange, Regulatory Bulletin, vol. RB8, No. 20, dated Oct. 22, 1997, pp. 1-28.
Letter to Michael Walinskas of the SEC from Timothy Thompson, the Chicago Board Options Exchange, dated Oct. 2, 1997, re SR-CBOE-97-45, 4 pages.
Letter to Scott C. Kursman of the SEC from Michael Meyer, Schiff Hardin & Waite, dated Jul. 11, 1994, re File No. SR-CBOE-93-17.
Letter to Sharon Lawson of the SEC from Nancy Nielsen, the Chicago Board Options Exchange, dated Mar. 29, 1993, re File No. SR-CBOE-93-17 including File No. SR-CBOE-93-17, entitled Proposed Rule Change by the Chicago Board Options Exchange, Inc., pp. 1-11.
The Chicago Board Options Exchange, Regulatory Bulletin, vol. RB5, No. 16, dated Aug. 24, 1994, pp. 1-8.
Federal Register, vol. 59, No. 146, dated Aug. 1, 1994, pp. 38996-38997, re SR-CBOE-93-17.
Federal Register, vol. 59 No. 146, dated Aug. 1, 1994, pp. 39004 and 39007-39008.
Federal Register, vol. 58, No. 165, dated Aug. 27, 1993, pp. 45360-45365.
Federal Register, vol. 58, No. 109, dated Jun. 9, 1993, pp. 32404-32405, re SR-CBOE-93-17.
The Chicago Board Options Exchange, Regulatory Bulletin, vol. RB5, No. 13, dated Jul. 14, 1993, pp. 1-7.
Federal Register, vol. 59, No. 146, dated Aug. 1, 1994, pp. 38992-38997.
Memo to C. Henry from N. Nielsen, Chicago Board Options Exchange, dated Mar. 26, 1993, re Rule Change File No. SR-CBOE-93-17.
Federal Register, vol. 54, No. 119, dated Jun. 22, 1989, pp. 26284-26285, re SR-CBOE-89-04.
File No. SR-CBOE-89-04, Securities and Exchange Commission Form 19b-4, entitled Proposed Rule Change by the Chicago Board Options Exchange, Inc., pp. 1-21.
The Chicago Board Options Exchange Memo to Members and Member Organizations from Legal Services dated Jul. 14, 1989, re Firm Quotes and Other Rule Amendments Effective Jul. 24, 1989, CBOE #89-70, 2 pages.
Letter to Mark McNair of the SEC from Nancy Nielsen, the Chicago Board Options Exchange, dated Jul. 13, 1989, re SR-CBOE-89-04 including renumbered rules, 6 pages total.
Federal Register, vol. 54, No. 180, dated Sep. 19, 1989, pp. 38580-38581.
Federal Register, vol. 55, No. 99, dated May 22, 1990, pp. 21131-21135.
Federal Register, vol. 54, No. 61, dated Mar. 31, 1989, pp. 13282-13283.
Federal Register, vol. 54, No. 39, dated Mar. 1, 1989, pp. 8614-8616.
Federal Register, vol. 54, No. 40, dated Mar. 2, 1989, pp. 8856-8859.

(56) References Cited

OTHER PUBLICATIONS

Federal Register, vol. 54, No. 146, dated Aug. 1, 1989, pp. 31754-31755.
Securities and Exchange Commission [Release No. 34-25995; File Nos. SR-CBOE-87-35 and SR-CBOE-87-47], 53 FR 31781, 14 pages.
File No. SR-CBOE-87-35, Securities and Exchange Commission Form 19b-4, entitled Proposed Rule Change by the Chicago Board Options Exchange, Inc., pp. 1-23, including Exhibit A, RAES Usage by Trade Month Equity Customer Trades—All Firms, Sep. 1986-May 1986.
Letter to Holly Smith of the SEC from Fred Krieger, the Chicago Board Options Exchange, dated May 10, 1988, re SR-CBOE-87-35.
Handwritten Note dated Mar. 8, 1988 re Auto-Ex to numerous recipients from Fred Krieger, the Chicago Board Options Exchange, including Amex Filing on AUTO-Ex, File No. SR-AMEX-88-6 (10 pages).
The Chicago Board Options Exchange Bulletin, vol. 16, No. 34, dated Aug. 24, 1988, 2 pages.
Handwritten Note to Ed Provost from Nancy N., Chicago Board Options Exchange, dated Aug. 13, 1989, re CBOE 85-16 Original Filing—Equity RAES and CBOE 87-35 Pilot Lumanent.
SEC [Release No. 34-25995; File Nos. SR-CBOE-87-35 and V-87-47], 53 FR 31781, 14 pages.
Letter to Nancy Sanow of the SEC from Joanne Moffic-Silver, Chicago Board Options Exchange, dated Nov. 4, 1999, re Withdrawal of SR-CBOE-98-44.
Letter to Richard Strasser of the SEC from Stephanie Mullins, Chicago Board Options Exchange, dated Apr. 7, 1999, re Amendment No. 3 to SR-CBOE-98-44.
Letter to Richard Strasser of the SEC from Stephanie Mullins, Chicago Board Options Exchange, dated Jan. 4, 1999, re Amendment 2 to SR-CBOE-98-44 including one page attachment Chapter VI, Doing Business on the Exchange Floor, Section A: General.
CBOE Member Trading Services Dept., Feb. 22, 2000, W725: RAES Monthly Activity 1999-2000, 1 page.
Handwritten Notes, File 99-51, one page, dated Dec. 10, 1999, re John Roeser and 75 up filing for RAES, author unknown.
Handwritten Notes, File 99-51, one page, Dec. 16, 1999, re Tim Watkins, author unknown.
Federal Register, vol. 65, No. 221, dated Nov. 15, 2000, Notices, pp. 69082-69084, re SR-CBOE-99-51.
Federal Register, vol. 65, No. 221, dated Nov. 15, 2000, Notices, pp. 69079-69080.
Federal Register, vol. 65, No. 221, dated Nov. 15, 2000, Notices, pp. 69111-69112.
Federal Register, vol. 65, No. 221, dated Nov. 15, 2000, Notices, pp. 69114-69116.
The Chicago Board Options Exchange, Regulatory Bulletin, vol. RB11, No. 49, dated Dec. 8, 2000, pp. 1-12.
Securities and Exchange Commission (Release No. 34-43517; File No. SR-CBOE-99-51), Nov. 3, 2000, pp. 1-10.
CBOE Memo to Equity Floor Procedure Committee from Timothy Thompson dated Jun. 14, 2000, re "Public Notice of Rule Filing to Increase Maximum RAES Size to 75" including Securities and Exchange Commission (Release No. 34-42930; File No. SR-CBOE-99-51), Jun. 13, 2000, pp. 1-8.
The Chicago Board Options exchange, Regulatory Bulletin, vol. RB10, No. 40, dated Oct. 1, 1999, pp. 1-24.
Securities and Exchange Commission File No. SR-CBOE-96-30, Form 19b-4, entitled Proposed Rule Change by the Chicago Board Options Exchange Chicago Board Options Exchange, Inc., pp. 1-5 and 7-14.e, Inc., pp. 1-5 and 7-14.
CBOE Memo to Office of the Chairman from Timothy Thompson dated May 7, 1996, re "OEX RAES Eligibility Requirements", including SR-CBOE-96-30, Form 19b-4, entitled Proposed Rule Change by the Chicago Board Options Exchange, Inc., pp. 1-14.
Letter to John Ayanian of the SEC from Timothy Thompson, the Chicago Board Options Exchange, dated Aug. 20, 1996, re: SR-CBOE-96-51; Amendment No. 1 including Exhibit A, OBOE Rules, Chapter XXIV Index Options RAES Eligibility in SPX, 2 pages total.
Letter to Ivette Lopez of the SEC from Nancy L. Nielsen, the Chicago Board Options Exchange, dated Jul. 25, 1996, re SR-CBOE-96-51 including SR-CBOE-96-51, Form 19b-4, entitled Proposed Rule Change by the Chicago Board Options Exchange, Inc., pp. 1-16.
Letter to Ivette Lopez of the SEC from Nancy L. Nielsen, the Chicago Board Options Exchange, dated Nov. 25, 1996, re SR-CBOE-96-72 including SR-CBOE-96-72, Form 19b-4, entitled Proposed Rule Change by the Chicago Board Options Exchange, Inc., pp. 1-13.
Letter to Kelly Riley of the SEC from Timothy Thompson, the Chicago Board Options Exchange, dated May 18, 2000, re Amendment No. 5 to SR-CBOE-97-37, including Exhibit A, CBOE Rules, Chapter VIII, 3 pages total.
Letter to Kelly Riley of the SEC from Timothy Thompson, the Chicago Board Options Exchange, dated Mar. 21, 2000, re Amendment No. 4 to SR-CBOE-97-37, including Exhibit A, CBOE Rules, Chapter VIII, 2 pages total.
Letter to Kelly Riley of the SEC from Stephanie Mullins, the Chicago Board Options Exchange, dated Dec. 7, 1999, re Amendment No. 3 to SR-CBOE-97-37 including Exhibit A, Oboe Rules, Chapter VIII, 3 pages total.
Letter to Richard Strasser of the SEC from Timothy Thompson, the Chicago Board Options Exchange, dated Sep. 23, 1999, re SR-CBOE-97-37 including Exhibit A, CBOE Rules, Chapter VIII, 5 pages total.
Letter to Heather Seidel of the SEC from Timothy Thompson, the Chicago Board Options Exchange, dated Jul. 22, 1998, re SR-CBOE-97-37 including Exhibit A, CBOE Rules, Chapter VIII, 6 pages total.
Letter to Ivette Lopez of the SEC from Nancy L. Nielsen, the Chicago Board Options Exchange, dated Aug. 5, 1997, re SR-CBOE-97-37 including SR-CBOE-97-37, Form 19b-4, entitled Proposed Rule Change by the Chicago Board Options Exchange, Inc., pp. 1-15.
Letter to Howard Kramer of the SEC from Nancy L. Nielsen, the Chicago Board Options Exchange, dated Apr. 3, 1998, re SR-CBOE-98-13 including SR-CBOE-98-13, Form 19b-4, entitled Proposed Rule Change by the Chicago Board Options Exchange, Inc., pp. 1-12.
Letter to Ken Rosen of the SEC from Timothy Thompson, the Chicago Board Options Exchange, dated May 11, 1998, re Amendment to SR-CBOE-98-13, 2 pages.
Letter to Debbie Flynn of the SEC from Timothy Thompson, the Chicago Board Options Exchange, dated Jun. 19, 1998, re Amendment to SR-CBOE-98-20 including Exhibit A, Chapter XXIV Index Options Raes Eligibility in OEX and DJX, 3 pages total.
Letter to Howard Kramer of the SEC from Nancy L. Nielsen, the Chicago Board Options Exchange, dated May 15, 1998, re SR-CBOE-98-20 including SR-CBOE-98-20, Form 19b-4, entitled Proposed Rule Change by the Chicago Board Options Exchange, Inc., pp. 1-13.
Letter to Sonia Patton of the SEC from Timothy Thompson, the Chicago Board Options Exchange, dated Sep. 15, 1998, re Amendment No. 1 to SR-CBOE-98-37.
Letter to Michael Walinskas of the SEC from Nancy Nielsen, the Chicago Board Options Exchange, dated Aug. 20, 1998, re SR-CBOE-98-37 including File No. SR-CBOE-98-37, Form 19b-4, entitled Proposed Rule Change by the Chicago Board Options Exchange, Inc., pp. 1-12.
CBOE, Inc. Rule-Change Filing Cover Sheet, SR-CBOE-87-30, dated Jul. 27, 1987.
Order re Indirect Patent Infringement Claims, *Edge Capture LLC* and *Edge Specialists, LLC* v. *Barclays Bank PLC et al.*, (1:09-cv-01521—US DC for the Northern District of IL), Jan. 31, 2011.
Tushar M. Patel & Gail E. Kaiser, "The Splendors Real Time Portfolio Management System", Columbia University, Department of Computer Science, Apr. 14, 1991 available at http://citeseerist.psu.edu/viewdoc/summary?doi=10.1.1.38.464.
Ivy Schmerken, "Off-Exchange Trading Chips Away At NYSE Volume", Wall Street & Technology, vol. 10 No. 4, pp. 42-48, Dec. 1992.
Letter to Joseph Furey of the SEC from Robert P. Ackermann, the Chicago Board Options Exchange, dated Feb. 16, 1989, re Amendment 3, SR-CBOE-87-30.

(56) References Cited

OTHER PUBLICATIONS

Letter to Howard Kramer of the SEC from Nancy Crossman, the Chicago Board Options Exchange, dated Sep. 12, 1988, re Amendment 2, SR-CBOE-87-30, and including Long-Term Composite Comparison of Closing Values, Table I, and Short-Term Composite Comparison of Closing Values, Table IV, 4 pages total.
File No. SR-CBOE-87-30 Revised, Amendment No. 1, Securities and Exchange Commission Form 19b-4, entitled Proposed Rule Change by the Chicago Board Options Exchange, Inc., pp. 1-4.
File No. SR-CBOE-87-30 Revised, Securities and Exchange Commission Form 19b-4, entitled Proposed Rule Change by the Chicago Board Options Exchange, Inc., pp. 1-20.
File No. SR-CBOE-87-30 Revised, Securities and Exchange Commission Form 19b-4, entitled Proposed Rule Change by the Chicago Board Options Exchange, Inc., pp. 1-20, Marked as "OLD—Federal Express via A. Klein's office Jul. 27, 1987."
File No. SR-CBOE-89-12, Securities and Exchange Commission Form 19b-4, entitled Proposed Rule Change by the Chicago Board Options Exchange, Inc., pp. 1-8.
File No. SR-CBOE-89-28, Securities and Exchange Commission Form 19b-4, entitled Proposed Rule Change by the Chicago Board Options Exchange, Inc., pp. 1-6.
Letter to Sharon M. Lawson of the SEC from Dr. William J. Barclay, the Chicago Board Options Exchange, dated Feb. 24, 1993, re CBOE Flex Options, File No. SR-CBOE-92-17.
Letter to Sharon Lawson of the SEC from Nancy Nielsen, the Chicago Board Options Exchange, dated Feb. 8, 1993, re SR-CBOE-92-17, Amendment 3, including File No. SR-CBOE-92-17 entitled Proposed Rule Change by the Chicago Board Options Exchange, Inc., 6 pages total.
Letter to Sharon Lawson of the SEC from Joanne Moffic-Silver, the Chicago Board Options Exchange, dated Jan. 26, 1993 including File No. SR-CBOE-92-17 Amendment No. 2, entitled Proposed Rule Change by the Chicago Board Options Exchange, Inc., 6 pages total.
Letter to Sharon M. Lawson of the SEC from Dr. William J. Barclay, the Chicago Board Options Exchange, dated Jan. 14, 1993, re Amendment No. 1 to File SR-CBOE-92-17 including File No. SR-CBOE-92-17 Amendment No. 1, entitled Proposed Rule Change by the Chicago Board Options Exchange, Inc., 18 pages total.
Letter to Sharon Lawson of the SEC from William J. Barclay, the Chicago Board Options Exchange, dated Aug. 28, 1992, re SR-CBOE-92-17—Resubmitted, including File No. SR-CBOE-92-17 Resubmitted, entitled Proposed Rule Change by the Chicago Board Options Exchange, Inc., pp. 1-37.
Letter to Sharon Lawson of the SEC from Joanne Moffic-Silver, the Chicago Board Options Exchange, dated Aug. 21, 1992, re SR-CBOE-92-17 including File No. SR-CBOE-92-17, entitled Proposed Rule Change by the Chicago Board Options Exchange, Inc., pp. 1-37.
Letter to Sharon M. Lawson of the SEC from Michael L. Meyer, Schiff Hardin & Waite, dated Jul. 19, 1993, re Amendment No. 2 to File No. SR-CBOE-92-40; Interpretational Policy .01 under CBOE Rule 6.8—RAES Operation in Equity Options including Exhibit A, Chapter VI Doing Business on the Exchange Floor, 1 page.
Letter to Richard L. Zack of the SEC from Michael L. Meyer, Schiff Hardin & Waite, dated May 4, 1993, re Amendment No. 1 to File No. SR-CBOE-92-40; Interpretations and Policies under CBOE Rule 6.8—RAES Operation in Equity Options.
Letter to Sharon Lawson of the SEC from Joanne Moffic-Silver, the Chicago Board Options Exchange, dated Dec. 15, 1992, re SR-CBOE-92-40, and including File No. SR-CBOE-92-40, entitled Proposed Rule Change by the Chicago Board Options Exchange, Inc., pp. 1-13.
Letter to Sharon Lawson of the SEC from Nancy L. Nielsen, the Chicago Board Options Exchange, dated Jan. 18, 1994, re File No. SR-CBOE-94-02 including File No. SR-CBOE-94-02, entitled Proposed Rule Change by the Chicago Board Options Exchange, Inc., pp. 1-17.

Letter to Janice Mitnick of the SEC from Timothy H. Thompson, The Chicago Board Options Exchange, dated Jun. 12, 1997, re Amendment No. 2 to SR-CBOE-96-68. 4 pages.
Memo to Charles Henry from Timothy Thompson dated Nov. 7, 1996, re Rule Filing, regarding RAES Kickouts including Securities and Exchange Commission, File No. SR-CBOE-96- entitled "Securities and Exchange Commission Form 19b-4, Proposed Rule Change by the CBOE", pp. 1-5, 6, and 8-15.
File Memos to Office of the Chairman from Timothy Thompson, The Chicago Board Options Exchange, dated Oct. 15, 1996, re Rule Filing, regarding RAES Kickouts and Memo to Office of the Chairman from Timothy Thompson dated Oct. 2, 1996, re RAES, reject Rule Filing including Securities and Exchange Commission, File No. SR-CBOE-96- entitled "Securities and Exchange Commission Form 19b-4, Proposed Rule Change by the CBOE", pp. 1-9.
The Chicago Board Options Exchange, Regulatory Bulletin, vol. RB8, No. 14, dated Jul. 23, 1997, pp. 1-24.
Federal Register, vol. 62, No. 125, dated Jun. 30, 1997, pp. 35241-35243 re File No. SR-CBOE-96-68.
Draft letter to Janice Mitnick of the SEC from Timothy Thompson, the Chicago Board Options Exchange, dated Dec. 12, 1996, re Amendment No. 1 to SR-CBOE-96-68 including Draft CBOE, Inc. Rules Chapter VI, 4 pages, and Securities and Exchange Commission, File No. SR-CBOE-96-68 entitled "Securities and Exchange Commission Form 19b-4, Proposed Rule Change by the CBOE", pp. 1-13.
The Chicago Board Options exchange, Regulatory Bulletin, vol. RB7, No. 47, dated Dec. 25, 1996, pp. 1-7.
Letter to Sharon Lawson of the SEC from Nancy L. Nielsen, The Chicago Board Options Exchange, dated Aug. 31, 1995, re SR-CBOE-95-52 including Securities and Exchange Commission File No. SR-CBOE-95-52, entitled "Securities and Exchange Commission Form 19b-4, Proposed Rule Change by the CBOE", pp. 1-28.
Letter to John Ayanian of the SEC from Michael L. Meyer of Schiff Hardin & Waite, dated Dec. 14, 1995 re File No. SR-CBOE-95-52, 2 pages.
The Chicago Board Options Exchange, Regulatory Bulletin, vol. RB6, No. 23, dated Dec. 27, 1995, pp. 1-12.
Federal Register, vol. 60, No. 206, dated Oct. 25, 1995, pp. 54737-54739 re SR-CBOE-95-52.
The Chicago Board Options Exchange 1995 Information Circulars Memo to Membership from Legal Department dated Jan. 24, 1996, entitled Information Circular IC96-04, 5 pages.
The Chicago Board Options Exchange, Regulatory Bulletin, vol. RB7, No. 2, dated Jan. 24, 1996, pp. 1-15.
The Chicago Board Options Exchange, regulatory Circular RG96-13 to Membership from Legal Department dated Jan. 24, 1996, entitled "1995 Regulatory Circulars", pp. 1-12.
Federal Register, vol. 61, No. 2, dated Jan. 3, 1996, pp. 199-202 re SR-CBOE-95-52.
Securities and Exchange Commission File No. SR-CBOE-89-27, entitled "Form 19b-4, Proposed Rule Change by the Chicago Board Options Exchange, Inc.", pp. 1-8.
Securities and Exchange Commission File No. SR-CBOE-89-27, Amendment No. 2, entitled "Form 19b-4, Proposed Rule Change by the Chicago Board Options Exchange, Inc.", pp. 1-16.
Federal Register, vol. 55, No. 49, dated Mar. 13, 1990, Notices, pp. 9384-9386, re SR-CBOE-89-27.
Federal Register, vol. 55, No. 178, dated Sep. 13, 1990, Notices, pp. 37784-37786, re SR-CBOE-89-27 and SR-CBOE-89-29.
The Chicago Board Options Exchange "RAES : Retail Automatic Execution System", Feb. 1990, pp. 1-5.
Letter to Mr. Howard Kramer of the SEC from Robert P. Ackermann, the Chicago Board Options Exchange, dated Aug. 10, 1990, re SR-CBOE-89-27 Amendment No. 2 and SR-CBOE-89-29 Amendment No. 1.
Federal Register, vol. 55, No. 148, dated Aug. 1, 1990, Notices, pp. 31272-31273.
Federal Register, vol. 55, No. 154, dated Aug. 9, 1990, Notices, pp. 32523-32524.

(56) References Cited

OTHER PUBLICATIONS

Letter to Mr. Howard Kramer of the SEC from Robert P. Ackermann, the Chicago Board Options Exchange, dated Jan. 22, 1990, re Amendments to SR-CBOE-89-27, SR-CBOE-89-28, SR-CBOE-89-29, and SR-CBOE-89-30.
Notes, 1 page re 89-27, dated Jul. 3, 1990, Gene Lopez, systems on RAES.
Letter to Mr. Howard Kramer of the SEC from Robert P. Ackermann, the Chicago Board Options Exchange, dated Mar. 7, 1990, re SR-CBOE-89-27 Amendment No. 1.
Notes—handwritten, 2 pages dated Jan. 17, 1990 re RAES, author unknown.
Letter to Howard Kramer of the SEC from Robert P. Ackermann, the Chicago Board Options Exchange, dated Jun. 27, 1990, re SR-CBOE-89-27 as Amended, 2 pages.
Securities and Exchange Commission File No. SR-CBOE-89-27, entitled "Form 19b-4, Proposed Rule Change by the Chicago Board Options Exchange, Inc.", pp. 1-16.
Exhibit A, RAES Equity Daily Contracts, Month Totals for May 1990, 36 pages.
Exhibit B, RAES Equity Daily Orders, Month Totals for May 1990, 13 pages.
Exhibit C, Projected RAES Equity 11-20 Lot Front & Second Month Contracts, Month Totals for May 1990, Includes all ORS orders after 8:40 a.m., Premium Under $10, 5 pages.
Exhibit D, Projected RAES Equity 11-20 Lot Front & Second Month Orders, Month Totals for May 1990, Includes All ORS orders after 8:40 a.m., Premium Under $10, 5 pages.
The Chicago Board Options Exchange, Regulatory Bulletin, Sep. 26, 1990, vol. RB2, No. 18, pp. 1-8.
The Chicago Board Options Exchange, Regulatory Bulletin, Feb. 14, 1990, vol. RB2, No. 3, pp. 1-12.
Letter to Howard Kramer of the SEC from Nancy L. Nielsen, the Chicago Board Options Exchange, dated Dec. 16, 1997, re SR-CBOE-97-66 including File No. SR-CBOE-97-66, entitled "Securities and Exchange Commission Form 19b-4, Proposed Rule Change by Chicago Board Options Exchange", pp. 1-15.
Federal Register, vol. 63, No. 25, dated Feb. 6, 1998, Notices, pp. 6247-6249, re SR-CBOE-97-66.
The Chicago Board Options Exchange, Regulatory Bulletin, Feb. 25, 1998, vol. RB9, No. 4, pp. 1-15.
The Chicago Board Options Exchange, Regulatory Bulletin, Feb. 11, 1998, vol. RB9, No. 3, pp. 1-20.
Letter to Richard Strasser of the SEC from Stephanie C. Mullins, the Chicago Board Options Exchange, dated Jul. 27, 1999, re Amendment 2 to SR-CBOE-98-53 including Exhibit A, Chicago Board Options Exchange, Inc. Rules, Chapter VIII—Market-Makers, Trading Crowds and Modified Trading Systems, Section B: Trading Crowds, 4 pages.
Handwritten Notes dated Jan. 6, 1998, re Connie Kigins, Sonia Patton, and SR-CBOE-98-53, author unknown.
Federal Register, vol. 64, No. 154, dated Aug. 11, 1999, Notices, pp. 43793-43795, re SR-CBOE-98-53.
The Chicago Board Options Exchange, Regulatory Bulletin, vol. RB10, No. 35, dated Aug. 27, 1999, pp. 1-8.
The Chicago Board Options Exchange, Regulatory Bulletin, vol. RB10, No. 1, dated Jan. 4, 1999, pp. 1-8.
Letter to Gordon Fuller of the SEC from Timothy Thompson, the Chicago Board Options Exchange, dated Sep. 29, 2000, re Amendment No. 1 to SR-CBOE-99-51 including Exhibit A, Chapter VIII—Market-Makers, Trading Crowds and Modified Trading Systems, Section B: Trading Crowds, 3 pages.
Letter to Michael Walinskas of the SEC from Nancy L. Nielsen, the Chicago Board Options Exchange, dated Aug. 31, 1999, re SR-CBOE-99-51 including File No. SR-CBOE-99-51, entitled "Securities and Exchange Commission Form 19b-4 Proposed Rule Change by Chicago Board Options Exchange", pp. 1-18.
E-Mail to thomptim@cboe.com from PatelS@sec.gov, dated Nov. 6, 2000, re CBOE-99-51 including Chapter VII—Market-Makers, Trading Crowds and Modified Trading Systems, Section B: Trading Crowds.
E-Mail to Tim Thompson from Karen Calvin dated Jun. 27, 2000, re 8.51.03.
Handwritten Notes dated Sep. 27, 2000, re John Roeser, Gordon Fuller, and File 99-51, 1 page author unknown.
Handwritten Notes dated Oct. 30, 2000, re 99-51, Gordon Fuller, and Supna Patel, author unknown.
"RealTrade: Trading Guide", Townsend Analytics, Ltd., TAL Trading Tools, Edition 2.1, Jul. 1999, 64 pages.
"Quotron's Open Windows: Q1000 Data for PC Users", Trading Systems Technology, Oct. 10, 1988, 3 pages.
"SIA Technology Shows Bucks Down Market: Blue Smoke and Mirrors at Hilton Bash", Trading Systems Technology, Feb. 15, 1988, 4 pages.
"Slim Pickin's at Fincom: A Vegas Trade Show in NYC", Trading Systems Technology, Jul. 18, 1988, 3 pages.
"From Airline Tickets to Human Organs, the Electronic Markets are Booming" by Clifford Carlsen, San Francisco Business Times, vol. 3 No. 50 Sec 1 p. 17, Aug. 14, 1989.
"Breathing Liffe into Futures", Banking Technology, Apr. 1989, pp. 46-47.
"Benefiting the Broker, FCM, and Customer", Broker Workstation, Chicago Board of Trade, 1990, 6 pages.
"Soffex User Device Operation and Administration Manual" Soffex, Oct. 15, 1990, 1 page.
"EJV Snares Sanction for Autotrade System", Bond Week: A Publication of Institutional Investor, vol. 27 No. 16, Apr. 22, 1991.
"Data Exchange, Salomon Launch Equities Order-Routing System", Trading Systems Technology, Jul. 29, 1991, 2 pages.
"Financial Technology Corp. Unveils Basket Trading System", Trading Systems Technology, Jun. 17, 1991, 2 pages.
"LIT Uses Beats to Route Orders to NYSE's Superdot", Trading Systems Technology, Jul. 29, 1991, 3 pages.
"TST Interviews Bob McFarlane, Head of Consultants Interport", Trading Systems Technology, Jul. 1, 1991, 6 pages.
"Member System Overview" Soffex, Feb. 14, 1991, 1 page.
"CBIC/Wood Gundy Proprietary Traders Lead the Way for 275-Position Room", Trading Systems Technology, Jul. 13, 1992, 3 pages.
"Reuters Buys Chunk of Effix; Expands Triach/Effic Line", Trading Systems Technology, Jun. 15, 1992, 4 pages.
The "Mesa User's Guide" (Beta Release); Jul. 1992, 111 pages.
"Automating German Equity Trading: Bid-Ask Spreads on Competing Systems" by Harmut Schmidt and Peter Iversen, Journal of Financial Services Research, 1992, p. 373-397.
"J.P. Morgan Selects Unix for Program-Trading Group", Trading Systems Technology, Apr. 20, 1992, 3 pages.
"NIKKO N.Y. Taps Davidge, Sun for Equities Trading Systems", Trading Systems Technology, Apr. 20, 1992, 2 pages.
"Chaos Hits Wall Street: An investment firm is ready to bet hundreds of millions that arcane mathematics can give the bulls and bears a run for the money" by David Berreby, Discover, Mar. 1993, 8 pages.
"Can Chaos Beat the Market? Connecting the Dots" by Jim Jubak, Worth, Mar. 1993, 4 pages.
"Selling a Peek Into Future" by Bob Hagan, Albuquerque Journal, p. 3 Section C, Jun. 13, 1993.
Federal Register, vol. 58, No. 249, dated Dec. 30, 1993, pp. 69419-69430.
Charles Schwab Street Smart: Getting Started, 1994, 30 pages.
WOSA Extensions for Real-Time Market Data, Backgrounders and White Paper—Microsoft Development Library, Jan. 1994.
"Get Smart About Chaos" by Mark Etzkorn, Trading Techniques, Futures Magazine, May 1995, pp. 38-40.
"Identifying Buyer Market Areas and the Impact of Buyer Concentration in Feeder Cattle Markets Using Mapping and Spatial Statistics" by DeeVon Bailey et al., Amer. J. Agr. Econ. vol. 77, pp. 309-318, May 1995.
"Predicting the Future: Local Firm's Software Helps Make Order Out of Chaos" by Bob Quick, The New Mexican, Section F, p. F1 and F5, Jul. 23, 1995.

(56) References Cited

OTHER PUBLICATIONS

"Local Exchange and Trading Systems: A New Source of Work and Credit for the Poor and Unemployed?" by C. C. Williams, Environment and Planning, vol. 28 No. 8, pp. 1395-1415, Aug. 1996.

"Local Exchange and Trading Systems in the United Kingdom: A Case of Re-Embedding" by L. Thorne, Environment and Planning, vol. 28 No. 8, pp. 1361-1376, Aug. 1996.

"The World According Norman Packard", Derivatives Strategy, Dec./Jan. 1996, pp. 30-34.

"On the Possibility of Hedging Options in the Presence of Transaction Costs" by Shlomo Leventhal & Anatolii V. Skorohod, The Annals of Applied Probability, vol. 7 No. 2, pp. 410-443, May 1997.

Section 2320, Best Execution and Interpositioning, NASD Manual & Notices to Members, 1998.

"Electronic Trading on Futures Exchanges" by Asani Sarkar and Michelle Tozzi, Current Issues in Economics and Finance, Federal Reserve Bank of New York, vol. 4 No. 1, Jan. 1998.

"Intermarket Trading System ('ITS') Plan; Proposed Amendments to Expand the ITS/Computer Assisted Execution System Linkage to All Listed Securities and to Eliminate the Unanimous Volte Provision"; Federal Register, vol. 63, No. 146, dated Jul. 30, 1998; Securities and Exchange Commission; Release No. 34-40260; File No. 4-208]; pp. 40748-40759.

"Self-Regulatory Organizations; Notice of Filing of Proposed Rule Change & Amendment No. 1 by the Pacific Exchange, Inc."; Federal Register, vol. 63 No. 263, dated Dec. 9, 1998; Securities and Exchange Commission; Release No. 34-40734; File No. SR-PCX-98-55; pp. 67971-67972.

"5th Market to Establish New ECN for Derivatives Trading in Early 2000; 5th Market Announces Completion of Equity Financing", PR Newswire, Aug. 27, 1999.

"Foreign Currency Hedges: Hedging Foreign-Currency Denominated Interest Payments", Financial Accounting Standards Board: Derivative Implementation Group, 1999.

"J.P. Morgan, Pricewaterhouse Coopers Propose FpML, a new e-commerce standard", FpML Press Release, Jun. 9, 1999, available at http://xml.coverpages.org/fpml-press9906.html.

"Mesirow 'Black Box' Integrates Order Routing on ADP T1 Network", Wall Street Network News, May 7, 1993.

"Open outcry and electronic trading in futures exchanges" by Ray Tsang, Bank of Canada Review, Spring 1999.

"Animals of Finance: Black Box" by Thomas A. Bass, The New Yorker: The Money Issue, Apr. 26, 1999, pp. 114-129.

Excerpts of the Hull Group, Inc. Form S-1/A filed with the Securities Exchange Commission on Jul. 6, 1999; 151 pages.

Excerpts of the Hull Group, Inc. Form S-1/A filed with the Securities Exchange Commission on Jun. 22, 1999; 232 pages.

The "Orc 2.3 Introduction Manual", 2000, 30 pages.

"Money From Chaos: Are nature's hidden patterns a key to investing?", Time Bonus Section, Your Business, May 2001, 1 Page.

"Errors in Implied Volatility Estimation" by Ludger Hentschel, "The Journal of Financial and Quantitative Analysis," vol. 38 No. 4, Dec. 2003, pp. 779-810.

"Day Trading Strategies, Strategy 1: Breakout", tradetrek.com, available at http://www.tradetrek.com/education/Day_Trading/breakouts.asp.

"Fundamental Analysis", tradetrek.com, http://web.archive.org/web/20000303081938/http://tradetrek.com/fundanalysis/default.asp.

The Barclays and UBS Defendants' Memorandum in Support of Their Renewed Motion to Bifurcate Patent Invalidity and Unenforceability from Alleged Infringement and Damages, *Edge Capture LLC* and *Edge Specialists, LLC* v. *Barclays Bank PLC et al.*, (1:09-cv-01521—US DC for the Northern District of IL), Mar. 4, 2011.

Declaration of Jeffrey G. Randall in Support of the Barclays and UBS Defendants' Memorandum in Support of Their Renewed Motion to Bifurcate Patent Invalidity and Unenforceability from Alleged Infringement and Damages, *Edge Capture LLC* and *Edge Specialists, LLC* v. *Barclays Bank PLC et al.*, (1:09-cv-01521—US DC for the Northern District of IL), Mar. 4, 2001, including only Exhibits 11, 12, 13, 42 and 43.

Real-Time Object-Oriented Database Support for Program Stock Trading, Victor Fay-Wolfe et al, University of Rhode Island, Technical Report, TR93-214, Jun. 1993.

Citadel's 42(b) Motion to Bifurcate the Issues of Invalidity and Unenforceability, *Edge Capture LLC* and *Edge Specialists, LLC* v. *Citadel Investment Group and Citadel Derivatives Group LLC*, (1:07-cv-04648—US DC for the Northern District of IL), Oct. 17, 2007.

Order Denying Citadel's Motion to Bifurcate, *Edge Capture LLC* and *Edge Specialists, LLC* v. *Citadel Investment Group and Citadel Derivatives Group LLC*, (1:07-cv-04648—US DC for the Northern District of IL), Oct. 26, 2007.

Citadel's Answers and Counterclaims, *Edge Capture LLC* and *Edge Specialists, LLC* v. *Citadel Investment Group and Citadel Derivatives Group LLC*, (1:07-cv-04648—US DC for the Northern District of IL), Nov. 13, 2007.

Plaintiffs' Reply to Counterclaims, *Edge Capture LLC* and *Edge Specialists, LLC* v. *Citadel Investment Group and Citadel Derivatives Group LLC*, (1:07-cv-04648—US DC for the Northern District of IL), Dec. 4, 2007.

Join Status Report, *Edge Capture LLC* and *Edge Specialists, LLC* v. *Citadel Investment Group and Citadel Derivatives Group LLC.*, (1:07-cv-04648—US DC for the Northern District of IL), Jan. 2, 2008.

Stipulation for Dismissal with Prejudice and [Proposed] Order Thereon, *Edge Capture LLC* and *Edge Specialists, LLC* v. *Citadel Investment Group and Citadel Derivatives Group LLC.*, (1:07-cv-04648—US DC for the Northern District of IL), Feb. 4, 2008.

Signed Order Dismissing the Case with Prejudice, *Edge Capture LLC* and *Edge Specialists, LLC* v. *Citadel Investment Group and Citadel Derivatives Group LLC.*, (1:07-cv-04648—US DC for the Northern District of IL), Feb. 25, 2008.

Plaintiffs' Memo of Law in Opposition to Defendants' Motion to Dismiss for Failure to State a Claim or, Alternatively, to Bifurcate Patent Invalidity and Unenforceability from Infringement and Damages, *Edge Capture LLC* and *Edge Specialists, LLC* v. *Lehman Brothers Inc.*, (1:08-cv-024121—US DC for the Northern District of IL), Jul. 1, 2008.

Plaintiffs' Corrected Appendix of Unpublished Authorities Cited in Plaintiffs' Memo in Opposition to Defendants' Motion To Dismiss, *Edge Capture LLC* and *Edge Specialists, LLC* v. *Lehman Brothers Holdings Inc.*, (1:08-cv-02412—US DC for the Northern District of IL), Jul. 1, 2008.

Defendants' Reply Memo in Support of Their Motion to Dismiss,*Edge Capture LLC* and *Edge Specialists, LLC* v. *Lehman Brothers Holdings Inc. and Lehman Brothers Inc.*, (1:08-cv-02412—US DC for the Northern District of IL), Jul. 15, 2008.

Declaration of Jeffrey G. Randall in Support of Defendants Motion to Dismiss, *Edge Capture LLC* and *Edge Specialists, LLC* v. *Lehman Brothers Holdings Inc. and Lehman Brothers Inc.*, (1:08-cv-02412—US DC for the Northern District of IL), Jul. 15, 2008.

Order Denying Defendants' Motion to Dismiss, *Edge Capture LLC* and *Edge Specialists, LLC* v. *Lehman Brothers Holdings Inc. and Lehman Brothers Inc.*, (1:08-cv-02412—US DC for the Northern District of IL), Aug. 28, 2008.

Memorandum Opinion and Order, *Edge Capture LLC* and *Edge Specialists, LLC* v. *Lehman Brothers Holdings Inc. and Lehman Brothers Inc.*, (1:08-cv-02412—US DC for the Northern District of IL), Aug. 28, 2008.

Plaintiffs' Notice of Voluntary Dismissal, *Edge Capture LLC* and *Edge Specialists, LLC* v. *Lehman Brothers Holdings Inc. and Lehman Brothers Inc.*, (1:08-cv-02412—US DC for the Northern District of IL), Dec. 17, 2008.

Notification of Docket Entry, Order Closing Case, *Edge Capture LLC* and *Edge Specialists, LLC* v. *Lehman Brothers Holdings Inc. and Lehman Brothers Inc.*, (1:08-cv-02412—US DC for the Northern District of IL), Dec. 18, 2008.

Complaint, *Edge Capture LLC* and *Edge Specialists, LLC* v. *Barclays Bank PLC et al.*, (1:09-cv-01521—US DC for the Northern District of IL), Mar. 10, 2009.

Defendants' Motion to Dismiss or Bifurcate, *Edge Capture LLC* and *Edge Specialists, LLC* v. *Barclays Bank PLC et al.*, (1:09-cv-01521—US DC for the Northern District of IL), Jun. 5, 2009.

(56) References Cited

OTHER PUBLICATIONS

Barclays and UBS Memo in Support to Dismiss or, Bifurcate, *Edge Capture LLC* and *Edge Specialists, LLC* v. *Barclays Bank PLC et al.*, (1:09-cv-01521—US DC for the Northern District of IL), Jun. 5, 2009.
Declaration of Jeffrey Randall re Motion to Dismiss or, Bifurcate, *Edge Capture LLC* and *Edge Specialists, LLC* v. *Barclays Bank PLC et al.*, (1:09-cv-01521—US DC for the Northern District of IL), Jun. 5, 2009, Part 1, pp. 1-259.
Declaration of Jeffrey Randall re Motion to Dismiss or, Bifurcate, *Edge Capture LLC* and *Edge Specialists, LLC* v. *Barclays Bank PLC et al.*, (1:09-cv-01521—US DC for the Northern District of IL), Jun. 5, 2009, Part 2, pp. 260-525.
Plaintiffs' Memo in Opposition to Defendants' Motion to Dismiss or, Bifurcate, *Edge Capture LLC* and *Edge Specialists, LLC* v. *Barclays Bank PLC et al.*, (1:09-cv-01521—US DC for the Northern District of IL), Jul. 6, 2009.
Wolverine's Motion to Dismiss or, Join Co-Defendants' Motion to Bifurcate, *Edge Capture LLC* and *Edge Specialists, LLC* v. *Barclays Bank PLC et al.*, (1:09-cv-01521—US DC for the Northern District of IL), Jul. 6, 2009.
Wolverine's Memo in Support of Motion to Dismiss or, Join Co-Defendant's Motion to Bifurcate, *Edge Capture LLC* and *Edge Specialists, LLC* v. *Barclays Bank PLC et al.*, (1:09-cv-01521—US DC for the Northern District of IL), Jul. 6, 2009.
Barclays and UBS Reply Memo in Support of Their Motion to Dismiss or Bifurcate,*Edge Capture LLC* and *Edge Specialists, LLC* v. *Barclays Bank PLC et al.*, (1:09-cv-01521—US DC for the Northern District of IL), Jul. 20, 2009.
Wolverine's Motion to Continue the Deadline for the Parties to Submit an Agreed Discovery Schedule, *Edge Capture LLC* and *Edge Specialists, LLC* v. *Barclays Bank PLC et al.*, (1:09-cv-01521—US DC for the Northern District of IL), Jul. 21, 2009.
Defendants' Memo in Support of Their Motion to Continue the Discovery Deadline for the Parties to Submit an Agreed Discovery Schedule, *Edge Capture LLC* and *Edge Specialists, LLC* v. *Barclays Bank PLC et al.*, (1:09-cv-01521—US DC for the Northern District of IL), Jul. 21, 2009.
Plaintiffs' Memo in Opposition to Motion to Continue the Discovery Deadline for the Parties to Submit an Agreed Discovery Schedule, *Edge Capture LLC* and *Edge Specialists, LLC* v. *Barclays Bank PLC et al.*, (1:09-cv-01521—US DC for the Northern District of IL), Jul. 23, 2009.
Wolverine's Reply in Support of Their Motion to Continue the Deadline for the Parties to Submit an Agreed Discovery Schedule, *Edge Capture LLC* and *Edge Specialists, LLC* v. *Barclays Bank PLC et al.*, (1:09-cv-01521—US DC for the Northern District of IL), Jul. 23, 2009.
Minute Entry by Hon. C. Norgle Granting Defendants' Motion to Continue the Deadline, *Edge Capture LLC* and *Edge Specialists, LLC* v. *Barclays Bank PLC et al.*, (1:09-cv-01521—US DC for the Northern District of IL), Jul. 24, 2009.
Plaintiffs' Memo in Opposition to Defendants' Motion to Dismiss or, Bifurcate, *Edge Capture LLC* and *Edge Specialists, LLC* v. *Barclays Bank PLC et al.*, (1:09-cv-01521—US DC for the Northern District of IL), Jul. 24, 2009.
Wolverine's Reply to Plaintiffs' Memo in Opposition to Motion to Dismiss, *Edge Capture LLC* and *Edge Specialists, LLC* v. *Barclays Bank PLC et al.*, (1:09-cv-01521—US DC for the Northern District of IL), Aug. 7, 2009.
Reply by Wolverine to Plaintiffs' Memo in Opposition to Motion to Dismiss, *Edge Capture LLC* and *Edge Specialists, LLC* v. *Barclays Bank PLC et al.*, (1:09-cv-01521—US DC for the Northern District of IL), Aug. 12, 2009.
Wolverine's Response in Opposition to Plaintiffs' Motion for Leave to File Sur-Reply to Motion to Dismiss, *Edge Capture LLC* and *Edge Specialists, LLC* v. *Barclays Bank PLC et al.*, (1:09-cv-01521—US DC for the Northern District of IL), Aug. 13, 2009.
Notification of Docket Entry, Minute Entry Granting Plaintiffs' Motion for Leave to File Sur-Reply to Motion to Dismiss, *Edge Capture LLC* and *Edge Specialists, LLC* v. *Barclays Bank PLC et al.*, (1:09-cv-01521—US DC for the Northern District of IL), Aug. 13, 2009.
Plaintiffs' Sur-Reply to Defendants' Motion to Dismiss, *Edge Capture LLC* and *Edge Specialists, LLC* v. *Barclays Bank PLC et al.*, (1:09-cv-01521—US DC for the Northern District of IL), Aug. 14, 2009.
Minute Entry Denying Defendants' Motion to Dismiss, *Edge Capture LLC* and *Edge Specialists, LLC* v. *Barclays Bank PLC et al.*, (1:09-cv-01521—US DC for the Northern District of IL), Oct. 20, 2009.
Amended Complaint, *Edge Capture LLC* and *Edge Specialists, LLC* v. *Barclays Bank PLC et al.*, (1:09-cv-01521—US DC for the Northern District of IL), Dec. 4, 2009.
Barclays & UBS's Motion to Dismiss or Stay the Proceeding Pending Bilski Decision, *Edge Capture LLC* and *Edge Specialists, LLC* v. *Barclays Bank PLC et al.*, (1:09-cv-01521—US DC for the Northern District of IL), Dec. 18, 2009.
Wolverine's Motion to Dismiss or Stay the Proceedings Pending Bilski Decision, *Edge Capture LLC* and *Edge Specialists, LLC* v. *Barclays Bank PLC et al.*, (1:09-cv-01521—US DC for the Northern District of IL), Dec. 21, 2009.
Wolverine's Memo in Support of Motion to Dismiss or Stay Proceedings, *Edge Capture LLC* and *Edge Specialists, LLC* v. *Barclays Bank PLC et al.*, (1:09-cv-01521—US DC for the Northern District of IL), Dec. 21, 2009.
Plaintiffs' Memo in Opposition to Wolverine's Motion to Dismiss or Stay Proceedings, *Edge Capture LLC* and *Edge Specialists, LLC* v. *Barclays Bank PLC et al.*, (1:09-cv-01521—US DC for the Northern District of IL), Jan. 15, 2010.
Plaintiffs' Response to Barclays and UBS Motion to Dismiss or Stay Proceedings, *Edge Capture LLC* and *Edge Specialists, LLC* v. *Barclays Bank PLC et al.*, (1:09-cv-01521—US DC for the Northern District of IL), Jan. 15, 2010.
Wolverine's Reply in Support of Motion to Dismiss, or, in the Alternative, to Stay Pending Resolution of *Bilski* v. *Doll*, *Edge Capture LLC* and *Edge Specialists, LLC* v. *Barclays Bank PLC et al.*, (1:09-cv-01521—US DC for the Northern District of IL), Jan. 29 2010.
Barclays and UBS Reply Memo in Support of Motion to Dismiss or, Alternatively, to Stay All Proceedings Pending Resolution of *Bilski* v. *Doll*, *Edge Capture LLC* and *Edge Specialists, LLC* v. *Barclays Bank PLC et al.*, (1:09-cv-01521—US DC for the Northern District of IL), Jan. 29, 2010.
Court Order Granting Wolverine's Motion to Stay All Proceedings Pending US Supreme Court Decision in *Bilski*, *Edge Capture LLC* and *Edge Specialists, LLC* v. *Barclays Bank PLC et al.*, (1:09-cv-01521—US DC for the Northern District of IL), Mar. 5, 2010.
Defendants' Memo in Support of Motion to Dismiss or Stay Proceedings, *Edge Capture LLC* and *Edge Specialists, LLC* v. *Barclays Bank PLC et al.*, (1:09-cv-01521—US DC for the Northern District of IL), Dec. 18, 2009, Part 1, pp. 1-134.
Defendants' Memo in Support of Motion to Dismiss or Stay Proceedings, *Edge Capture LLC* and *Edge Specialists, LLC* v. *Barclays Bank PLC et al.*, (1:09-cv-01521—US DC for the Northern District of IL), Dec. 18, 2009, Part 2, pp. 135-263.
Victor Fay Wolfe et al., "Real-Time Object-Oriented Database Support for Intelligent Program Stock Trading", in "The Second Annual International Conference on Artificial Applications on Wall Street: Tactical & Strategic Technologies" (Dr. Roy S. Freedman eds., Apr. 19-22, 1993).
David H. Freedman, "Enter the Market Merlins", Forbes ASAP, Oct. 25, 1993, pp. 38-41.
Daniel Friedman & John Rust eds., "The Double Auction Market: Institutions, Theories & Evidence", Proceedings of the Workshop on Double Auction Markets Held Jun. 1991, vol. XIV, 1993.
Ryan Garvey & Fei Wu, "Speed, Distance, and Electronic Trading: New Evidence on Why Location Matters", date unknown, available at http://papers.ssrn.com/sol3/papers.cfm?abstract_id=1335028.
Ryan Garvey & Fei Wu, "Do Location Advantages Exist for Trading U.S. Equities?", date unknown, available at http://papers.ssrn.com/sol3/papers.cfm?abstract_id=1140482.
Robert Geske & H.E. Johnson, "The American Put Option Valued Analytically", The Journal of Finance, vol. 39, No. 5, Dec. 1984.

(56) References Cited

OTHER PUBLICATIONS

Robert Geske & Kuldeep Shastri, "Valuation by Approximation: A Comparison of Alternative Option Valuation Techniques", The Journal of Financial and Quantitative Analysis, vol. 20, No. 1, Mar. 1985.
Asim Ghosh, "Cross-Hedging Foreign Currency Risk: Empirical Evidence form an Error Correction Model", Review of Quantitative Finance and Accounting, vol. 6, 1996, pp. 223-231.
Ann Goodman, "Are Markets as Messy as They Look?", Wall Street & Technology, vol. 9 No. 9, May 1992.
Alan J. Chapman, "Stock Market Trading Systems Through Neural Networks: Developing a Model", in "International Journal of Applied Expert Systems", vol. 2 No. 2 (Taylor Graham eds., 1994).
Allan D. Grody et al., "Global Electronic Markets: A Preliminary Report of Findings", Department of Information Systems, Stern School of Business, New York University, STERN IS-95-18, May 31, 1994.
Randy L. Grossman, "Algorithmic Trading: Brokers Race to Mediocrity", Securities Industry News, Oct. 25, 2004.
Vijay Gurbaxani & Seungjin Whang, "The Impact of Information Systems on Organizations and Markets", Communications of the ACM, vol. 34 No. 1, Jan. 1991.
Brent Hailpern & Gail E. Kaiser, "An Architecture for Dynamic Reconfiguration in a Distributed Object-Based Programming Language", Feb. 23, 1993, 35 pages.
Erik Haites & Fiona Mullins, "Linking Domestic and Industry Greenhouse Gas Emission Trading Systems", Prepared for Electric Power Research Institute (EPRI), International Energy Agency (IEA) and International Emissions Trading Association, Oct. 2001.
Nils H. Hakansson et al., "On the Feasibility of Automated Market Making by a Programmed Specialist", The Journal of Finance, vol. 40 No. 1, Mar. 1985, pp. 1-20.
Yasushi Hamao & Joel Hasbrouck, "Securities Trading in the Absence of Dealers: Trades, and Quotes on the Tokyo Stock Exchange", The Review of Financial Studies, Fall 1995, vol. 8 No. 3, pp. 849-878.
Lawrence E. Harris, "Monograph Series in Finance and Economics: Liquidity, Trading Rules, and Electronic Trading Systems", New York University Salomon Center, Leonard N. Stern School of Business, 1990.
Robert J. Hauser & James S. Eales, "Option Hedging Strategies", North Central Journal of Agricultural Economics, vol. 9 No. 1, Jan. 1987, pp. 123-134.
Thomas Hellström, "Predicting Stock Prices", Power Point Presentation at the Riga Workshop, Nov. 28-29, 1997.
Thomas Hellström, "Power Presentation: Optimizing the Sharpe Ratio for a Rank-Based Trading System", Power Point Presentation at the 10th Portuguese Conference on Artificial Intelligence, AIFTSA Workshop: Artificial Intelligence Techniques for Financial Time Series Analysis, Dec. 2001.
Stephan Heuer et al., "Invest: An Expert System for Financial Investments", IEEE Expert, vol. 3 No. 2, Summer 1988, pp. 60-68.
Jacqueline Huang, "American Options and Complementarity Problems", Dissertation at the Johns Hopkins University, UMI No. 9950539, Aug. 1999, 149 pages.
Jacqueline Huang & Jong-Shi Pang, "Option Pricing and Linear Complementarity", Journal of Computational Finance, vol. 2 No. 3, 1998.
James M. Hutchinson et al., "A Nonparametric Approach to Pricing and Hedging Derivative Securities Via Learning Networks", Massachusetts Institute of Technology Artificial Intelligence Laboratory & Center for Biological and Computational Learning, A.I. Memo No. 1471, C.B.C.L. Paper No. 92, Apr. 1994.
T. Huynh & C. Lassez, "An Expert Decision—Support System for Option—Based Investment Strategies", Computers Math. Applic., vol. 20 No. 9 10, pp. 1-14, 1990.
Jens Carsten Jackwerth, "Generalized Binomial Trees", May 12, 1997, 16 pages.
George H. John et al., "Stock Selecting Using ReconTM/SM", in "Neural Networks in Financial Engineering", pp. 303-316, World Scientific, London, (Y. Abu-Mostafa et al. eds., 1996).

George Johnson, "Sifting Hidden Market Patterns for Profit", The New York Times, Sep. 11, 1995, pp. C1 and C6-C7.
Sam Johnson, "Fix 4.1 Specification Draft is Available", FIX Protocol Organization, Jan. 28, 1998, available at http://www.fixprotocol.org/discuss/read/33ed5258.
C.M. Jones, "Automated Technical Foreign Exchange Trading with High Frequency Data", Centre for Financial Research, Judge Institute of Management Studies & St. John's College, University of Cambridge, Jun. 1999, Dissertation.
Carol Jouzaitis, "Tiny Intex Still Awaits Big Break", the Chicago Tribune, Jul. 13, 1987, Section 4 pp. 3-4.
Kirk Kandt & Paul Yuenger, "A Financial Investment Assistant", Proceedings of the Twenty-First Annual Hawaii International Conference on System Sciences, vol. 3, 1988.
Dave Kansas, "OptiMark Technologies to Announce Trading System Aimed at Institutions", The Wall Street Journal, Sep. 24, 1996.
Kevin Kelly, "Cracking Wall Street", Wired, Jul. 1994, pp. 93-95 and 132-136.
Alexander Kempf & Olaf Korn, "Trading System and Market Integration", Journal of Financial Intermediation, vol. 7 Issue 3, Jul. 1998, pp. 220-239.
David Kline et al., "The Treatment of Biomass Fuels in Carbon Emissions Trading Systems", Center for Clean Air Policy, Mar. 1998, 9 pages.
Paul Kofman & James T. Moser, "Spreads, information flows and transparency, across trading systems", Applied Financial Economics, vol. 7, pp. 281-294, 1997.
Jonathan R. Laing, "New Brains: How smart computers are beating the stock market", Barron's, Feb. 27, 1995, pp. 29-32.
Glen A. Larsen, Jr. & Gary R. Freeman, "Hedging Foreign Currency Transaction Exposure: The Importance of Real Rates of Interest", Journal of Financial and Strategic Decisions, vol. 9 No. 1, Spring 1996.
Catherine Lassez et al., "Constraint Logic Programming and Option Trading", IEEE Expert, vol. 2 Issue 3, Sep. 1987.
Ho Geun Lee, "Intelligent Order Matching Systems for Commodity Markets", Intelligent Systems in Accounting, Finance, and Management, vol. 4, pp. 1-12, 1995.
David J. Leinweber & Yossi Beinart, "A Little Artificial Intelligence Goes a Long Way on Wall Street", The Journal of Portfolio Management, Winter 1996, pp. 95-106.
Hugues Levecq & Bruce W. Weber, "Electronic Trading Systems: Strategic Implications of Market Design", Department of Information Systems Stern School of Business, New York University, STERN #IS-95-19, Mar. 3, 1995.
Roger Lewin, "Marking maths make money", New Scientist, No. 1816, Apr. 11, 1992, pp. 31-34.
Claudia Loebbecke, "Electronic Trading in On-line Delivered Content", Proceedings of the Thirty Second Hawaii International Conference on System Sciences, 1999.
Kalman J. Cohen & Robert A Schwartz, "An Electronic Call Market: Its Design and Desirability", in "The Challenge of Information Technology for the Securities Markets: Liquidity, Volatility, and Global Trading", The Center for Research on Information Systems & The Salomon Brothers Center for the Study of Financial Institutions (Henry C. Lucas, Jr. & Robert A. Schwartz, eds., 1989).
Louis P. Lukac et al., "Similarity of Computer Guided Technical Trading Systems", The Journal of Futures Markets, vol. 8 No. 1, pp. 1-13, 1988.
Ananth Madhavan, "Market Microstructure: A Survey", Journal of Financial Markets, vol. 3, pp. 205-258, Mar. 16, 2000.
Craig McGuire, "The Next Level of Proprietary Protection", Wall Street & Technology, vol. 17 Issue 1, Jan. 1999, p. 52.
AQTOR-Automated Quoting and Trading of Risk by Actant.
AQTOR Reference Manual by Actant.
AQTOR Version 3.14 Reference Manual by Actant.
Belzberg Financial Market and News, Inc. Centre Pane, available at http://www.bfmni.com/centre_pane.html (last visited Jul. 12, 1999) (no longer available).
Letter to the Members of DTB Deutsche Terminhorse from Dr. Jorg Franke and Thomas Whal, entitled "Implementation Regulations of DTB for Technical Facilities/Rules Applying to Utilization of Quote Machines and Electronic Eyes," dated Nov. 21, 1996, 3 pages.

(56) References Cited

OTHER PUBLICATIONS

EasyScreen Product Guide, EasyScreen Inc., 20 pgs.
Flextrade Documents submitted by Defendant Wolverine in *Edge Specialists, LLC* v. *Barclays Bank PLC et al.*, (1:09-cv-01521—US DC for the Northern District of IL), 3 pgs.
Flextrade Equity Trading Systems, 3 pgs, Flextrade Systems Inc.
Flextrade: Real Time Equity Trading & Order Management Systems, System Details, 8 pgs., Flextrade Systems Inc.
Introducing Tradestation 3, Tradestation advertisement, order form, and printed materials, Omega Research Inc.
MicroHedge 4.0 User's Manual: Option Analytic and Risk Management Solutions, 108 pgs., 2000.
MicroHedge: The Options Analytics and Risk Management Choice: A Guide to Using, 120 pgs., 1998.
2.0 Auto Quote Requirements, 4 pages, Jul. 14, 1989.
David S. Ruder and Alden S. Adkins, Automation of Information Dissemination and Trading in the U.S. Securities Market, in U.S. Securities and Exchange Commission News Release, Remarks of David S. Ruder, Chairman, U.S. Securities and Exchange Commission, before the Annenberg Washington Program 1989 Forum on Technology and Financial Markets, on Feb. 27, 1989, 34 pgs.
RTD: Realtime Trading Desktop Manual, RTS Realtime Systems Group, 20 pgs.
Robert C. Merton, Applications of Option-Pricing Theory: Twenty-Five Years Later, The American Economic Review, vol. 88 No. 3, pp. 323-349, Jun. 1998.
Office Action from the United States Patent and Trademark Office, U.S. Appl. No. 09/417,774, 7 pgs., May 17, 2004.
Office Action from the United States Patent and Trademark Office, U.S. Appl. No. 09/417,774, 7 pgs., Aug. 1, 2002.
Interview Summary from the United States Patent and Trademark Office, U.S. Appl. No. 09/417,774, 4 pgs., Feb. 23, 2006.
Notice of Allowance from the United States Patent and Trademark Office, U.S. Appl. No. 09/417,774, 7 pgs., Feb. 24, 2006.
Interview Summary from the United States Patent and Trademark Office, U.S. Appl. No. 09/618,222, 3 pgs., Feb. 15, 2006.
Office Action from the United States Patent and Trademark Office, U.S. Appl. No. 09/618,222, 6 pgs., Jan. 28, 2004.
Office Action from the United States Patent and Trademark Office, U.S. Appl. No. 09/618,222, 6 pgs., Aug. 27, 2003.
Xticket: Global Risk Trading Solutions Product Overview, 6 pgs.
Building the Future Together, RTS Realtime Systems, Product Overview, 7 pgs.
MicroHedge Option Analytic and Risk Management Solutions, Product Materials, 8 pgs.
Yakov Amihud and Haim Mendelson, An Integrated Computerized Trading System, in Market Making Changing Structure Securities Industry, pp. 217-235 (eds. Yakov Amihud, Thomas S.Y. Ho, Robert A. Schwartz, 1985).
Stephen L. Williams, The Evolving National Market System, in Market Making Changing Structure Securities Industry, pp. 257-268 (eds. Yakov Amihud, Thomas S.Y. Ho, Robert A. Schwartz, 1985).
Jeffry L. Davis, The Intermarket Trading System and The Cincinnati Experiment, in Market Making Changing Structure Securities Industry, pp. 269-283 (eds. Yakov Amihud, Thomas S.Y. Ho, Robert A. Schwartz, 1985).
Roger W. Marshall and Severin C. Carlson, Electronic Trading Systems: The User's Point of View, in Market Making Changing Structure Securities Industry, pp. 285-295 (eds. Yakov Amihud, Thomas S.Y. Ho, Robert A. Schwartz, 1985).
William A. Lupien, Star Wars Technology in Trading, in Market Making Changing Structure Securities Industry, pp. 301-303 (eds. Yakov Amihud, Thomas S.Y. Ho, Robert A. Schwartz, 1985).
CRT: The Trading Machine, in The New Market Wizards: Conversations with America's Top Traders, pp. 313-317 (ed. Jack D. Schwager, 2005).
Joe Ritchie, The Intuitive Theoretician, in The New Market Wizards: Conversations with America's Top Traders, pp. 342-362 (ed. Jack D. Schwager, 2005).

Blair Hull, Getting the Edge, in The New Market Wizards: Conversations with America's Top Traders, pp. 363-389 (ed. Jack D. Schwager, 2005).
Henry C. Lucas, Jr. & Robert A. Schwartz, eds., "The Challenge of Information Technology for the Securities Markets: Liquidity, Volatility, and Global Trading," The Center for Research on Information Systems & The Salomon Brothers Center for the Study of Financial Institutions (1989), Chapters 2-3, 9-10, 13, 15-17, and 19 (170 pages).
EasyOption User Guide, EasyScreen Inc., 21 pgs, 1998.
Remote Trader Workstation Manual Version 2.1.1, User Guide, Version 3.7, build 378+, Risk Information Systems & Consulting, L.L.C.: Traders Designing Software for Traders, 92 pages, 2000.
Lakshminarayana R. Talluru & Vedat Akgiray, Knowledge Representation for Investment Strategy Selection, in Proceedings of the Twenty-First Annual Hawaii International Conference on System Sciences: Decision Support and Knowledge Based Systems Track, vol. III, pp. 189-196 (ed. Benn R. Konsynski, The Computer Society Press of the IEEE, Oct. 4, 1988).
Real-Time Object-Oriented Database Support for Program Stock Trading, Victor Fay-Wolfe et al, pp. 3-17, vol. 5 No. 2, Journal of Database Management, Spring 1994.
George H. John & Peter Miller, Building Long/Short Portfolios Using Rule Induction, in Proceedings of the IEEE/IAFE 1996 Conference on Computational Intelligence for Financial Engineering, pp. 134-140, Mar. 24-26, 1996.
Allan D. Grody & Hugues Levecq, "Past, Present and Future: The Evolution and Development of Electronic Financial Markets", Center for Digital Economy Research, Stern School of Business, Working Paper Series: STERN IS-95-21, Nov. 1993.
Haug, Espen Gaarder, The Complete Guide to Option Pricing Formulas, pp. 1-34, 111-143, 165-178, 187-211 (McGraw-Hill, 1998).
PC Quote 6.0: Professional Real-time Quotes, Charts and Technical Analysis, available at http://web.archive.org/web/19981201232112/http://www.pcquote.com/pcwnew/table1.html (last visited on Dec. 21, 2011).
Standard & Poor's Comstock on the Net: Real-time Market Data with Unlimited Flexibility, available at http://web.archive.org/web/19980210175112/http://www.spcomstock.com (last visited on Dec. 21, 2011).
InterQuote Service Packages, available at http://web.archive.org/web/19980116230119/http://www.interquote.com/packages2.html (last visited on Dec. 21, 2011).
Introducing InterQuote 2.5: Download InterQuote!, available at http://web.archive.org/web/19980116225257/http://www.interquote.com/downld.html (last visited on Dec. 21, 2011).
InterQuote for Windows, available at http://web.archive.org/web/19980116230625/http://www.interquote.com/portfolios/Windows.html (last visited on Dec. 21, 2011).
The Inside Track on Pension Funds: Financial News—QT links with ICV, available at http://www.efnancialnews.com/story/1998-6-22/qt-links-with-icv (Jun. 22, 1998) (last visited on Dec. 21, 2011).
Univ. of RI: RTSORAC: Publications List, available at http://web.archive.org/web/19990419204933/http://homepage.cs.uri.edu/research/rtsorac/publications.html (Last updated Jun. 1997) (last visited on Dec. 21, 2011).
N. F. Maxemschuk & D.H. Shur, An Internet Multicast System for the Stock Market, available at the Cornell Library (http://arxiv.org/abs/cs/0002011) (Feb. 17, 2000).
Brad Adelberg et al., "Database Support for Efficiently Maintaining Derived Data", in Advances in Database Technology EDBT '96, 5th International Conference on Extending Databse Technology Avignon, France, Mar. 25-29, 1996 Proceedings, pp. 223-240 (eds. P. Apers et al., Springer-Verlag Berlin Heidelberg 1996).
Flextrade: Presenting . . . The most quantitative, F.I.X. complaint Institutional Equity Trading System, available at http://web.archive.org/web/19980529103322/http://www.flextrade.com (last visited on Dec. 22, 2011).
FlexTrade Systems, Inc.: FlexTRADER Overview, available at http://web.archive.org/web/19990508212935/http://www.flextrade.com/Flex_Trdr.htm (last visited on Dec. 22, 2011).

(56) References Cited

OTHER PUBLICATIONS

FlexTrade Systems, Inc.: Product Information, available at http://web.archive.org/web/19990508212027/http://www.flextrade.com/Flex_Prod.htm (last visited on Dec. 22, 2011).
PC Quote 6.0: Hardware Specifications, available at http://web.archive.org/web/19971121113837/http://www.pcquote.com/pcwnew/hardware.html (last visited on Dec. 21, 2011).
PC Quote 6.0: Fastest, Most Accurate Real-Time Data (HyperFeed), available at http://web.archive.org/web/19971121113908/http://www.pcquote.com/pcwnew/hyperfeed.html (last visited on Dec. 21, 2011).
PC Quote 6.0: Powerful Features That Are Easy to Use: Work in Excel, available at http://web.archive.org/web/19971121115839/http://www.pcquote.com/pcwnew/feat_excel.html (last visited on Dec. 21, 2011).
Court Order Granting Wolverine's Motion to Stay All Proceedings Pending US Supreme Court Decision in Bilski, *Edge Capture LLC and Edge Specialists, LLC* v. *Barclays Bank PLC et al.*, (1:09-cv-01521-US DC for the Northern District of IL), Mar. 5, 2010.
Motion by Edge to Lift Stay and Set Case Schedule, *Edge Capture LLC and Edge Specialists, LLC* v. *Barclays Bank PLC et al.*, (1:09-cv-01521—US DC for the Northern District of IL), Jun. 30, 2010.
Wolverine's Response to Edge's Motion to Lift Stay and Set Case Schedule, *Edge Capture LLC and Edge Specialists, LLC* v. *Barclays Bank PLC et al.*, (1:09-cv-01521—US DC for the Northern District of IL), Jul. 1, 2010.
Order Granting Edge's Motion to Lift Stay and Set Case Schedule, *Edge Capture LLC and Edge Specialists, LLC* v. *Barclays Bank PLC et al.*, (1:09-cv-01521—US DC for the Northern District of IL), Jul. 1, 2010.
Wolverine's Proposed Schedule, *Edge Capture LLC and Edge Specialists, LLC* v. *Barclays Bank PLC et al.*, (1:09-cv-01521—US DC for the Northern District of IL), Jul. 16, 2010.
Proposed Schedule by Barclays and UBS, *Edge Capture LLC and Edge Specialists, LLC* v. *Barclays Bank PLC et al.*, (1:09-cv-01521—US DC for the Northern District of IL), Jul. 16, 2010.
Edge's Proposed Schedule and Request for a Scheduling Conference, *Edge Capture LLC and Edge Specialists, LLC* v. *Barclays Bank PLC et al.*, (1:09-cv-01521—US DC for the Northern District of IL), Jul. 16, 2010.
Declaration of Pat Burns re Edge's Proposed Schedule and Request for a Scheduling Conference, *Edge Capture LLC and Edge Specialists, LLC* v. *Barclays Bank PLC et al.*, (1:09-cv-01521—US DC for the Northern District of IL), Jul. 16, 2010.
Minute Entry Denying Request for Scheduling Conference, *Edge Capture LLC and Edge Specialists, LLC* v. *Barclays Bank PLC et al.*, (1:09-cv-01521—US DC for the Northern District of IL), Jul. 23, 2010.
Wolverine's Motion to Dismiss Amended Complaint, *Edge Capture LLC and Edge Specialists, LLC* v. *Barclays Bank Plc et al.*, (1:09-cv-01521—US DC for the Northern District of IL), Aug. 13, 2010.
Barclays and UBS's Renewed Motion to Dismiss Amended Complaint, *Edge Capture LLC and Edge Specialists, LLC* v. *Barclays Bank PLC et al.*, (1:09-cv-01521—US DC for the Northern District of IL), Aug. 13, 2010.
Barclays and UBS's Memo in Support Renewed Motion to Dismiss Amended Complaint, *Edge Capture LLC and Edge Specialists, LLC* v. *Barclays Bank PLC et al.*, (1:09-cv-01521—US DC for the Northern District of IL), Aug. 13, 2010, Part 1, pp. 1-115
Barclays and UBS's Memo in Support Renewed Motion to Dismiss Amended Complaint, *Edge Capture LLC and Edge Specialists, LLC* v. *Barclays Bank PLC et al.*, (1:09-cv-01521—US DC for the Northern District of IL), Aug. 13, 2010, Part 2, pp. 116-230
Wolverine's Memo in Support of Motion to Dismiss Amended Complaint, *Edge Capture LLC and Edge Specialists, LLC* v. *Barclays Bank PLC et al.*, (1:09-cv-01521—US DC for the Northern District of IL), Aug. 13, 2010, Part 1, pp. 1-84
Wolverine's Memo in Support of Motion to Dismiss Amended Complaint, *Edge Capture LLC and Edge Specialists, LLC* v. *Barclays Bank PLC et al.*, (1:09-cv-01521—US DC for the Northern District of IL), Aug. 13, 2010, Part 2, pp. 85-166
Wolverine's Opposition to Motion for Leave to File a 30 Page Brief in Response to Defendants' Motion to Dismiss, *Edge Capture LLC and Edge Specialists, LLC* v. *Barclays Bank PLC et al.*, (1:09-cv-01521—US DC for the Northern District of IL), Sep. 3, 2010.
Barclays and UBS's Opposition to Plaintiffs' Motion for Leave to File a 30 Page Brief in Response to Defendants' Motions to Dismiss, *Edge Capture LLC and Edge Specialists, LLC* v. *Barclays Bank PLC et al.*, (1:09-cv-01521—US DC for the Northern District of IL), Sep. 7, 2010.
Order Denying Plaintiffs' Motion for Leave, *Edge Capture LLC and Edge Specialists, LLC* v. *Barclays Bank PLC et al.*, (1:09-cv-01521—US DC for the Northern District of IL), Sep. 9, 2010.
Plaintiffs' Motion for Leave plus Exhibits, *Edge Capture LLC and Edge Specialists, LLC* v. *Barclays Bank PLC et al.*, (1:09-cv-01521—US DC for the Northern District of IL), Sep. 3, 2010, Part 1, pp. 1-169.
Plaintiffs' Motion for Leave plus Exhibits, *Edge Capture LLC and Edge Specialists, LLC* v. *Barclays Bank PLC et al.*, (1:09-cv-01521—US DC for the Northern District of IL), Sep. 3, 2010, Part 2, pp. 170-340.
Plaintiffs' Motion for Leave plus Exhibits, *Edge Capture LLC and Edge Specialists, LLC* v. *Barclays Bank PLC et al.*, (1:09-cv-01521—US DC for the Northern District of IL), Sep. 3, 2010, Part 3, pp. 341-511.
Plaintiffs' Motion for Leave plus Exhibits, *Edge Capture LLC and Edge Specialists, LLC* v. *Barclays Bank PLC et al.*, (1:09-cv-01521—US DC for the Northern District of IL), Sep. 3, 2010, Part 4, pp. 512-682.
Plaintiffs' Motion for Leave plus Exhibits, *Edge Capture LLC and Edge Specialists, LLC* v. *Barclays Bank PLC et al.*, (1:09-cv-01521—US DC for the Northern District of IL), Sep. 3, 2010, Part 5, pp. 683-853.
Plaintiffs' Motion for Leave plus Exhibits, *Edge Capture LLC and Edge Specialists, LLC* v. *Barclays Bank PLC et al.*, (1:09-cv-01521—US DC for the Northern District of IL), Sep. 3, 2010, Part 6, pp. 854-1023.
Plaintiffs' Motion for Leave plus Exhibits, *Edge Capture LLC and Edge Specialists, LLC* v. *Barclays Bank PLC et al.*, (1:09-cv-01521—US DC for the Northern District of IL), Sep. 3, 2010, Part 7, pp. 1024-1184.
Plaintiffs' Memo of Law in Opposition to Barclays and UBS Renewed Motion to Dismiss the Amended Complaint, *Edge Capture LLC and Edge Specialists, LLC* v. *Barclays Bank PLC et al.*, (1:09-cv-01521—US DC for the Northern District of IL), Oct. 4, 2010, Part 1, pp. 1-165.
Plaintiffs' Memo of Law in Opposition to Barclays and UBS Renewed Motion to Dismiss the Amended Complaint, *Edge Capture LLC and Edge Specialists, LLC* v. *Barclays Bank PLC et al.*, (1:09-cv-01521—US DC for the Northern District of IL), Oct. 4, 2010, Part 2, pp. 166-331.
Plaintiffs' Memo of Law in Opposition to Barclays and UBS Renewed Motion to Dismiss the Amended Complaint, *Edge Capture LLC and Edge Specialists, LLC* v. *Barclays Bank PLC et al.*, (1:09-cv-01521—US DC for the Northern District of IL), Oct. 4, 2010, Part 3, pp. 332-497.
Plaintiffs' Memo of Law in Opposition to Barclays and UBS Renewed Motion to Dismiss the Amended Complaint, *Edge Capture LLC and Edge Specialists, LLC* v. *Barclays Bank PLC et al.*, (1:09-cv-01521—US DC for the Northern District of IL), Oct. 4, 2010, Part 4, pp. 498-663.
Plaintiffs' Memo of Law in Opposition to Barclays and UBS Renewed Motion to Dismiss the Amended Complaint, *Edge Capture LLC and Edge Specialists, LLC* v. *Barclays Bank PLC et al.*, (1:09-cv-01521—US DC for the Northern District of IL), Oct. 4, 2010, Part 5, pp. 664-829.
Plaintiffs' Memo of Law in Opposition to Barclays and UBS Renewed Motion to Dismiss the Amended Complaint, *Edge Capture LLC and Edge Specialists, LLC* v. *Barclays Bank PLC et al.*, (1:09-cv-01521—US DC for the Northern District of IL), Oct. 4, 2010, Part 6, pp. 830-995.

(56) References Cited

OTHER PUBLICATIONS

Plaintiffs' Memo of Law in Opposition to Barclays and UBS Renewed Motion to Dismiss the Amended Complaint, *Edge Capture LLC and Edge Specialists, LLC* v. *Barclays Bank PLC et al.*, (1:09-cv-01521—US DC for the Northern District of IL), Oct. 4, 2010, Part 7, pp. 996-1147.
Plaintiffs Memo in Opposition to Wolverine's Motion to Dismiss Amended Complaint, *Edge Capture LLC and Edge Specialists, LLC* v. *Barclays Bank PLC et al.*, (1:09-cv-01521—US DC for the Northern District of IL), Oct. 4, 2010, Part 1, pp. 1-165.
Plaintiffs Memo in Opposition to Wolverine's Motion to Dismiss Amended Complaint, *Edge Capture LLC and Edge Specialists, LLC* v. *Barclays Bank PLC et al.*, (1:09-cv-01521—US DC for the Northern District of IL), Oct. 4, 2010, Part 2, pp. 166-331.
Plaintiffs Memo in Opposition to Wolverine's Motion to Dismiss Amended Complaint, *Edge Capture LLC and Edge Specialists, LLC* v. *Barclays Bank PLC et al.*, (1:09-cv-01521—US DC for the Northern District of IL), Oct. 4, 2010, Part 3, pp. 332-497.
Plaintiffs Memo in Opposition to Wolverine's Motion to Dismiss Amended Complaint, *Edge Capture LLC and Edge Specialists, LLC* v. *Barclays Bank PLC et al.*, (1:09-cv-01521—US DC for the Northern District of IL), Oct. 4, 2010, Part 4, pp. 498-663.
Plaintiffs Memo in Opposition to Wolverine's Motion to Dismiss Amended Complaint, *Edge Capture LLC and Edge Specialists, LLC* v. *Barclays Bank PLC et al.*, (1:09-cv-01521—US DC for the Northern District of IL), Oct. 4, 2010, Part 5, pp. 664-829.
Plaintiffs Memo in Opposition to Wolverine's Motion to Dismiss Amended Complaint, *Edge Capture LLC and Edge Specialists, LLC* v. *Barclays Bank PLC et al.*, (1:09-cv-01521—US DC for the Northern District of IL), Oct. 4, 2010, Part 6, pp. 830-995.
Plaintiffs Memo in Opposition to Wolverine's Motion to Dismiss Amended Complaint, *Edge Capture LLC and Edge Specialists, LLC* v. *Barclays Bank PLC et al.*, (1:09-cv-01521—US DC for the Northern District of IL), Oct. 4, 2010, Part 6, pp. 996-1153.
Barclays and UBS's Reply Memo in Support of their Renewed Motion to Dismiss the Amended Complaint, *Edge Capture LLC and Edge Specialists, LLC* v. *Barclays Bank PLC et al.*, (1:09-cv-01521—US DC for the Northern District of IL), Oct. 22, 2010.
Wolverine's Reply Memo in Support of its Renewed Motion to Dismiss the Amended Complaint, *Edge Capture LLC and Edge Specialists, LLC* v. *Barclays Bank PLC et al.*, (1:09-cv-01521—US DC for the Northern District of IL), Oct. 22, 2010.
Plaintiffs' Motion for Leave to File Attached Sur-Reply in Opposition to Defendants' Renewed Motion to Dismiss the Amended Complaint, *Edge Capture LLC and Edge Specialists, LLC* v. *Barclays Bank PLC et al.*, (1:09-cv-01521—US DC for the Northern District of IL), Nov. 5, 2010.
Barclays and UBS's Opposition to Plaintiffs Motion for Leave to File Sur-Reply in Opposition to Motion to Dismiss the Amended Complaint, *Edge Capture LLC and Edge Specialists, LLC* v. *Barclays Bank PLC et al.*, (1:09-cv-01521—US DC for the Northern District of IL), Nov. 8, 2010.
Notification of Docket Entry, Order, Granting Plaintiffs' Motion for Leave to File Sur-Reply, *Edge Capture LLC and Edge Specialists, LLC* v. *Barclays Bank PLC et al.*, (1:09-cv-01521—US DC for the Northern District of IL), Nov. 10, 2010.
Sur-Reply of Plaintiffs in Opposition to Barclay's and UBS's Renewed Motion, *Edge Capture LLC and Edge Specialists, LLC* v. *Barclays Bank PLC et al.*, (1:09-cv-01521—US DC for the Northern District of IL), Nov. 10, 2010.
Plaintiffs' Notice of Supplemental Authority, *Edge Capture LLC and Edge Specialists, LLC* v. *Barclays Bank PLC et al.*, (1:09-cv-01521—US DC for the Northern District of IL), Dec. 16, 2010.
Barclays and UBS's Motion for Leave to File a Response to Plaintiffs' Notice of Supplemental Authority, *Edge Capture LLC and Edge Specialists, LLC* v. *Barclays Bank PLC et al.*, (1:09-cv-01521—US DC for the Northern District of IL), Dec. 22, 2010.
Notification of Docket Entry, Minute Order Granting Barclays and UBS's Motion for Leave to File a Response to Plaintiffs' Notice of Supplemental Authority, *Edge Capture LLC and Edge Specialists, LLC* v. *Barclays Bank PLC et al.*, (1:09-cv-01521—US DC for the Northern District of IL), Jan. 5, 2011.
Barclays and UBS's Response to Plaintiffs Notice of Supplemental Authority, *Edge Capture LLC and Edge Specialists, LLC* v. *Barclays Bank PLC et al.*, (1:09-cv-01521—US DC for the Northern District of IL), Jan. 5, 2011.
Order Denying Defendants' Motion to Dismiss, *Edge Capture LLC and Edge Specialists, LLC* v. *Barclays Bank PLC et al.*, (1:09-cv-01521—US DC for the Northern District of IL), Jan. 31, 2011.
Letter to Richard Strasser of the SEC from Stephanie Mullins, Chicago Board Options Exchange, dated Dec. 23, 1998, re Amendment 1 to SR-CBOE-98-44, 3 pages total.
Letter to Michael Walinskas of the SEC from Nancy Nielsen, Chicago Board Options Exchange, dated Oct. 1, 1998, re SR-CBOE-98-44 including Securities and Exchange Commission File No. SR-CBOE-98-44, entitled Proposed Rule Change by the Chicago Board Options Exchange, Inc., 10 pages.
Memo to Charles J. Henry from Stephanie Mullins, Chicago Board Options Exchange, dated Sep. 29, 1998, re Changes to Rule 6.8(b).
Federal Register, vol. 63, No. 212, dated Nov. 3, 1998, pp. 59350-59351, re SR-CBOE-98-44.
The Chicago Board Options Exchange, Regulatory Bulletin, Oct. 16, 1998, vol. RB9, No. 27, pp. 1-6.
"Windows Autoquote User Manual for DPMs Market Makers and Exchange Employees—Chicago Board Options Exchange" Sep. 1, 2001. pp. 1-9, 11-13, 15, and 17-32.
"PC Auto Quote User Manual for Market Makers and Exchange Employees—Chicago Board Options Exchange" Dec. 1990. Second Edition. pp. 1-11, 14-22, 24-28, and 31-35.
CBOE Information Circular IC91-15, Feb. 25, 1991 entitled "Auto Quote "Best Quote" Process."
CBOE Memo, Mar. 21, 1991 entitled "New Version of P.C. Auto Quote". 3 pages.
CBOE Information Circular IC91-76, Oct. 28, 1991 entitled "Auto Quote Series Enablements". 3 pages.
CBOE Information Circular IC92-92, Aug. 30, 1993 entitled "Auto Quote Enhancements". 2 pages.
CBOE Information Circular IC93-76, Sep. 30, 1992 entitled "New P.C. AutoQuote Version". 2 pages.
CBOE Information Circular IC94-16, Mar. 9, 1994 entitled "New P.C. AutoQuote Version".
CBOE Information Circular IC95-15, Mar. 6, 1995 entitled "P.C. AutoQuote Enhancements". 3 pages.
CBOE Information Circular IC97-22, May 27, 1997 entitled "P.C. AutoQuote Enhancements". 3 pages.
"Complaint"; *Edge Capture L.L.C.,* v. *Citadel Investment Group, L.L.C.*; US District Court for the Northern District of Illinois Eastern Division; Civil Action No. 07C 4648; Aug. 17, 2007; 57 pages.
"Dismissal Order"; US District Court for the Northern District of Illinois Eastern Division; Civil Action No. 07C 4648; Feb. 25, 2008; 1 page.
"Complaint"; *Edge Capture L.L.C.*; v. *Lehman Brothers Holdings, Inc.*; US District Court for the Northern District of Illinois Eastern Division; Civil Action No. 08-CV-2412; Apr. 28, 2008; 57 pages.
"Defendant's Motion to Dismiss for Failure to State a Claim or, Alternatively, to Bifurcate Patent Invalidity and Unenforceability from Infringement and Damages"; US District Court for the Northern District of Illinois Eastern Division; Civil Action No. 08-CV-2412; Jun. 4, 2008; 2 pages.
"Defendant's Memorandum in Support of Their Motion to Dismiss for Failure to State a Claim or, Alternatively, to Bifurcate Patent Invalidity and Unenforceability from Infringement and Damages"; US District Court for the Northern District of Illinois Eastern Division; Civil Action No. 08-CV-2412, Jun. 4, 2008; 20 pages.
"Plaintiffs' Memorandum of Law in Opposition to Defendant's Motion to Dismiss for Failure to State a Claim or, Alternatively, to Bifurcate Patent Invalidity and Unenforceability from Infringement and Damages"; US District Court for the Northern District of Illinois Eastern Division; Civil Action No. 08-CV-2412; Jul. 1, 2008; 61 pages.
"Defendant's Reply Memorandum in Support of Their Motion to Dismiss for Failure to State a Claim or, Alternatively, to Bifurcate Patent Invalidity and Unenforceability from Infringement and Dam-

(56) References Cited

OTHER PUBLICATIONS ages"; US District Court for the Northern District of Illinois Eastern Division; Civil Action No. 08-CV-2412; Jul. 15, 2008; 35 pages.
"Declaration of Jeffrey G. Randall in Support of Defendant's Motion to Dismiss for Failure to State a Claim or, Alternatively, to Bifurcate Patent Invalidity and Unenforceability from Infringement and Damages"; US District Court for the Northern District of Illinois Eastern Division; Civil Action No. 08-CV-2412, Jun. 4, 2008; 5 pages.
U.S. Securities and Exchange Commission; "A Monitoring Report on the Operation of the Cincinnati Stock Exchange National Securities Trading System"; Directorate of Economic and Policy Analysis; May 1981; 42 pages.
U.S. Securities and Exchange Commission; "A Report on the Operation of the Cincinnati Stock Exchange National Securities Trading System" 1978-1982; Directorate of Economic and Policy Analysis; Sep. 1982; 46 pages.
"Self-Regulatory Organizations; Proposed Rule Change by the Cincinnati Stock Exchange Relating to Small Order Execution Guarantee"; File No. SR-CSE-85-4; Aug. 15, 1985; Securities and Exchange Commission (S.E.C.) 1 Securities Exchange Act of 1934; Westlaw; 33 S.E.C.; Release No. 34-22330, 1985 WL 547562; 10 pages.
"Self-Regulatory Organizations, Chicago Board Options Exchange, Inc."; Order Approving Proposed Rule Changes.Relating to the Retail Automatic Execution System ("RAES"); Aug. 19, 1988; Securities and Exchange Commission; Release No. 34-25995; File Nos. SR-CBOE-87-35 and SR-CBOE-87-47; 13 pages.
Exhibit I; "Impressive Project Provides Extended Opportunity in CBOT Financial Complex"; by Lisa Dunbar, Associate Product Manager, Market & Product Development Department, Chicago Board of Trade; available at http://web.archive.org/web/19990429192354/finance.wat.ch/SCF0A/bulletin/_0001960.htm; date unknown; 3 pages.
Brad Adelberg et al., "Overview of the STanford Real-time Information Processor (STRIP)"; Mar. 1996; 4 pages.
The index 25:1 SIGMOD Record; containing "Overview of the STanford real-time Information Processor (STRIP)"; Mar. 1996; available at http://www.sigmod.org/record/issues/96031; 4 pages.
Brad Adelberg et al.; "The STRIP Rule System for Efficiently Maintaining Derived Data"; Jun. 1997, 28 pages.
SIGMOD Record (Jun. 1997) publishing the Proceedings of the 1997 ACM SIGMOND International Conference on Management of Data (May 13-15, 1997, Tucson, AZ, USA) and containing "The Strip Rule System for Efficiently Maintaining Derived Data"; available at http://www.sigmod.org/record/issues/97061; 11 pages.
Defendant's representative claim charts applying the teachings of the Mar. 1996 STRIP system to U.S. Patent No. 7,251,629; (Case 1:08-CV-02412) 11 pages.
Defendant's representative claim chart applying the teachings of the Mar. 1996 STRIP system to U.S. Patent No. 7,177,833; (Case 1:08-CV-02412); 7 pages.
Joseph Alotta; Project Nimble: An Automated Equity Options Market Making System, in "Computerized Trading: Maximizing Day Trading and Overnight Profits"; pp. 387-396; (Mark Jurik ed., 1999); 12 pages.
ISBN information listing a May 10, 1999 publication date for "Computerized Trading: Maximizing Day Trading and Overnight Profits"; (Mark Jurik ed., 1999); available at http://www.chaptersindigo.ca; 1 page.
Defendant's representative claim chart applying the teachings of the May 1999 Nimble system to U.S. Patent No. 7,251,629; (Case 1:08-CV-02412); 12 pages.
Defendant's representative claim chart applying the teachings of the May 1999 Nimble system to U.S. Patent No. 7,177,833; (Case 1:08-CV-02412); 9 pages.
Excerpts of the Chicago Board Options Exchange Annual Report 2001; available at http://www.cboe.com/AboutCBOE/AnnualReportArchive/AnnualReport2001.pdf; 2 pages.
"Swiss Exchange SWX TS User Manual" (Ver. 2.1, Dec. 31, 1998); 249 pages.
Defendant's representative claim chart applying the teachings of the Dec. 1998 Swiss Exchange SWX system to U.S. Patent No. 7,251,629; 6 pages.
Adriaan Joubert & L.C.G. Rogers "Fast, Accurate and Inelegant Valuation of American Options" in Numerical Methods in Finance; pp. 88-92 (L.C.G. Roger & D. Talay eds., 1997); 7 pages.
Excerpts of the Hull Group, Inc. Form S-1 filed with the Securities Exchange Commission on May 13, 1999; 15 pages.
Defendant's claim chart applying the teachings of the Pang (6,546,375) patent to U.S. Patent No. 7,177,833; (Case 1:08-CV-02412); 13 pages.
Defendant's representative claim chart applying the teachings of the Pang patent (6,546,375)in view of Joubert (1997) to U.S. Patent No. 7,251,629; (Case 1:08-CV-02412); 9 pages.
Wolverine's Renewed Motion to Bifurcate Patent Invalidity and Unenforceability from Alleged Infringement and Damages, *Edge Capture LLC and Edge Specialists, LLC v. Barclays Bank PLC et al.*, (1:09-cv-01521—US DC for the Northern District of IL), Mar. 8, 2011.
Plaintiffs Edge Capture L.L.C.'s and Edge Specialists, L.L.C.'s Memorandum of Law Supporting their Motion to Strike Defendants' Renewed Motions to Bifurcate, *Edge Capture LLC and Edge Specialists, LLC v. Barclays Bank PLC et al.*, (1:09-cv-01521—US DC for the Northern District of IL), Mar. 9, 2011.
Wolverine Trading, L.L.C. And Wolverine Execution Services, L.L.C.'s Answer, Affirmative Defenses, and Counterclaims to Edge Capture L.L.C. and Edge Specialists, L.L.C.'s Amended Complaint, *Edge Capture LLC and Edge Specialists, LLC v. Barclays Bank PLC et al.*, (1:09-cv-01521—US DC for the Northern District of IL), Mar. 23, 2011.
Defendant Barclays Capital Inc.'s Answer, Affirmative Defenses, and Counterclaims in Response to Plaintiffs Edge Capture L.L.C. and Edge Specialists, L.L.C.'s Amended Complaint, *Edge Capture LLC and Edge Specialists, LLC v. Barclays Bank PLC et al.*, (1:09-cv-01521—US DC for the Northern District of IL), Mar. 23, 2011.
Defendant Barclays Bank PLC's Answer and Affirmative Defenses in Response to Plaintiffs Edge Capture L.L.C. and Edge Specialists, L.L.C.'s Amended Complaint, *Edge Capture LLC and Edge Specialists, LLC v. Barclays Bank PLC et al.*, (1:09-cv-01521—US DC for the Northern District of IL), Mar. 23, 2011.
Jun Muranaga & Tokiko Shimizu, "Market microstructure and market liquidity", Bank of Japan, 29 pages, 1999, available at http://www.bis.org/publ/cgfs11mura_a.pdf.
Jonas Niemeyer & Patrik Sandas, "An Empirical Analysis of the Trading Structure at the Stockholm Stock Exchange", Jan. 16, 1995, 38 pages, available at http://swopec.hhs.se/hastegabs/hastef0044.htm.
Benny Rachlevsky-Reich et al., "GEM: A Global Electronic Market System", Information Systems, vol. 24 No. 6, pp. 495-518, 1999.
Claire Mencke, "Finding the Lowest-Cost Path for Stock Trading", Investor's Business Daily, May 1, 1996.
Brandon Mitchener, "On Election Course, Race is Wide Open German Contest Remains Close for Buyers of Political Shares", International Herald Tribune, Oct. 13, 1994.
Merton H. Miller, "Merton Miller on Derivatives", John Wiley & Sons, Inc., 1997, 226 pages.
Jeffrey D. Miller et. Al., "Program Trading: The New Age of Investing: The Role of the Individual Investor in Today's Changing Stock Market", J.K. Lasser Institute, 1989, 212 pages.
Laura Monsen, "Using Microsoft Excel 97: Clear. Concise. Dependable", Chapter 19: Importing and Exporting Data and Chapter 20: Introducing Visual Basic for Applications, 1997.
Jun Muranaga & Tokiko Shimizu, "Market microstructure and market liquidity", Bank of Japan, 29 pages, 1999, available at http://www.bis.org/publicgfs11mura_a.pdf.
Vasanttilak Naik, "Option Valuation and Hedging Strategies with Jumps in the Volatility of Asset Returns", The Journal of Finance, vol. 48 No. 5, pp. 1969-1984, Dec. 1993.
Jonas Niemeyer & Patrik Sandås, "An Empirical Analysis of the Trading Structure at the Stockholm Stock Exchange", Jan. 16, 1995, 38 pages, available at http://swopec.hhs.se/hastegabs/hastef0044.htm.

(56) References Cited

OTHER PUBLICATIONS

Peggy Lee O'Neil, "High-Tech Trading: Growing Number of Money Managers Relying on Computer-Guided Investment Strategies" The Albuquerque Journal, pp. C9-C10, Nov. 12, 1995.
Eleanya A. Okoroji, "Automated Stock Option Trading", John B Case Library Archives Department, Master Thesis, May 1988, 72 pages.
Eve Oppenheim, "G-183 Electronic Trading Systems: Which, Why, Where", Business Communications Company, Inc., 1998, 10 pages.
James Orford, "Introducing a New Way to Trade: Trading on the Frontier", Plan Sponsor, Oct. 1996, pp. 17-27.
Jennifer Ouellette, "Physicists Graduate from Wall Street", The Industrial Physicist, Dec. 1999, pp. 9-13.
Michael Pacione, "Local Exchange Trading Systems—A Rural Response to the Globalization of Capitalism?" Journal of Rural Studies, vol. 13 No. 4, pp. 415-427, 1997.
K.N. Pantazopoulos et al., "A Knowledge Based System for Evaluation of Option Pricing Algorithms" Proceedings of the IEEE/IAFE/INFORMS 1998 Conference on Computational Intelligence for Financial Engineering (CIFEr), Mar. 29-31, 1998, pp. 123-140.
Satu S. Parikh & Gerald L. Lohse, "Electronic Futures Markets Versus Floor Trading: Implications for Interface Design" in Proceedings for CHI, 1995, 8 pages, available at http://www.sigchi.org/chi95/proceedings/papers/jll_bdy.htm.
Tushar M. Patel, "Real-time Portfolio Management and Automatic Extensions: MS Thesis", Columbia University, Department of Computer Science, Oct. 7, 1991, 56 pages.
Craig Pirrong, "Market Liquidity and Depth on Computerized and Open Outcry Trading Systems: A Comparison of DTB and LIFFE Bund Contracts", The Journal of Futures Markets, vol. 16 No. 5, pp. 519-543 (1996).
John Pitt, "When Your Investment Horizon is Minutes", Global Finance, pp. 38-42, Jun. 1995.
Benny Rachlevsky-Reich et al., "GEM A Global Electronic Market System", Information Systems, vol. 24 No. 6, pp. 495-518, 1999.
Benny Rachlevsky-Reich, "GEM: A Global Electronic Market System", Research Thesis, Israel Institute of Technology, Jul. 1999, 152 pages.
Christina I. Ray, "The Bond Market: Trading and Risk Management", Chapter 4: The Rules of the Game, pp. 59-69, 1993.
Benny Reich & Israel Ben-Shaul, "A Componentized Architecture for Scalable Market Exchange", Techion, Israel Institute of Technology, Department of Electrical Engineering, date unknown, 4 pages.
Adrian Joubert & L.C.G. Rogers, "Fast, Accurate, and Inelegant Valuation of American Options", in "Numerical Methods of Finance", Cambridge University Press, pp. 88-92 (L.C.G. Rogers & D. Talay, eds., 1997).
Articles and advertisements regarding "Mesa" from NeXT World Magazine, dates unknown.
G.J. Santoni, "Has Programmed Trading Made Stock Prices More Volatile?", Federal Reserve Bank of St. Louis, May 1987, pp. 18-29.
Ivy Schmerken, "What's Next on Wall Street's Automation Agenda? (trading technology)", Wall Street Computer Review, vol. 6 No. 7, pp. 44 (6), Apr. 1989.
Ivy Schmerken, "The Bulls and Bears Come Out at Night: Electronic Trading", Wall Street Computer Review, vol. 7 No. 12, pp. 14 (9), Sep. 1990.
Ivy Schmerken, "Wall Street's Quiet Revolution", Wall Street & Technology, vol. 9 No. 10, p. 25 (7), Jun. 1992.
Michael Schrage, "Seeing Order in Financial Chaos", Los Angeles Times, Jan. 1992.
Michael Schrage, "Trying to Probably Predict What Might Maybe Happen", Los Angeles Times, Jan. 3, 1992.
Michael Schrage, "Future markets show vital signs but will they be predictable?", The Boston Sunday Globe, Jan. 5, 1992.
Robert A. Schwartz & Bruce W. Weber, "Next-Generation Securities Market Systems: An Experimental Investigation of Quote-Driven and Order-Driven Trading" Journal of Management Information Systems, vol. 14 No. 2, pp. 57-79, Fall 1997.
Robert A. Schwartz & Bruce W. Weber, "Combining Quote-Driven and Order-Driven Trading Systems in Next-Generation Stock Markets: An Experimental Investigation", Department of Information, Operations, and Management Sciences, Leonard N. Stern School of Business, New York University, IS-96-13, Jul. 1996.
Seng-Cho Timothy Chou et al., "A Rule-based Neural Stock Trading Decision Support System", Proceedings of the IEEE/IAFE 1996 Conference on Computational Intelligence for Financial Engineering, pp. 148-154, Mar. 24-26, 1996.
Song-yi Yi & Heonshik Shin, "Design of a Real-Time Trader for Mobile Objects in Open Distributed Environments", Proceedings of the Eight Euromicro Workshop on Real-Time Systems, pp. 212-217, Jun. 12-14, 1996.
"A Probus Guide to World Markets: Innovation and Technology in the Markets—A Reordering of the World's Capital Market Systems", (Daniel R. Siegel ed., 1990).
Barry D. Solomon, "New directions in emissions the potential contribution of new institutional economics", Ecological Economics, vol. 30, pp. 371-387, 1999.
Benn Steil et al., "The European Equity Markets: The State of the Union and an Agenda for the Millennium", Chapter 1: Equity Trading I: The Evolution of European Trading Systems, pp. 1-58, (1996).
Ian Domowitz and Benn Steil, "Securities Trading", in "Technological Innovation & Economic Performance", Princeton University Press (Benn Steil et al., eds., 2002).
Hans R. Stoll & Robert E. Whaley, "Futures and Options on Stock Indexes: Economic Purpose, Arbitrage, and Market Structure", The Review of Futures Markets, vol. 7 No. 2, pp. 224-248, 1988.
John Sweeney, "Essex Eurotrader", Stocks & Commodities, V. 5:8, pp. 275-280, 1986.
Dr. Clarence N. W. Tan, Ph.D., "A Hybrid Financial Trading System Incorporating Chaos Theory, Statistical and Artificial Intelligence/Soft Computing Methods", Invited Paper—Queensland Finance Conference 1999, 19 pages.
Stuart M. Turnbull & Lee Macdonald Wakeman, "A Quick Algorithm for Pricing European Average Options", Journal of Financial and Quantitative Analysis, vol. 26 No. 3, Sep. 1991.
Steven R. Umlauf, "Information Asymmetries and Security Market Design: An Empirical study of the Secondary Market for U.S. Government Securitas", The Journal of Finance, vol. 46 No. 3, Jul. 1991, pp. 929-953.
Ted Jackson, "Bloomberg's Next Step: The Instinct Killer?", Wall Street & Technology, vol. 14 No. 8, pp. 34-38, Aug. 1, 1996.
Bruce W. Weber, "Next Generation Trading in Futures Markets: A Comparison of Open Outcry and Ordering Matching Systems", Journal of Management Information Systems, vol. 16 No. 2, pp. 29-45, Fall 1999.
Bruce W. Weber, "Information Technology in the Major International Financial Markets", Department of Information, Operations, and Management Sciences, Leonard N. Stern School of Business, New York University, IS-93-12, Apr. 7, 1993, 45 pages.
Bruce W. Weber, "Screen-Based Trading in Futures Markets: Recent Developments and Research Propositions", Proceedings of the Thirty Second Hawaii International Conference on System Sciences, 1999, 10 pages.
Bruce W. Weber, "Transparency and Bypass in Electronic Financial Markets", Department of Information Systems, Stern School of Business, New York University, STERN IS-93-15, Jun. 10, 1993, 23 pages.

LOWER LEFT QUADRANT

FIG.4D

LOWER RIGHT QUADRANT

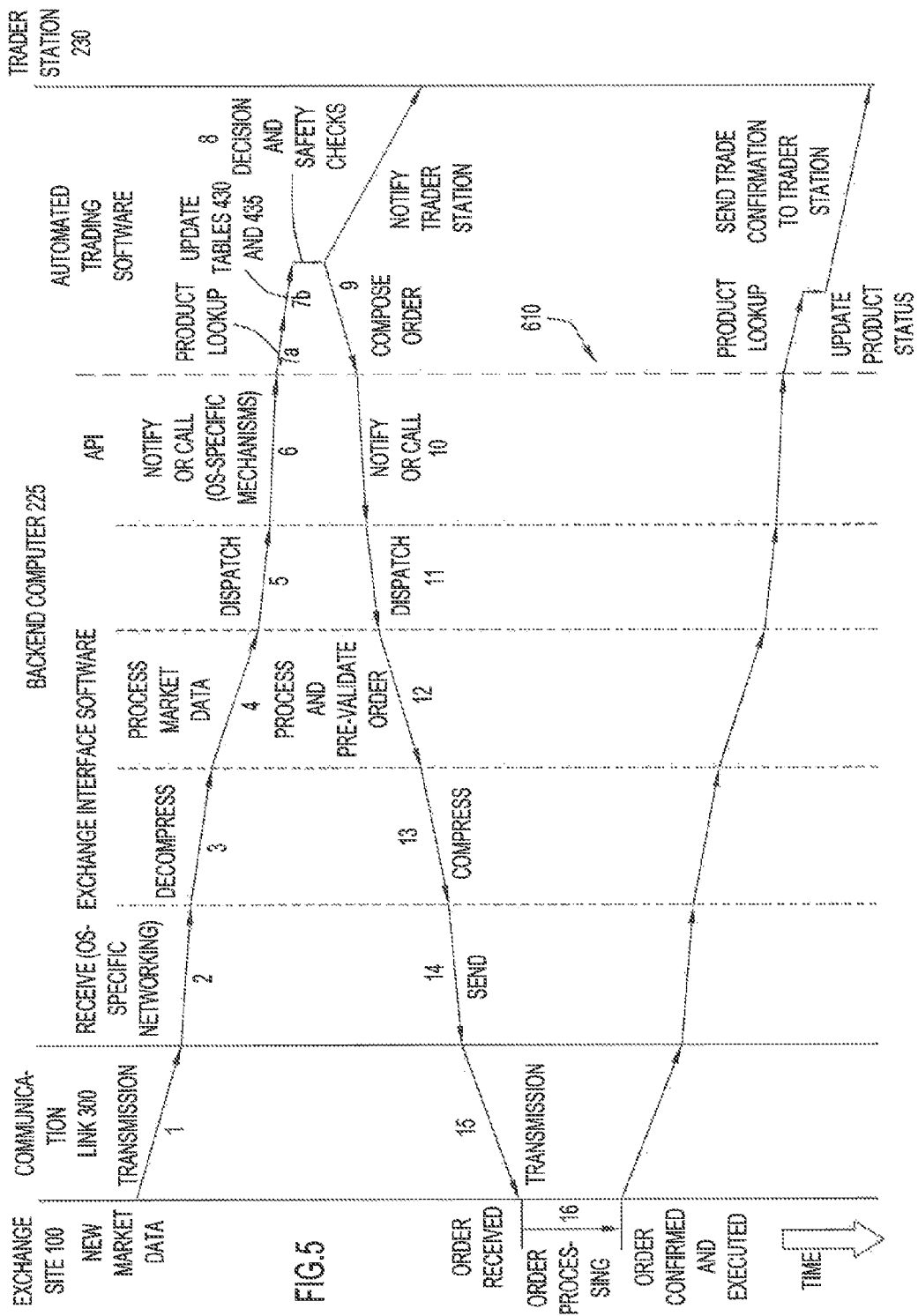

# AUTOMATED TRADING SYSTEM IN AN ELECTRONIC TRADING EXCHANGE

CROSS-REFERENCE TO RELATED APPLICATIONS

The present application is a divisional of U.S. patent application Ser. No. 11/705,157 filed on Feb. 12, 2007, which is a continuation of U.S. patent application Ser. No. 09/618,222 filed on Jul. 18, 2000, now issued as U.S. Pat. No. 7,177,833, all of which are hereby incorporated by reference.

BACKGROUND OF THE INVENTION

1. Field of the Invention

The present invention relates to an automated trading system for use in an electronic trading exchange network system and, more particularly, a trading system that rapidly, accurately, and safely responds to desirable trading opportunities.

2. Description of the Related Art

Trading exchanges historically provided a location for buyers and sellers to meet to trade stocks, bonds, currencies, commodities, and other items. The New York Stock Exchange and the Chicago Mercantile Exchange are examples of such trading exchanges. Recent advances in computer and communications technology have led to electronic trading exchange system networks. Electronic trading exchange system networks use communications networks and computers to replicate traditional face-to-face exchange functions. For example, centralized exchange computers disseminate market information, maintain records and statistics, settle cash payments, determine risk based margin requirements, and match trades. Matching of trades is typically done on a first come-first served basis, whereby time of order entry is an important criterion for determining priority in fulfillment of a transaction.

A communications network connects the exchange computers to numerous trader sites. Each trader site includes one or more trader stations operated by traders. Exchange network operators typically provide traders with interface software and, in some cases, hardware to enable traders to view prices and other information relating to products and to execute transactions by submitting orders and quotes. Orders are requests to buy or sell a specified amount of a particular item at a specified price. As an example, a trader may place an order to buy 100 shares of IBM stock or a bid price of 57.25. Quotes differ from orders in that quotes indicate bid price and ask prices, and bid and ask quantities for a particular item. As an example, a trader may place a quote indicating she is willing to buy 100 shares of IBM stock for a bid price of 57.0 and sell 100 shares of IBM stock at a price of 57.5. Retail customers, who may use brokers to execute their trades, typically will place an order to initiate a transaction. Professional market makers can use either orders or quotes, but tend to fulfill their role of providing liquidity to a particular market by using quotes. This trading information is displayed in a grid or other organized formal Market competition is fierce. Traders who can quickly identify opportunities and act on them generate the largest profits.

Many trader stations in use today rely upon the traders themselves to decide whether to submit an order in response to a trading opportunity presented through the exchange. In this regard, the trading information is received from the exchange, processed, and displayed on a monitor of the trader's station. The trader reads the trading information from the monitor and decides whether or not to submit a matching order. The trader submits an order by entering instructions into the trader station using a keyboard or mouse, or even a gamepad or voice-activation as described in U.S. application Ser. No. 08/273,362, filed on Mar. 22, 1999 and incorporated herein by reference.

Attempts have been made to implement trading systems that automate decision-making so that orders may be submitted with limited trader interaction. These systems have a number of drawbacks. For example, user-friendly systems that automatically submit orders without trader interaction, while faster than a human trader, are believed to be relatively slow in terms of computer speed due to application and system design. In a typical set-up, trading information received from the exchange is processed by general purpose backend computer equipment. The backend computer may, among other things, (1) act as a gateway by communicating market information from the exchange to various types of client equipment, (2) submit, delete, and modify orders and quotes to the exchange from the various client equipment, (3) receive real-time trade confirmations and end-of-day back office reports, and (4) perform risk analysis, position management, and accounting functions. The trader stations are clients of the backend computer. The trader stations may be tasked with numerous functions, such as (1) receiving and displaying real-time market information, (2) creating and displaying theoretical prices related to market products, (3) composing, submitting modifying, and deleting orders and quotes, and (4) maintaining positions and calculating risk management, to name a few. Each trader station is typically configured in a very user-friendly, Windows-based environment since the trader will spend long periods of time each day watching and interacting with it. The overhead associated with the functions performed by the backend computer and the trader stations reduces the response speed of automated trading.

In addition, computer equipment lacks the trading judgment of a human trader. A computer can generate staggering losses in the blink of an eye by submitting orders based upon incomplete or mistaken assumptions inherent in the trading program, erroneous input data, or corrupted data relied upon by the trading program. Accordingly, there exists a need in the art for an automated trading system that rapidly responds to trade information transmitted from an exchange, yet is safe and accurate.

SUMMARY OF THE INVENTION

The present invention has been made in view of the above circumstances and has as an object to provide an improved trading system that rapidly responds to trading information received from an exchange.

A further object of the invention is to provide an automated trading system in an electronic trading exchange system that rapidly submits orders in response to trading information received from the exchange.

A further object of the invention is to provide an automated trading system that ensures the accuracy of automatic trading operations.

A further object of the invention is to provide an automated trading system that performs automatic trading operations without the risk of enormous losses due to erroneous, mistaken and/or repeated operation.

A further object of the invention is to provide a trading system in an automated trader system that may be remotely controlled A further object of the invention is to provide an automated trade system that automatically hedges some or all of the delta risk associated with the execution of a trade by submitting an order in connection with another, related trade opportunity.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiment(s) of the invention and together with the description, serve to explain the principles of the invention.

FIGS. 4A, 4B, 4C, and 4D, collectively referred to in the description of the preferred embodiment as FIG. 4, illustrate an embodiment of a trading screen for use in connection with a trader station in accordance with the present invention, with FIG. 4A being the upper left quadrant, FIG. 4B being the upper right quadrant. FIG. 4C being the lower left quadrant, and FIG. 4D being the lower right quadrant of FIG. 4.

FIG. 5 provides a flow diagram of the steps performed in automated trading in accordance with the present invention.

DESCRIPTION OF THE PREFERRED
EMBODIMENT

The present invention recognizes that electronic trading exchange system computers may match bid and ask prices on a first come/first serve basis. Accordingly, the speed and accuracy of submitting orders or other responses is critical to the trader's ability to participate in the most profitable transactions. Even short delays in response may freeze a trader out of an otherwise lucrative transaction.

The present invention is capable of reducing the time it takes for the trader to submit an order or quote in response to incoming trading information from the exchange. In accordance with one aspect of the present invention, the automated trading system automatically decides whether or not to submit an order or quote based on calculation logic and decision logic, and trading information received from the exchange computers. To decrease the response time, the automated trading system may be dedicated or substantially dedicated to performing automated trading operations, with limited or minimized overhead permitted for other tasks unrelated to trading. The present invention is further capable of reducing the time delay due to network lags arising from the transfer of trading information from the exchange computers to the automated trading system, and vice versa.

In an additional aspect of the present invention, safe and accurate automated trading may be achieved by performing various checks of the information used in decision-making and/or information concerning the order. Further, an automated hedging feature may be invoked which, when a trader takes a position in a security, reduces the time needed to establish a delta hedge position in a related security.

Reference will now be made in detail to the present exemplary embodiment(s) of the invention illustrated in the accompanying drawings. Wherever possible, the same reference numbers will be used throughout the drawings to refer to the same or like parts.

Figure 1:
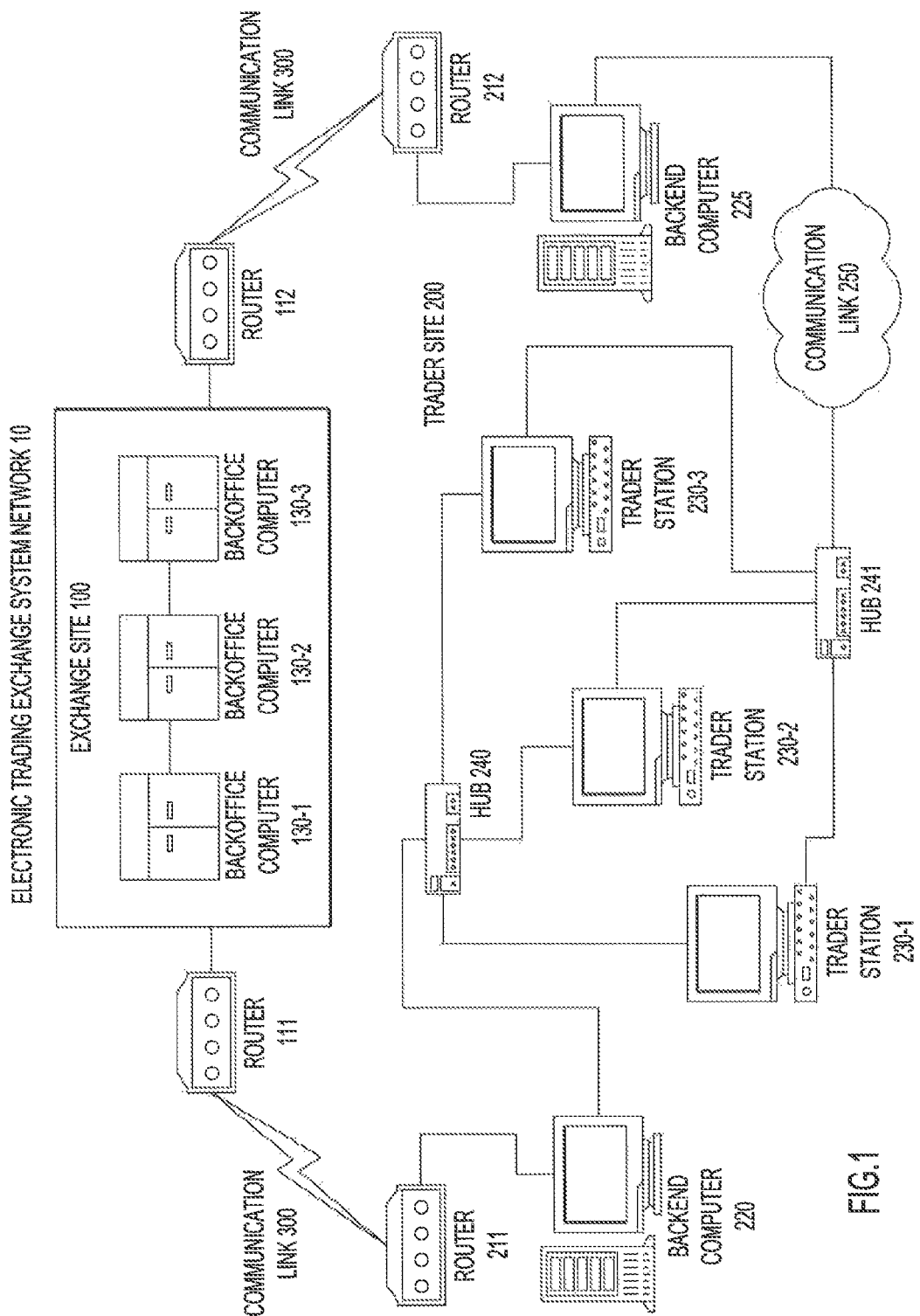
FIG. 1 illustrates an embodiment of an electronic trading exchange system network in accordance with the present invention.

FIG. 1 provides a schematic of an embodiment of an electronic trading exchange system network 10 that may be used in connection with the present invention. Other network arrangements may be used as well. The electronic trading exchange system network 10 includes an exchange site 100 and a plurality of trading sites 200. For purposes of simplification, FIG. 1 illustrates an exchange site 100 linked to a single trading site 200. Other trading sites 200 may be located in a different part of the same city as the exchange site 100, a different city, a different country, or different continent as the exchange site 100. The exchange site 100 need not be limited to equipment provided at a single location, but may be provided in multiple locations linked by a network. Similarly, the trading sites 200 need not be limited to equipment provided at a single location, but may include equipment at multiple locations linked by a network, such as a wide area network (WAN).

The exchange site 100 may be linked to the trading site 200 by one or more communication links 300. The communication links 300 may be part of a wide area network formed by dedicated communications lines, commonly-accessible communication lines, or a combination thereof. For example, dedicated lines may be strung between the exchange site 100 and one or more of the member trading sites 200. Alternatively, dedicated lines may be leased from telephone, cable, or other communication network operators. For example, the public switched telephone network may embody the commonly-accessible communication lines. Of course, the communications lines 300 may also include, in whole or in part, wireless communications, such as microwave or satellite links. While not shown in FIG. 1, an intermediary (such as broker for a retail customer, or a clearing member for a professional market maker) may exist between the trading sites 200 and the exchange site 100. The role of an intermediary may include some level of risk analysis to confirm, say, sufficient capital exists to cover margin requirements for a potential resulting position, or some level of network routing to, say, ensure an order is sent to the intended exchange. Under the cases where risk analysis checks are passed and the routing information is proper, an intermediary should be transparent or substantially transparent to the functionality described herein and may be subsumed in the communication links 300. Of course, additional time delays may be introduced by any such intermediary processing.

In one embodiment, the exchange site 100 may be designed as a local area network (LAN) and include, for example, one or more security routers and one or more back office computers, among other equipment For purposes of illustration only, two security routers 111, 112 and three back office computers 130-1, 130-2, 130-3 (referred to collectively as back office computer 130) are shown in FIG. 1. The security routers 111, 112 control communications between the back office computers 130 and the communications links 300. Each security router 111, 112 transmits and receives communications over the communications links 300, as well as restricts communications from unauthorized sources. More particularly, the security router 111, 112 may be used to isolate the equipment at the exchange site 100 from intrusion and facilitate communication with the back office computers 130.

The back office computers 130 manage the trading of the various securities (e.g., futures, options, swaps or other derivatives; currencies, stocks, bonds, or other physicals like corn, precious metals, electricity, etc.) and/or other items traded on the exchange. For example, one or more of the back office computers 130 may function as market servers. In this capacity, they may maintain order books, perform order matching, generate market information for use at the exchange site 100 and/or for transmission over the communication links 300, and supply trade information to other back office computers 130 for accounting and/or cash settlement purposes. One or more of the back office computers 130 may function as short-term accounting servers. As such, these computers may receive information from the market servers and generate information for transmission over the communication links 300. The short-term accounting servers may be initialized with status information from the previous day's trading before performing accounting tasks for the current day. One or more of the back office computers 130 may function as long-term account servers and, accordingly, function to collect data from the short-term accounting servers for batch processing and record-keeping. The long-term account servers may supply information to initialize the short-term account servers and generate reports for transmission to trading sites 200. Of course, the back office computers 130 may perform additional functions and a single computer may perform more than one of the above functions.

The trading sites 200 may include a LAN architecture having one or more security routers, one or more backend computers, one or more trader stations, and one or more hubs, among other equipment. For purposes of illustration only, FIG. 1 shows two security routers 211, 212, two backend computers 220, 225, three trader stations 230-1, 230-2, 230-3, (collectively referred to as trader stations 230) and two hubs 240, 241. The security routers 211, 212 transfer trading information between the trading site 200 and the exchange site 100 and screen communications from unauthorized sources. The hubs 240, 241 distribute data between the backend computers 220, 225 and the trading stations 230.

Backend computer 220 may be configured as a communication server for the trader stations 230. The exchange may supply software and/or hardware for the backend computer 220 to facilitate communications with the exchange site 100. Alternatively, the exchange may simply provide protocol specifications that enable the trader site computers to communicate with the exchange computers. In this case, the trader has flexibility in choosing how it implements the protocol specifications running locally at trading site 200. Alternatively, if an intermediary site, such as a broker or clearing member site, is part of the communications routing between the exchange site and the trader site, the backend computer 220 may use communication software supplied by the intermediary site or, if permitted, communication software developed by the trader or a third party. Backend computer 220 handles communications between the trader stations 230 and the back office computers 130 of the exchange. Of course, the trader site 200 may include multiple backend computers 220.

Backend computer 225 may also be equipped with software and/or hardware that facilitates communications with the exchange site and/or the intermediary site. Some exchanges, for example, such as the EUREX (the German and Swiss Derivatives Exchange), recommend installation of a redundant on-site backend computer in the event that the primary communication backend computer 220 fails. In the case of the EUREX exchange, backend computer 225 may be configured to perform automated trading functions under the control of one or more of the trader stations 230. The automated trading functions are described in more detail below. The backend computer 225 should be equipped with a high-speed processor and sufficient memory to efficiently handle automated trade processing. The trader stations 230 may control backend computer 225 remotely through a communication link 250, for example, a WAN. The trader site 200 may include multiple backend computers 225.

In one preferred embodiment, backend computer 225 is dedicated or substantially dedicated to performing automated trading-related functions, as discussed in greater detail below. Backend computer 220, rather than backend computer 225, may be assigned trading-related tasks, such as (1) serving as a gateway to communicate market information from the exchange site 100 to trader stations 230, (2) submitting, deleting and modifying orders and quotes to exchange site 100 from the trader stations 230, (3) receiving real-time trade confirmations and end-of-day back office reports, and/or (4) performing risk analysis, position management, and accounting functions. In this way, backend computer 225 may perform automated trading functions with limited interruption or delays associated with other tasks the backend computers (such as backend computer 220) may be requested to perform. This increases the response speed for automated trading operations. Moreover, the total time delay in submitting an order to the exchange site 100 includes a component attributable the transmission delay or network lag in transmitting messages between the exchange site 100 and the trader site 200. Therefore, backend computer 225 is preferably located near to the equipment of the exchange site 100 to reduce delays associated with transmitting information and orders between the backend computer 225 and the exchange site 100. Accordingly, the total time for responding to trading opportunities can be reduced both by reducing transmission delays and by increasing decision-making speed at the trader site 200. Significantly, the backend computer 225 may be remotely supported or controlled by a distant trader station 230, which permits the trader station 230 to be located virtually anywhere without adversely affecting the response time of the automated trading system. Accordingly, the trader site 230 may be chosen based on considerations such as tax, real estate costs, and quality of life, without having to worry that trader station location will impair the performance of automated trading carried on by backend computer 225.

Trader stations 230 receive information from the exchange site 100, process that information, and display at least part of it on a monitor. Each trader station 230 typically runs interactive software that enables a trader, among other things, to submit orders and/or quotes to the exchange site 100. As discussed further below, one or more of the trader stations 230 may additionally be equipped with software for controlling the automated trading functions of backend computer 225.

Figure 2:
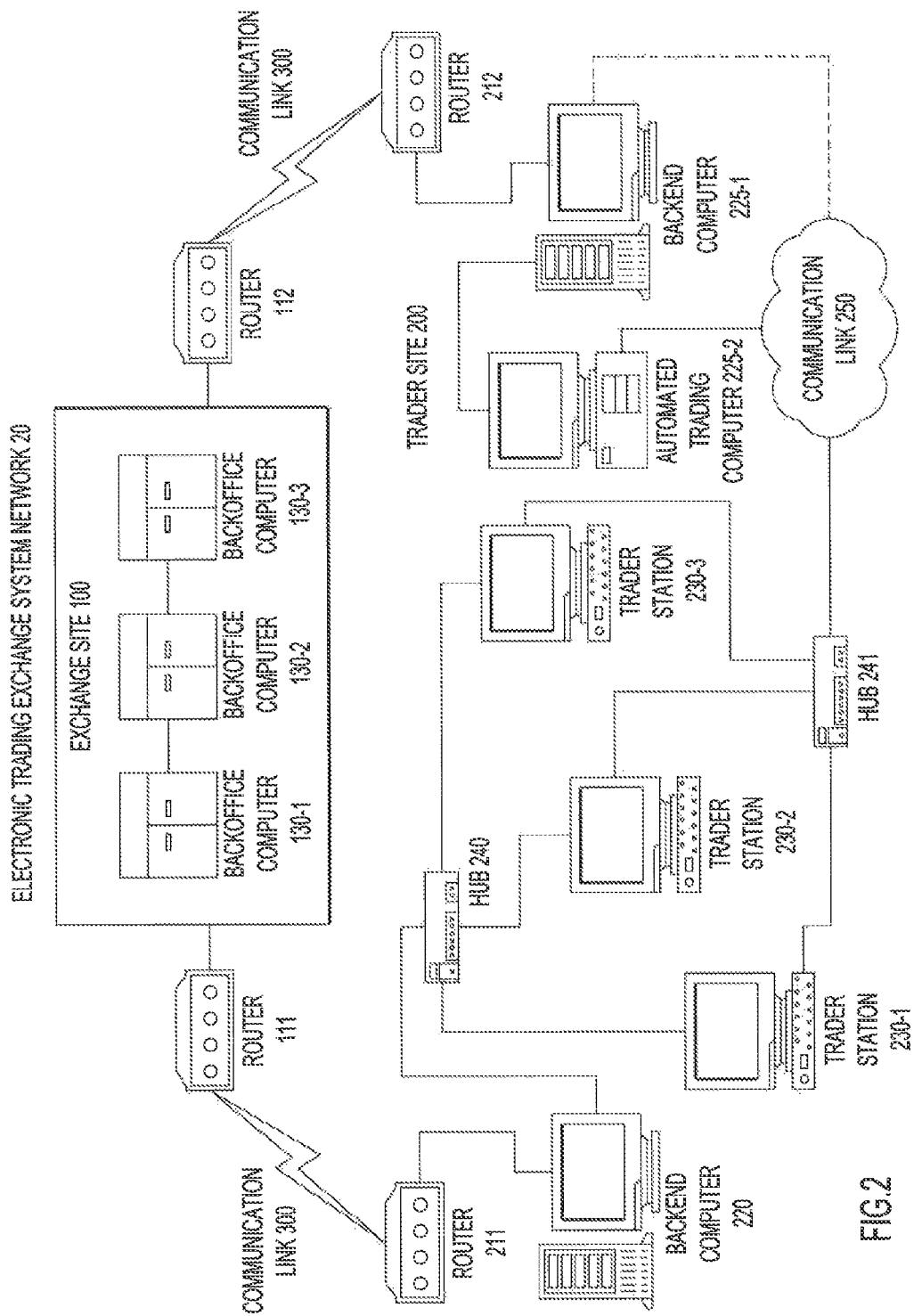
FIG. 2 illustrates a further embodiment of an electronic trading system network in accordance with the present invention.

FIG. 2 illustrates an alternative embodiment of an electronic trading exchange system network 20. For the sake of brevity, features of FIG. 2 similar to those in FIG. 1, which are described above, will not be repeated. In FIG. 2, the trading site 200 includes an automated trading system computer 225-2 separate from the backend computer 225-1. In this embodiment, the automated trading system computer 225-2 performs automated trading system functions and the backend computer 225-1 manages communications between the automated trading system computer 225-2 and the exchange site 100. The automated trading system computer 225-2 may be connected to the backend computer 225-1 using, for example, network interface cards or through a hub (not shown). The automated trading system computer 225-2 may be controlled using one or more trader stations 230 either locally or through a communication link 250. Alternatively, the automated trading system computer 225-2 may be controlled through the communication computer 225-1 (as indicated by the dotted lines), which would serve to communicate information between the trader stations 230 and the automated trading system computer 225-2.

Figure 3:
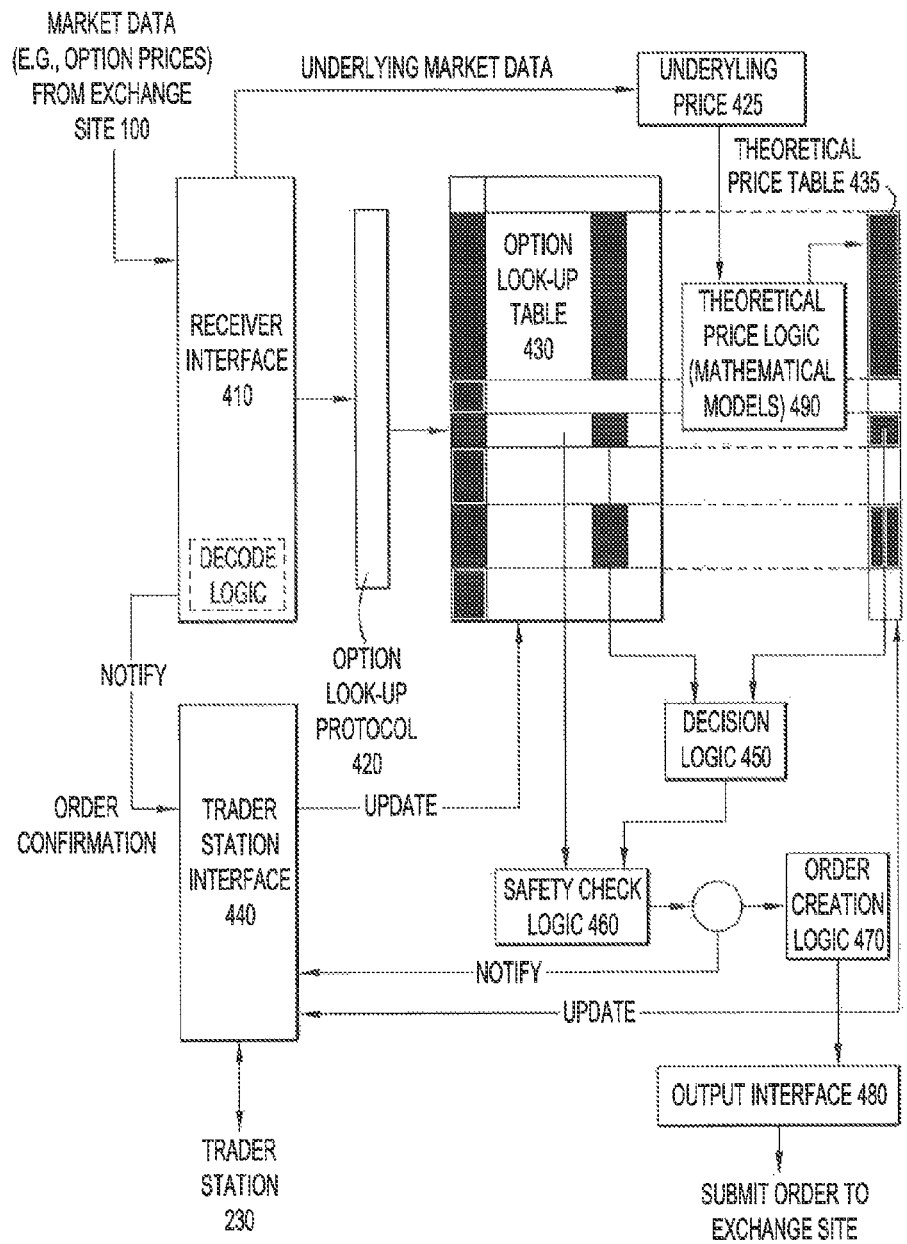
FIG. 3 provides a schematic of the functionality of an embodiment of an automated trading system in accordance with the present invention.

FIG. 3 provides a functional diagram illustrating the operation of an embodiment of an automated trading system used in connection with options trading. Of course, the embodiment may be modified for use in trading other securities (e.g., futures, swaps or other derivatives; currencies, stocks, bonds, or other physicals like corn, precious metals, electricity, etc.) and/or other items traded on the exchange. As described in greater detail below, the general function of the automated trading system is to generate and automatically submit responses (such as orders or quotes) for transmission to an exchange based on market data received from the exchange and/or other sources. The automated trading system may perform this function in several different ways, as discussed greater detail below, including calculating a theoretical value for the traded item in real time when one or more of the underlying factors that affect the theoretical value changes. The calculated theoretical value is then used to determine whether an order or quote should be submitted based upon existing market prices for the traded item.

The automated trading system is preferably resident in the backend computer 225 as configured in FIG. 1, which may utilize multiple CPUs. However, it may also be resident in one or more of the trader stations 230 or the backend computers 220. The automated trading system software may run in a text-based environment or a Windows or Windows-like environment. For example, the automated trading system may be run on an operating system, such as VMS, DOS, or LINUX, or in a WINDOWS or similar operating system, which is more user-friendly. In some operating systems, automated trading may be assigned priority over other tasks or processes and run without debug messages. Local decision-making times of less than 250 microseconds have been achieved in a text-based VMS system run on a backend computer 225 and times of 50-150 milliseconds or less have been achieved on a Windows-based system run on a trader station 230, depending on the processor load from other tasks. In some operating systems, automated trading may be assigned priority over other tasks or processes and run without debug messages.

The automated trading system receives and decodes current market information broadcast from the exchange site 100 through a receiver interface 410. The decoding of market information may be performed, for example, transparently by software supplied by the exchange for use with the backend computers, by the exchange software at the request or direction of the automated trading system, or by the automated trading system itself. The current market information may include information related to the options and an underlying security of the option. Market bid, ask and last prices and the day's volume for call and put options and the underlying security, to name a few, are typically received by the trader site. A call option is the right to buy the underlying security at a specified time in the future at a specified price, while a put option is the right to sell the underlying security at a specified time in the future at a specified price.

An option look-up table protocol 420 indexes an option data table 430. The option data table 430 stores information concerning options that may be automatically traded. For simplicity, a two-dimensional table having rows and columns will be described. However, it should be understood that higher dimension arrays or tables may be used in connection with the present invention. Each row of the option table 430 stores information relevant to a particular option including for example, option name, current market option prices, times and quantities of the most recent trades by the trader, maximum order quantity, inputs that may needed to calculate option transaction prices, and whether automated trading is enabled for the option. As discussed further below, this information may be used as a check against erroneous operation. Alternatively, option data table 430 may store information in connection with items that are actually being automatically traded at a given time. As a further alternative, option data table 430 may store information in connection with all of the options that may be subject to automated trading and include indices or pointers that link only the items currently enabled for automated trading. Accordingly, any search of the option data table can skip those entries for which automated trading is not enabled. In such a case, an additional option data table may be maintained for the full set of items for which automated trading may be performed. This is useful in increasing the speed at which a disabled option can be enabled. Accuracy checks may use both the additional option data table and option data table 430. Communications between the automated trading system and the trader stations 230 are conducted through a trading station interface 440. For example, a trader station 230 may update information contained in the option data table 430 via a trading station interface 440. In this way, the option data table 430 may be updated to enable (disable) automated trading for a particular option.

The option data table 430 may be organized in several different ways. For example, the market bid and ask prices for a particular option may be stored in different rows of the option data table 430. Alternatively, the bid and ask prices may be stored in the same row of the option data table 430, but in different columns, or as different cells in a price dimension, for example. Also, the option data table 430 may be segmented, for example, so that all bid prices are grouped together and all ask prices are grouped together. Different classes of options (i.e., options with different underlying securities) may be indexed in a single data table 430 or in multiple look-up tables 430, for example, with each option having its own look-up table 430.

In addition to the current market information concerning option trading, the automated trading system may receive and decode current market information concerning the security (or securities) underlying the options. For example, an exchange that trades the underlying security typically maintains a book of bid (ask) prices and quantities of current order and quotes of those traders wishing to buy (sell) the underlying security. The automated trading system may receive the underlying market information, for example, from the exchange site 100, from a separate exchange site, or from another market feed either directly or indirectly, e.g., through a trader station 230. The underlying market information for a given security may be stored in option data table 430, which may be formed in the memory of backend computer 225, since it may be one of the inputs needed to calculate option transaction prices. Theoretical price table 435, which may be formed in the memory of backend computer 225, may store option transaction prices for options defined in option data table 430 and/or the additional option data table described above.

The theoretical prices for derivatives, such as options, may be determined using complex mathematical models. Theoretical price logic 490 is tasked with generating the theoretical prices based on input information. Theoretical price logic 490 may be implemented in hardware or in a combination of hardware and software. For example, theoretical price logic may be implemented by the central processor and memory, and possible other equipment useful in performing fast mathematical calculations, in a general purpose computer. Alternatively, the theoretical price logic may be implemented in a separate processor in communication with the processor of a general purpose computer or an array of processors. Of course, theoretical price logic 490 may be embodied by other devices capable of generating theoretical prices as described herein.

Theoretical price logic 490 generates theoretical prices in accordance with mathematical models. The mathematical models produce a theoretical value for an option given values for a set of option pricing input variables that may change over time. Option pricing input variables considered in these models may include (1) the current market price of the underlying security (e.g., the price of the stock or future from which the option is derived), (2) interest rates, (3) the future volatility of underlying security, (4) dividend stream, (5) time until expiration, (6) whether the option can be exercised before the expiration date, and (7) whether the option is a call or put. Option pricing input variables (2)-(7) are not likely to change as frequently as the price of the underlying security, option pricing input variable (1). Some option pricing input variables, such as price of the underlying security, can be derived from the market. Other option pricing input variables, such as the future volatility of the underlying security, require some qualitative assessment by the trader.

The current market price of the underlying security may be defined in several different ways. At any given time during normal trading, the underlying security will usually have: (1) bid prices and quantities; (2) ask prices and quantities; (3) a last price and volume at which the underlying security was traded (last price); (4) an average of the current highest bid and lowest offer prices (average best bid, best ask price); and (5) an average price of a certain depth, among other values. The average price of a certain depth, say 5000 shares, would take the average of the: (a) best (highest) bid prices in the book of the first 5000 shares, and (b) best (lowest) offer prices in the book of the first 5000 shares. Obviously, there are many more definitions of underlying price that can be created, for example, using permutations of the five definitions provided above.

It is highly probable that at least four of these five definitions will yield (perhaps slightly) different results at any time. Since the normal hedging response of an option trade is to buy or sell the underlying security, the option trader may very carefully define underlying price used in her models. Specifically, buying (selling) calls and selling (buying) puts will usually lead to selling (buying) the underlying for hedging. For reasons discussed further below, the trader may want to set the theoretical buy price for call options and the theoretical sell price for put options using the bid price (and/or possibly bid underlying depth) of the underlying security. Likewise, the trader may want to set the theoretical sell price for call options and the theoretical buy price of put options using the ask price (and/or possibly the ask underlying depth) of the underlying security. In summary, theoretical value calculations used for automatic option trading may use any of several definitions of underlying price.

In addition to generating a theoretical value for an option, the trader may select a buy spread and a sell spread to compute an option transaction price. The buy spread may be subtracted from the theoretical value to produce the theoretical buy price—the highest price at which the trader is willing to buy a particular option using automated trading. The sell spread may be added to the theoretical value to produce the theoretical sell price—the lowest price at which the trader is willing to sell a particular option using automated trading. Accordingly, the trader would like to sell an option having a bid price that is the same as, or higher than, the trader's theoretical sell price. The trader would like to buy the option from anyone offering a price that is the same as, or lower than, the trader's theoretical buy price. Of course, buy and sell spreads may be defined by the trader in either absolute terms (i.e. theoretical buy price=theoretical price−0.10) or percentage terms (i.e. theoretical buy price=theoretical price−0.01*theoretical price). In summary, buy and sell spreads may be used to calculate option transaction prices such as theoretical buy and sell prices.

Accordingly, in the embodiment illustrated in FIG. 3, the theoretical table 435 stores option transaction prices including a theoretical buy and sell price of the options for which automated trading is performed. For example, if automated trading is performed for options underlying Exxon stock, the theoretical price table 435 contains the theoretical buy and sell prices of Exxon stock options. If any of the inputs affecting option transaction price changes, the theoretical price table 435 can be updated. Of course, the theoretical price table 435 may be formed as part of the same table as option data table 430. However, option data table 430 and theoretical price table 435 will be described separately for the sake of convenience and not by way of limitation.

Similar to the option data table 430, the theoretical price table 435 may be organized in several ways. For example, all theoretical option buy prices for a given set of option pricing input variables (1)-(7) may be provided in a single column of theoretical price table 435, with a separate theoretical table provided for theoretical sell prices. Alternatively, the theoretical table 435 may index both a theoretical buy price and a theoretical sell price. The theoretical price table 435 may be segmented or multi-dimensional. Moreover, the theoretical price table 435 may be combined with, form a portion of, or be linked to option data table 430. The values in theoretical price table 435 may be compared with market option prices and may trigger automated buy or sell decisions by the system. While the theoretical price table 435 may take many forms, a table like the option data table 430 with each row representing a single option will be described for purposes of simplicity. As noted above, it should be understood that data structures other than tables may be used in connection with the present invention.

In addition, the option data table 430 and theoretical price table 435 can be structured consistent with the particular search protocol used by the table update protocol 420 so that certain options or other items are located by the update protocol before other options or items. For example, if table update protocol 420 implements a linear search, the contents of option data table 430 for options at the top will be updated before options at the bottom even when multiple rows need updating. If the change in content affects the option transaction prices stored in theoretical price table 435, this implies options near the top could be recalculated and compared against market option prices before options at the bottom theoretical price table 435. Accordingly, the trader station 230 or the backend computer 225 may structure the option data table 430 and/or the theoretical price table 435 so that options that have shown in the past, or are likely to show in the future, the most promising profits will be located first. The particular order of the options in the tables 430 and 435 may depend on the trading volume in an option, for example. Options with relatively high traded volumes over recent trading days or the current trading day may be given a higher priority rating in table 430 and/or theoretical price table 435. Moreover, some exchanges may limit the number of orders or quotes that a particular trader may have pending at a given time. For example, in some versions of the EUREX system, a trader can not submit a new quote before a confirmation that a previously submitted quote had been received from the exchange. Accordingly, structuring the tables 430 and 435 as described increases the opportunity for the trader to participate in the most lucrative transactions when there are restrictions on the number of concurrent orders placed. In addition, or in the alternative, the theoretical price logic 490 may calculate theoretical prices first for options likely to yield the highest profits. The calculated theoretical prices may be supplied to the decision logic 490 either before the theoretical price logic calculates the theoretical price of another option or concurrently therewith.

In accordance with the embodiment shown in FIG. 3, the trader station 230 may respond to changes in market conditions by changing any of the option pricing input variables (1)-(7), changing buy or sell spreads, or changing any other variable that might effect option transaction prices. These changes would update the appropriate values for each option of the option data table 430 and then, since the changes affect option transaction prices, would trigger a recalculation of theoretical buy and/or sell prices in theoretical price table 435. Of course, updates to option data table 430 may originate directly from exchange 100 or backend computer 220, or even some other source. For instance, option pricing input variable (1), the price of the underlying security, used in option pricing models, may be received dynamically by backend computer 225 from exchange 100 rather than being received from trading station 230. In this case, option data table 430, and, subsequently, theoretical price table 435 would be updated automatically in real time with no trader intervention.

Calculating the theoretical value for options or other financial derivatives can be relatively time consuming. The speed of these calculations becomes especially critical when considering an exchange, such as the EUREX may list some tens of thousands of options that a trader may want to continuously evaluate in real time. The time needed to calculate these values may depend upon the option's specifications, the particular mathematical model used to calculate the theoretical value, the use of pre-calculation or other calculation short cuts, and the level of desired precision of the calculated theoretical value. Obviously, hardware is also an important consideration, as faster and more efficient computers tend to reduce calculation times. Below is a comparison of some average times (in microseconds, us) needed to calculate a single theoretical price of some common options with different specifications using different mathematical models on PC using a Pentium III 450 MHz CPU and 128 MB of RAM:

Note, an "NA" means the mathematical model is not appropriate to calculate a theoretical price of an option with those specifications. The option specifications and each of the theoretical price models are known in the art and will not be described here. Of course, other mathematical models may be used besides the ones listed above.

Note that these times can vary as much as a factor of about 200×. If speed were the only consideration for choosing the model to use for calculating values in theoretical price table 435, then the models having the smallest computation times would probably be picked. However, other factors may be taken into account when selecting a model. For instance, a trader may find that certain models yield theoretical prices that are more market-realistic than other models. The trader will ultimately profit by trading (buying and selling) with other market participants. Thus, a particular trader may select a model that, in the trader's opinion, best reflects these trading conditions, even at the expense of higher computation speeds. Accordingly, comparisons between theoretical prices and actual market prices may be necessary to decide which mathematical model to use. This comparison and model decision may be re-evaluated over time to reflect any changes in market conditions.

The times cited in the table above are typical for calculating a single theoretical option price without the use of pre-calculations, approximations, or other computational short cuts. Times for calculating subsequent theoretical prices for a given option may be reduced if part of the calculation made for the original option is stored and then used for the next calculation, or part of the calculation has been pre-calculated entirely before the first theoretical price has been calculated. Moreover, using part of the calculation of an option that is similar to the given option may reduce the calculation time for a given option.

For instance, the Black and Black-Scholes models contain an exponential term ($e^{-rt}$) related to the cost of carry. This term is unlikely to change frequently, since the three terms (e=natural log constant, r=the interest rate, and t=time until the expiration of the option) are unlikely to change frequently for a given trading day. This means that the term $e^{-rt}$ may be pre-calculated before the first theoretical price is calculated, or stored after the first theoretical price is calculated Using the approach of pre-calculating the exponential term $e^{-rt}$, the computation times needed for the Black model for futures with no early exercise and the Black-Scholes for stock with no early exercise and a dividend can be reduced by about 30% (1.1 us vs 1.7 us for Black, 1.3 us versus 1.9 us for Black-Scholes model). Likewise, the Cox-Rubenstein model has calculations which are: (1) common to all strike prices for a

| Option Specifications | | | Models | | | | | |
|---|---|---|---|---|---|---|---|---|
| Type of Underlying Security | Early Exercise | Dividend | Black | Black-Scholes | Cox-Rubenstein | Garman-Kohlhagen | Implicit Finite Difference | Roll-Geske-Whaley |
| Future | No | No | 1.9 | 1.9 | 32.5 | NA | 338 | NA |
| Future | Yes | No | NA | NA | 77.0 | NA | 397 | NA |
| Stock | No | No | NA | 1.7 | 32.2 | NA | 338 | NA |
| Stock | Yes | No | NA | NA | 76.7 | NA | 396 | NA |
| Stock | No | Yes | NA | 1.9 | 33.4 | NA | NA | NA |
| Stock | Yes | Yes | NA | NA | 78.0 | NA | NA | 67.7 |
| Currency | No | No | NA | NA | 32.5 | NA | 339 | NA |
| Currency | Yes | No | NA | NA | 80.7 | 2.1 | 397 | NA | given underlying price and volatility, and (2) common for a given strike price independent of underlying price. Using the approach of using pre-calculated common values such as base nodes, the calculation times needed for the Cox-Rubenstein model for stock with dividend and early exercises may be reduced by about 10% (69.4 us versus 78.0 us). Likewise, the Garman-Kohlhagen model has calculations that are independent of strike price and underlying price. Specifically, there are two exponential terms like the one in Black and Black-Scholes, related to cost of carry in domestic and foreign currencies. If these values are pre-calculated, the computation times needed for the Garman-Kohlhagen model for currencies with early exercise can be reduced by about 40% (2.1 us versus 1.2 us). Likewise, the Roll-Geske-Whaley model uses a term that yields the underlying price assumed necessary for early exercise for call options. This term is independent of strike price and underlying price and is solved using numerical analysis. If the value of this term, as well as some exponential terms related to time decay are pre-calculated, the calculation times needed for the Roll-Geske-Whaley model for stock with dividend and early exercises may be reduced by about 60% (37.2 us versus 67.7 us). Thus, pre-calculation of certain parts of the mathematical models used for determining theoretical prices may reduce total computation times of single or groups of similar options. Pre-calculation may be performed by back end computer 225, trader stations 230, back end computer 220, or another computational resource, for example, upon initialization of these computers or upon selection of automated trading. Of course, rather than calculating the theoretical values in real time, a pre-calculated look-up table of theoretical values may be used, as described in U.S. application Ser. No. 09/417,774 to Marynowksi et al., filed on Oct. 14, 1999, and expressly incorporated herein by reference.

Pre-calculating certain parts of the mathematical models reduces computation times without compromising the precision of the models. This means a theoretical price of a given option under a given set of conditions calculated using a given model using pre-calculated values would be identical to the theoretical price calculated using no pre-calculated values. Also, pre-calculating certain parts of the mathematical models also allows the off-loading of this computational overhead from the computers assigned to automated decision making. For instance, in one preferred embodiment, the pre-calculating tasks can be moved from backend computer 225 to, say, trading station 230. In this case, trading station 230 may calculate the required pre-calculated values upon initialization and any time one or more of the inputs of term being pre-calculated changed. The pre-calculated values may be stored in option data table 430 and used by backend computer 225 when updating theoretical price table 435.

Extrapolation may also be used to reduce computation times when using mathematical models to compute theoretical option prices. Consider the case when a theoretical option price has been computed for a given set of conditions. The input most likely to change is the price of the underlying security of the option. The mathematical models discussed above allow for the first derivative (the "delta" of an option) and second derivative (the "gamma" of an option) of the theoretical option price with respect underlying price to be calculated. If an option's theoretical price, delta, and gamma are known for a given set of assumptions, and only the price of the underlying security changes, an extrapolated theoretical price at the new price of the underlying security may be calculated based on the previously calculated theoretical price and the delta and gamma Consider the example where for given set of option pricing input variables (2)-(7) and price of the underlying security=80.00, the theoretical price of the option=7.20, delta=0.40, and gamma=0.10. Now assume the price of the underlying security changes from 80.00 to 80.60, or a change of +0.60. Using the extrapolation method, the new theoretical option price can be estimated as: Old Theoretical Option Price+(Change in Underlying Price)*(Delta+Change in Underlying Price*Gamma/2)=7.20+(0.60)*(0.40+0.60*0.10/2)=7.46. The pre-calculated delta and gamma values may be stored in option data table 430, or elsewhere. The table below summarizes typical computation times (in microseconds) using baseline, pre-calculation and extrapolation methods:

| Option Specifications | | | | Methodology | | |
|---|---|---|---|---|---|---|
| Security | Early Exercise | Dividend | Model | Baseline | Pre-Calculated | Extra-polation |
| Future | No | No | Black | 1.9 | 1.1 | 0.48 |
| Stock | No | Yes | Black-Scholes | 1.9 | 1.3 | 0.48 |
| Stock | Yes | Yes | Cox-Rubenstein | 78.0 | 69.4 | 0.15 |
| Currency | Yes | No | Garman-Kohlhagen | 2.1 | 1.1 | 0.47 |
| Stock | Yes | No | Implicit Finite Difference | 396 | NA | 0.19 |
| Stock | Yes | Yes | Roll-Geske-Whaley | 67.7 | 37.2 | 0.90 |

Note that the extrapolation methodology times include the steps of calculating the delta and gamma at the original underlying security price, as well as the actual extrapolation step. As the results above show, the extrapolation method yields considerably lower computation times compared to the baseline and pre-calculate methods. Also, note that the computation times of the extrapolation methodology are relatively consistent in absolute terms (i.e. less than 1.0 microsecond) across model type. This arises because the calculation of the delta and gamma, and the extrapolation step can be performed quickly relative to the entire process of calculating the theoretical option price using each of the models. Of course, the delta and gamma may be calculated in a prior step before the extrapolation calculation is initiated, which reduces the overall time to obtain the extrapolated theoretical price.

The advantage in speed of the extrapolation method may be offset by deficiencies in precision under certain circumstances. The extrapolation method assumes a constant gamma value over the range of the old and new underlying prices. This assumption may lead to differences in calculated theoretical option prices compared to using the baseline methodology with the same model at the new underlying price. The differences arise because the actual gamma was not constant across the range of underlying prices being considered. The magnitude of these differences may depend upon many factors, including time left to expiration, volatility assumed of the underlying security, strike price of the option relative to underlying security price, and magnitude of expected differences between the old and new underlying prices. Thus, the extrapolation method may not always be adopted, since there may be a trade-off between computation speed and precision. Accordingly, the trader may want to evaluate the magnitude of differences in precision for her particular trading conditions before adopting the extrapolation methodology.

Of course, the delta and gamma values used in the extrapolation method may be pre-calculated by a computer different than the computer making the automated trading decisions. For instance, in one preferred embodiment, the task of pre-calculating the delta and gamma values may be moved from backend computer 225 to, say, trading station 230. In this case, trading station 230 may calculate the required delta and gamma values upon initialization and any time one or more of the inputs used to calculate the delta and gamma values change by some pre-defined quantity. These delta and gamma values may be stored on backend computer 225 in option data table 430. If trading station 230 precalculates the delta and gamma values in option data table 430, the time for calculating a theoretical price using the extrapolation method becomes independent of the mathematical model used to generate the delta and gamma values stored in option data table 430. This is because the delta and gamma values are pre-calculated and do not have to be calculated as part of the extrapolation. Using the hardware specifications described above (i.e. 450 MHz Pentium III cpu, 128 MB RAM), typical computation times are less than 0.01 us.

Interpolation is another method to reduce computation time needed to calculate theoretical prices for options. Consider the case where the theoretical option prices are calculated for a given set of conditions, but for varying underlying prices. For instance, option pricing input variables (2)-(7) may be assumed constant and theoretical option prices may be calculated using, for example, underlying prices that vary the same amount above and below the current underlying price. Assume theoretical prices are calculated for a given set of conditions with option pricing input variables (2)-(7) remaining constant and for the following underlying prices to form an interpolation table:

| Assumed Underlying Price | Theoretical Option Price |
| --- | --- |
| 80.50 | 2.66 |
| 80.00 | 2.50 |
| 79.50 | 2.30 |

Using these points and assuming, say, a linear relationship between underlying price and option price, theoretical option prices may be calculated using interpolation for any new underlying price between 79.50 and 80.50. For instance, assume the underlying price changed to from 80.00 to 79.60. Using a linear interpolation method, the new theoretical option price can be calculated as:

$$\text{New Theo Price} = \text{Theo1} + (AUP\text{new} - AUP1)*(\text{Theo2} - \text{Theo1})/(AUP2 - AUP1)$$

where:
New Theo Price—the new theoretical option price for the new underlying price, Theo1—the theoretical option price for the first assumed underlying price (2.30),
AUPnew—the new underlying price (i.e., 79.60 in the example),
AUP1—the first assumed underlying price (79.5 in the example),
Theo2—the theoretical option price for the second assumed underlying price (2.50 in the example), and
AUP2—the second assumed underlying price (80.0). In the example, the New Theo Price is calculated to be 2.34.

Interpolation is similar to extrapolation in that precision may be sacrificed since a constant, say linear, relationship is assumed to exist between theoretical option price and underlying price over the range of underlying prices used for interpolation. This constant relationship may not be valid and the actual theoretical option price calculated using the same model at, say 79.60, would be somewhat different than the interpolated result of 2.34. As with the extrapolation method, the magnitude of these differences may depend upon many factors. These factors include time left to expiration, assumed volatility of the underlying security, strike price of the option relative to underlying security price, difference between assumed underlying prices, and distance between the expected underlying prices and assumed underlying prices. Of course, there is no sacrifice in precision for any underlying price found in the interpolation table, since these theoretical option prices have been calculated exactly for those underlying prices.

Likewise, reducing the distance between assumed underlying prices used for interpolating may increase precision. For example, adding theoretical option prices for underlying prices of 80.25 and 79.75 to the interpolation table above would probably improve precision of calculated theoretical option prices. This arises because the (1) assumed linear relationship between underlying price and theoretical option price is over a smaller underlying price distance, and (2) chance of an underlying price matching an underlying price already in the table increases. Of course, if the new underlying price equals one of the assumed underlying prices in the interpolation table, no interpolation is required and the theoretical prices corresponding to the underlying price may be passed to the theoretical price table 435. Obviously, the interpolation table can be expanded to include all possible underlying prices within an expected underlying range, since the exchange usually defines a minimum "tick size" (i.e., smallest increment of change) of the underlying security. In the limit of the interpolation table including all possible underlying prices (say between 79.00 and 81.00, in steps of 0.01) the interpolation table resembles a look-up table since no interpolation is necessary for any underlying price within the underlying price range. The use of a look-up table to calculate theoretical values is described in U.S. application Ser. No. 09/417,774 to Marynowski et al., which is incorporated by reference.

Times needed to calculate new theoretical option prices are the fastest when values in the table above are pre-calculated and the new underlying price falls in the range of the underlying prices in the table. Under these conditions and using the hardware specifications described above (i.e., 450 MHz Pentium III cpu, 128 MB RAM), typical computation times for underlying prices not matching an underlying price in the table are less than 0.01 us. Interpolation between any two assumed underlying prices requires a constant time (i.e. less than 0.01 us), regardless of model used to calculate the theoretical prices if the theoretical prices are in the pre-calculated interpolation table. Calculation of the theoretical option prices can be done away from backend computer 225 on, say, trading station 230. The interpolation table may be dynamically centered around the market underlying price. For instance, trading station 230 may be asked to calculate and send backend computer 225 a new interpolation table if the underlying price moves outside of some pre-defined underlying price range. The interpolation table, containing underlying prices and the corresponding theoretical option prices, can be stored in option data table 430 on backend computer 225, in the theoretical price logic, or in another accessible memory location. New theoretical option prices calculated for the current underlying price may be stored in theoretical price table 435.

Referring still to FIG. 3, decision logic 450 compares the theoretical price calculated and stored in the theoretical price table 435 to the market price for the option and, based on the comparison, determines whether the option should be bought or sold, or no action should be taken. For example, in an embodiment in which the theoretical price table 435 stores theoretical buy and sell prices for a particular option, decisions may be triggered when: (1) a theoretical option price in table 435 changes, but the market bid and ask prices of the option remain the same, (2) the market bid or ask price of the option changes, but the theoretical prices in table 435 remains the same, (3) automated trading is enabled for a particular option, and (4) when safety checks are relaxed for a particular option.

Consider example (1) in which a theoretical price of a particular option stored in theoretical price table 435 changes and the bid and ask prices of an option remain static. As noted above, the theoretical price table 435 may be updated when one or more of the values that affect the theoretical buy and sell prices changes such as, but not limited to, the buy and ask spreads and/or option pricing input variables (1)-(7). For example, option pricing input variables (1)-(7) discussed above could change, perhaps due to a change in the trader's assessment of market conditions. These changes may occur when the trader enters new information through a trader station 230 or when new information becomes available through another source (e.g., a change in interest rate occurs in a database associated with the trading site 200). A change in one or more of option pricing input variables (1)-(7) triggers a re-computation of (probably) all values in the theoretical price table 435. As noted above, re-computation may involve re-calculating the theoretical price in its entirety or using pre-calculated values, extrapolation, and/or interpolation. For purposes of discussion below, assume option pricing input variable (1), the price of the underlying security, changes and thereby changes a theoretical buy or sell price of a particular option in theoretical price table 435. Decision logic 450 will compare the current market ask (bid) price of the option to the new theoretical buy (sell) price obtained from the theoretical price table 435. In this case, the decision logic 450 performs all comparisons affected by the change in underlying price. For example, a change in the bid (ask) price of the underlying security may affect the theoretical buy (sell) price of some or all call options and the theoretical sell (buy) price of some or all put options associated with the underlying security. Accordingly, the decision logic 450 makes comparisons of market bid or ask prices corresponding to new theoretical sell and buy prices.

Consider example (2) in which the market bid (ask) price for a particular option changes and the theoretical prices of the option remain constant. The decision logic 450 will compare the new market bid (ask) price to the corresponding theoretical sell (buy) price that exists at that time from the theoretical price table 435. Accordingly, a change in market bid (ask) price of a particular option may trigger a comparison of market bid (ask) price to theoretical sell (buy) price. Based on the comparison, for example, if the market bid (ask) price is greater (less) than or equal to the theoretical sell (buy) price, the automated trading system may prepare a response (such as an order or quote) for the particular option.

Consider example (3) when automated buying or selling trading for a particular option is changed from disabled to an enabled state. This could arise, for instance, at the beginning of the trading day if the default state of a new trading session on trading station 230 is all options disabled. Enabling automated selling (buying) for a particular option or group of options can trigger decision logic 450 to make a comparison of the market bid (ask) prices to the theoretical sell (buy) price in table 435.

In addition to enabled and disabled states, a third, "swarming up" or "test" state may be provided for an option in the automated trading system. In this third state, the automated trading system may perform all steps except actually placing an order. This allows the trader to monitor the operation of the automated trading system without actually submitting orders, thereby reducing the risk of enabling options for automatic trading using theoretical prices which are not market realistic.

Consider example (4) in which a safety check for a particular option is relaxed. This could arise, for example, if a global safety check condition implemented by safety check logic 460 is disabled or changed. For example, a safety check condition relating to the maximum quantity or frequency of trading attempts of a particular option may be increased via a command from trading station 230. In connection with the trading frequency condition, the entire automated trading system may be held in a "pause" state if it had made more than a predetermined number (e.g., 3) automated trading attempts within a predetermined time period (e.g., 60 seconds). If this global safety check is disabled or relaxed, for example, by increasing the predetermined number of attempts (e.g., from 3 to 5), the trading frequency safety check may no longer be in violation. As a result, the entire automated trading system may transition from the "paused" state to the enabled state. If a particular option had been enabled for automated selling (buying), the decision logic 450 will then compare the market bid (ask) price to the theoretical sell (buy) price in table 435.

Of course, the automated trading system may be designed to automatically switch from the "enabled" to "paused" state if conditions are deemed too risky to run automated trading. For example, the automated trading system may change from an "enabled" state to a "paused" state when it senses, or receives a message, that: (1) communication in any of the communication links is not working properly, (2) trading has halted or closed in the underlying security and/or options of a particular security, (3) the options for a particular security are trading in a "fast market", as determined by exchange officials, (4) the difference between the ask and bid price of the underlying security is greater than some predetermined value, (5) the rate of change of the price of the underlying security is greater than some predetermined value, (6) trading in the underlying security is in an "auction" or "crossing" state, rather than normal "bid" and "ask" trading, and/or (7) release of known news events is pending. Assume the system automatically went into the "paused" state due to one of the conditions above. The system can be designed to either automatically go into the "warm-up" state when the triggering condition has passed, or require manual intervention to move from the "paused" to the "warm-up" stage. Obviously, the system should be designed to also let the trader manually switch the automated trading system from "enabled" to the "paused" state whenever the trader desires.

Decision logic 450 determines that a sell (buy) order should be submitted if the market bid (ask) price is greater (less) than or equal to the theoretical sell (buy) price. Even if decision logic 450 determines that an order should be submitted, safety check logic 460 may be used to prevent an order from being submitted. Safety check logic 460, for example, can block orders entirely, or put a cap on the maximum quantity attempted to be bought or sold, for an option when acceptance of that order would result in the trader having a position greater than a predetermined threshold quantity of that option. A trader may be also set a limit on, say, the total delta of an automated trading attempt. This may arise if she is concerned about the potential size of the delta hedge that might be needed relative to the depth and liquidity of the underlying security market. This would mean that each option might have a different maximum quantity and the quantity would be inversely proportional to the delta of the option. Also, the automated trading system may be paused or stopped if the number of attempted orders exceeds a predetermined amount in a predetermined period of time. The constraints may be stored in option data table 430 or elsewhere and may be varied for individual options. Other constraints may involve generating warnings and/or preventing orders, for example, when: (1) the theoretical buy price exceeds the theoretical ask price, (2) the theoretical buy price exceeds the theoretical value, (3) the theoretical sell price is less than the theoretical value, (4) the price of the underlying security moves outside some range, and/or (5) the theoretical sell price is less than the intrinsic value of the option. The intrinsic value may be defined as the difference between the strike price and the market price of the underlying security for puts, and the difference between the market price of the underlying security and the strike price for calls, where the minimum intrinsic value is zero. The trader may be able to override some or all of the checks performed by safety check logic 460 to increase speed of automated trading.

If the safety checks are passed (or overridden), order logic 470 creates a response and submits the response to the exchange site 100 via an output interface 480. The trading station 230 may be notified through a trading station interface whether or not the safety checks are passed. The output interface 480 may pass the order to exchange interface software for ultimate transmission to the exchange site 100. The receiver interface 410 and the output interface 480 may be formed by common equipment and/or data ports.

The option data table 430 and theoretical price table 435 can be checked periodically to ensure the accuracy of its content. For example, checks may be performed every, say, 15 seconds. This can be done, for example, by performing a checksum operation in which the entries of tables 430 and 435 table are summed and the sums are compared with the sums of a corresponding tables maintained by a trader station 230. If the sums match, option data table 430 and theoretical price table 435 may be presumed to be accurate. If the sums do not match, a warning is generated and automated trading is stopped completely or paused until option data table 430 and theoretical price table 435 are reloaded or updated and accuracy can be ensured. Of course, other or additional techniques for testing the accuracy of tables 430 and 435 may be implemented. Moreover, such an accuracy check may be omitted if one is sufficiently confident in the reliability of the software, hardware and communication networks.

Knowledge of how the search protocol locates data within the option data table 430 and theoretical price table 435 may be used to structure these tables to ensure that selected options will be located particularly quickly. The selected options may be, for example, frequently traded options and/or options whose price will become attractive with a small change in the underlying security price. For example, the search protocol may conduct searches by starting at the first row of the table and then stepping through each successive row until a particular row is identified. In this case, the tables 430 and 435 may be structured so that a select option is placed in the first row. Consequently, the search protocol will locate the select option first. Statistics may be maintained, for example, at a trader station 230, and used to restructure the tables 430 and 435 as trading conditions change. Further, when the market price of the underlying security changes, the theoretical price logic 490 may calculate the new theoretical prices in the same predetermined order as the search protocol, with the newly calculated theoretical price acted upon by the decision logic 450 either before or during calculation of the next theoretical price. In this way, the automated trading system calculates theoretical value and makes transaction decisions first for options believed to be most likely to generate profitable transactions, whether the decision logic 450 is triggered by a change in market price of the option, by a change in theoretical value, or otherwise.

The embodiment described in connection with FIG. 3 compares the current market price of an option to theoretical buy and sell prices from a theoretical price table 435 to make a buy/sell decision. However, other transaction values may be compared consistent with the present invention to generate buy/sell decisions. For example, the theoretical option value may be subtracted from the market bid (ask) price and compared to a sell (buy) spread selected by the trader to generate buy/sell decisions. Alternatively, implied volatilities may be calculated for market option bid (ask) prices using, say, mathematical models and inputs similar to those used for calculating theoretical option prices. These calculated implied volatilities may then be compared to trader-defined theoretical volatility values to make buy/sell decisions. Of course, other values may also be indexed and used for comparison to generate buy/sell decisions consistent with the present invention.

Figure 4A:
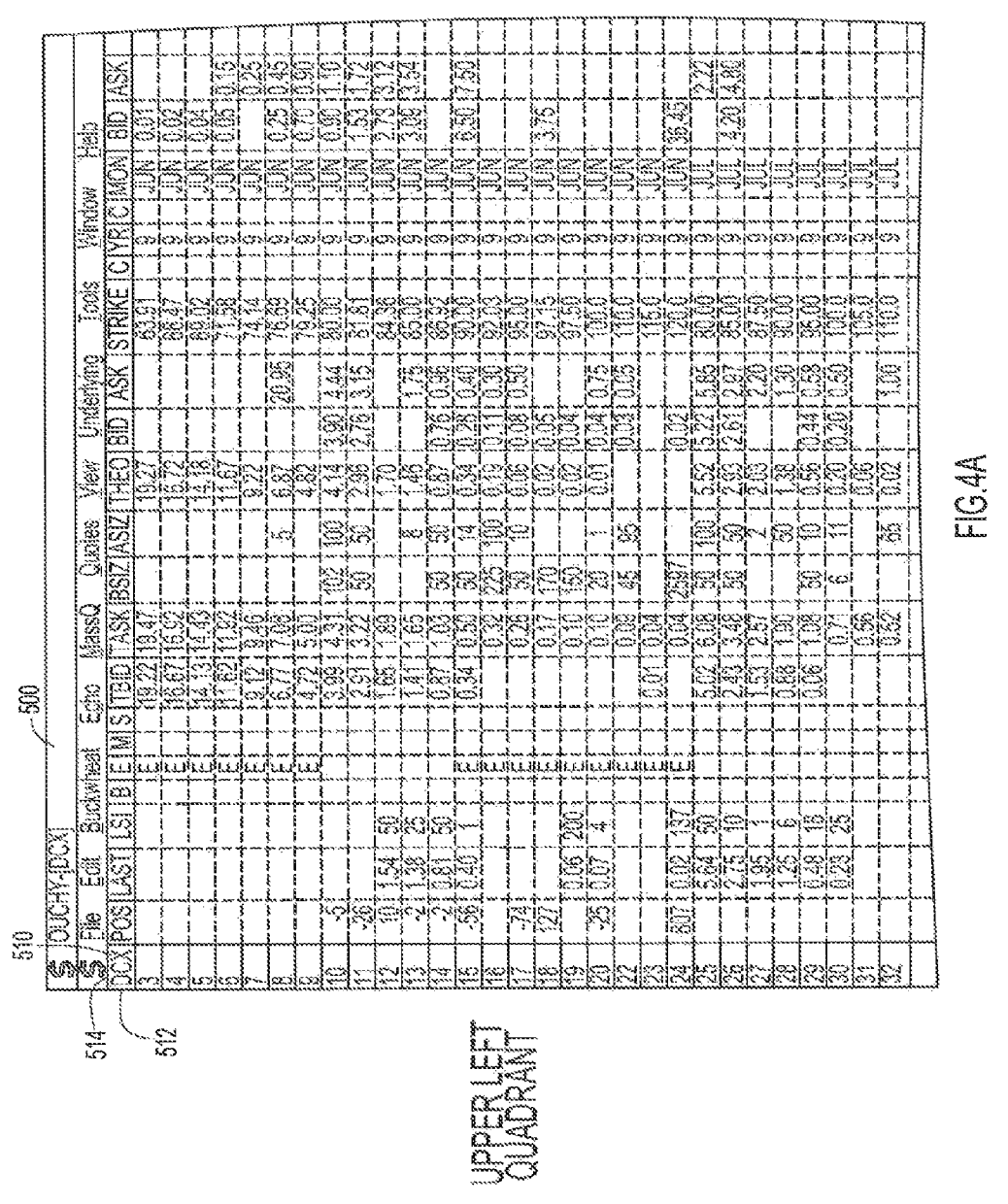
Figure 4B:
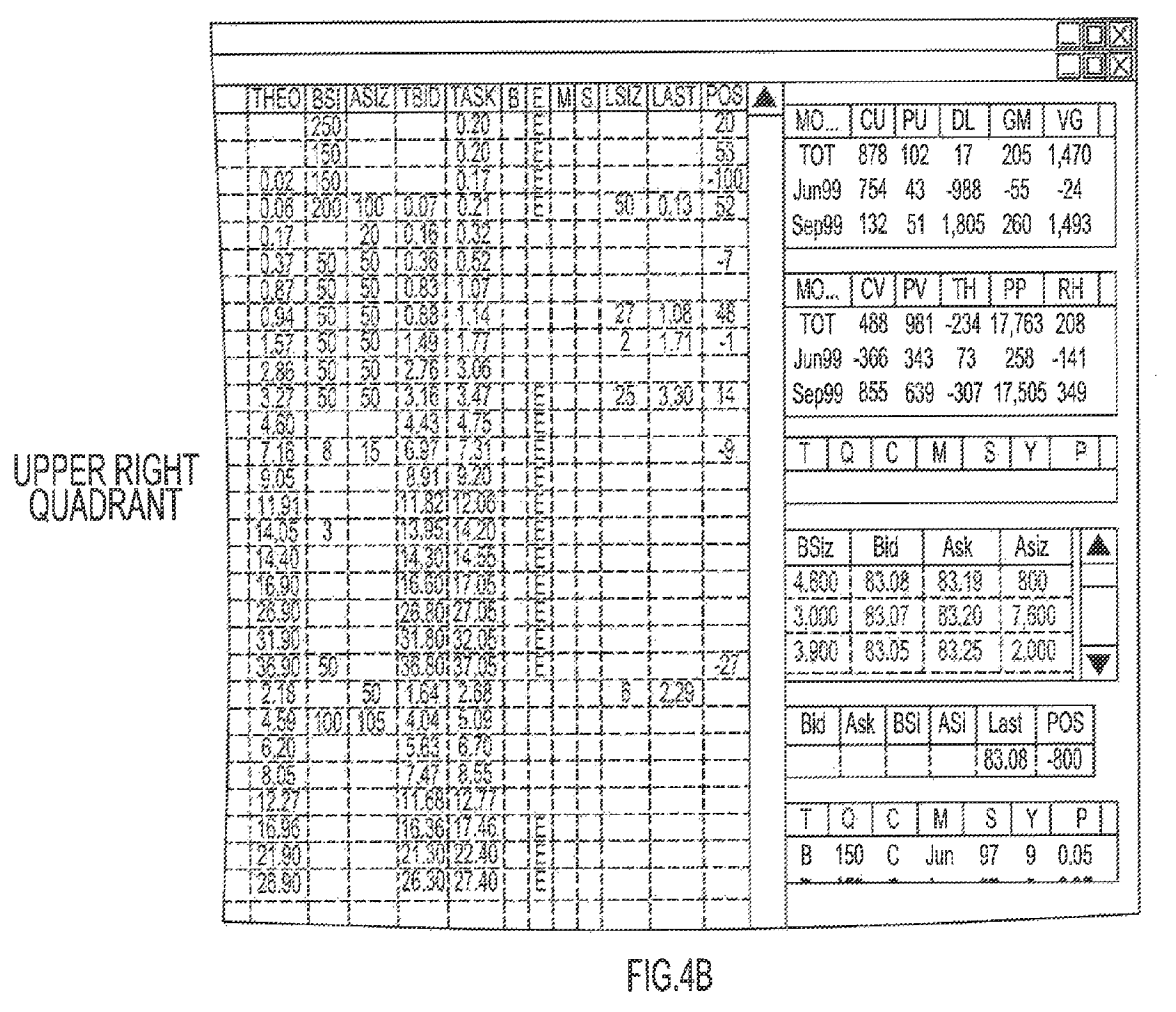
Figure 4C:
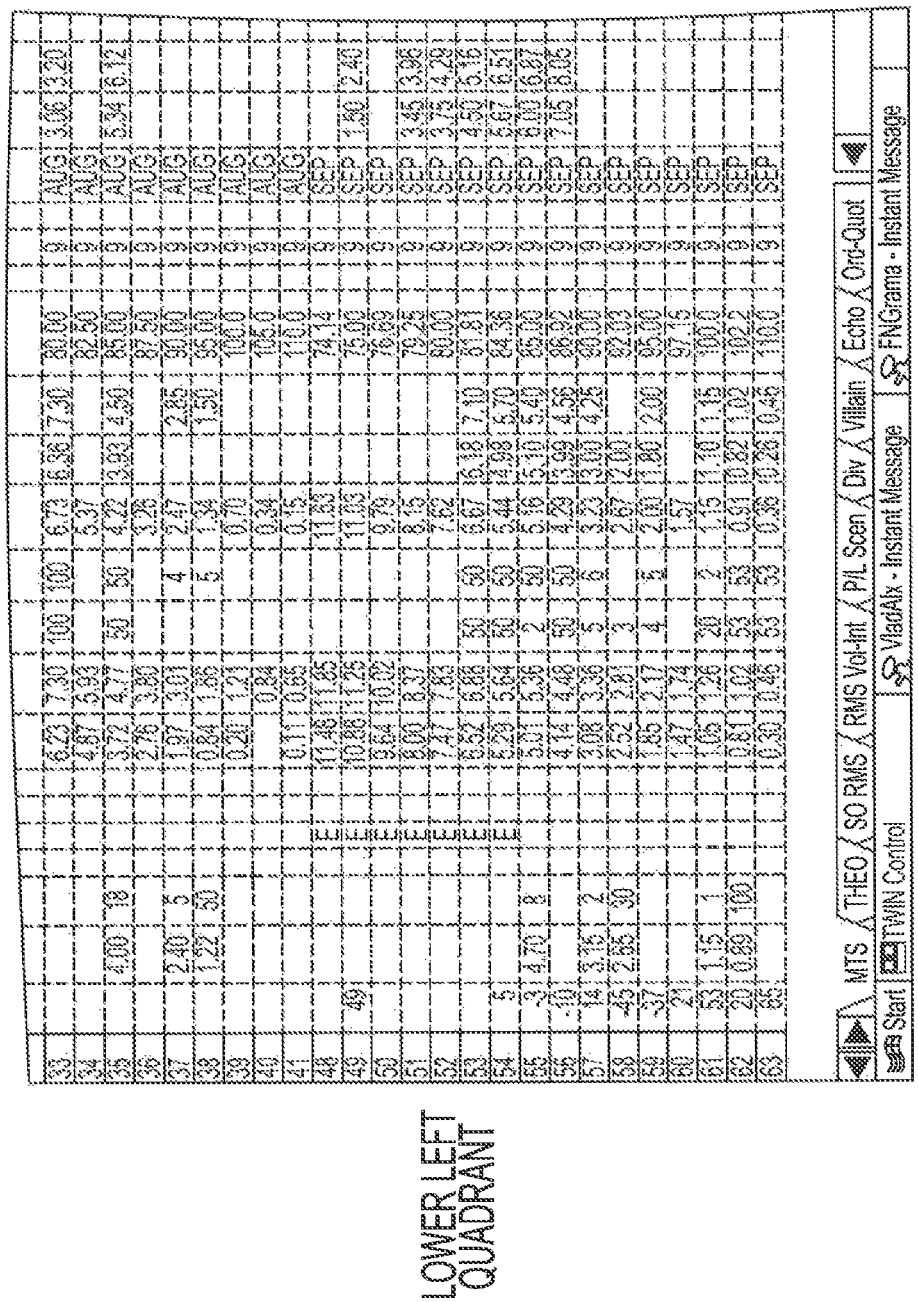
Figure 4D:
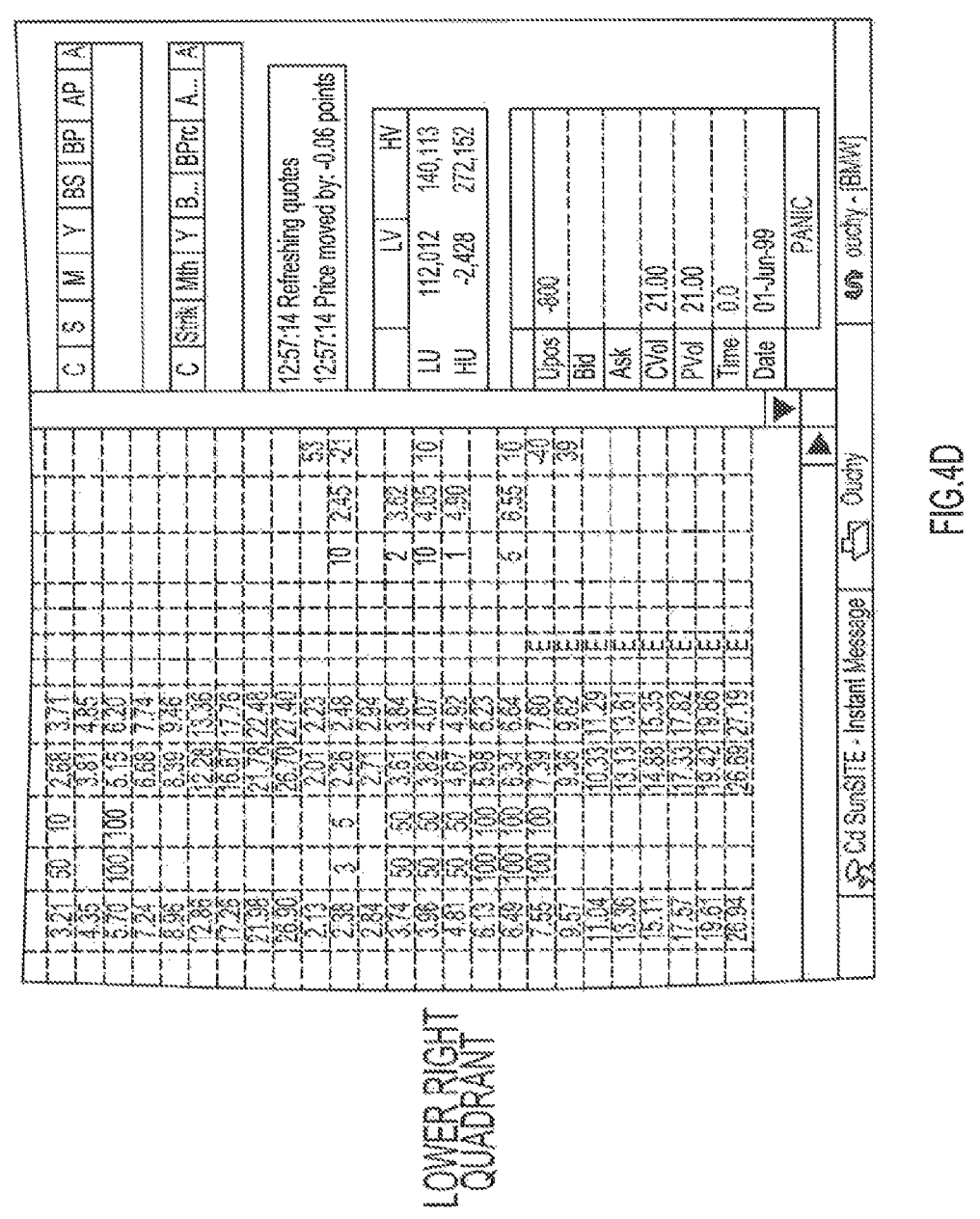

FIG. 4 illustrates an embodiment of a trader screen 500 displayed on a trader station 230 in connection with trading options on a particular security or commodity. The trading screen 500 may provide a graphic user interface to enable the trader to set parameters associated with automated trading. Trading screen 500 is organized as an array of cells 510. The rows 512 of the array represent different options available in the market for the particular security or commodity. The columns 514 of the array provide information concerning the options. More particularly, the columns to the left of the "Strike" column provide information on call options and the columns to the right of the "Mon" column provide information on put options. Call and put options are, thus, displayed as minor images of each other.

Each row of the array represents information relating to a different pair of call and put options for a particular strike price, month and year. The first column from left to right is labeled "DCX," which identifies the underlying security for the options as Daimler-Chrysler stock. The values below the "DCX" label consecutively number the rows of the array. The trading screen may be scrolled up or down to view additional rows in the array, if any exist. The next fourteen columns contain information relating to call options. The second column, "POS," is to the right of the "DCX" column. The values below the column heading POS indicate the trader's position (i.e., how many of the options the trader possesses) in call options for each row of the array. A negative cell value in the "POS" column indicates that the trader has sold more of the option than she has bought (this is called a short position.

Positive values denote a long position). Cells in the "B" column (three columns to the right of the "POS" column) indicate whether automated buying is enabled for the particular options corresponding to those cells. Cells in the "S" column (three columns to the right of the "B" column) indicate whether automated selling is enabled for the particular options corresponding to those cells. The trader may select one or more sells in the "B" and "S" columns to enable or disable automated buying and selling, respectively, of options corresponding to the selected cells.

The "TBid" and "TAsk" columns indicate the theoretical buy and sell prices for automated trading. The "Theo" column represents the theoretical value assigned to the call option for each row. To the right of the "Mon" column, the screen provides "TBid," "TAsk," "Theo," and "POS" columns, among others, for the put options in each row of the array.

Additional details concerning the remaining columns of the trader screen 500, as well as other information concerning its functionality, can be found in U.S. application Ser. No. 09/273,362 to Marynowski et al., filed Mar. 22, 1999, and U.S. application Ser. No. 09/417,774 to Marynowski et al., filed Oct. 14, 1999, both of which are expressly incorporated herein by reference.

The "POS" columns usually provide information received from the exchange site and are not adjustable by the trader. The "TBid," "TAsk," and "Theo" columns may be adjusted by the trader using a mouse, keyboard, or other input device, such as a game pad. For example, the trader may select a particular "TBid" or "TAsk" cell by clicking once and then using up or down arrows, for instance, to increase (arrow up) or decrease (arrow down) the value. Mathematically, this may be achieved by increasing or decreasing the bid spread value (BSprd) or the ask spread value (ASprd). Changes made to the BSprd and ASprd values on trading station 230 would update option table data 430, and, consequently, may trigger a recalculation of theoretical price table 435. Note that changes to BSprd and Asprd values may not effect the "Theo" value since BSprd and ASprd are not inputs into the "Theo" calculation. A particular "Theo" cell may be adjusted in the same manner as a "TBid" or "TAsk" cell. Mathematically, adjustments to a Theo cell may be achieved by increasing or decreasing the assumed volatility of that particular option.

Changes made to assumed volatilities on trading station 230 would update option table data 430, and, consequently, trigger a recalculation of theoretical price table 435. The "TBid", "TAsk", and "Theo" values may also adjustable in groups, for example, by selecting multiple cells or all cells in the column by selecting the column header. The trader station 230 may update the displayed values of Theo, TBid and TAsk values as the underlying security price change, or any variable contributing to Theo, TBid, or TAsk change (such as option pricing input variables (2)-(7) discussed above). For example, the trader station 230 may receive a market feed providing price information concerning the underlying security. The price information may be used to update or refresh the trading screen 500. This may include the displayed TBid, TAsk, and Theo values for a given underlying price.

FIG. 5 provides an exemplary progression of steps from transmission of the current market information from the exchange site 100 to receipt of trade confirmation by the trader site 200 and the delay experienced at each step. The progression of steps illustrated assumes that the exchange-required interface software runs locally on backend computers 220 and 225. Link 1 represents the line delay experienced by current trading information as it is transmitted from the exchange site 100 to the trader site 200. Locating the automated trading system close to the exchange site 100 reduces the line delay of Link 1 (as well as that of Link 15). Thus, by reducing the delay associated with making automated trading decisions as well as the associated line delay, the overall speed in submitting orders to the exchange site 100 is increased. Moreover, the trader station 230 that monitors and controls the backend computer 225 that implements the automated trading need not be located close to the exchange site 100, but may monitor and control the backend computer 225 remotely.

Link 2 represents delays associated with operating system (networking subsystem) related to receiving data packets from the exchange site 100. One technique for reducing this delay is to choose a platform, such as VMS or Linux, that has a good quality implementation of networking services used in automated trading.

Link 3 represents delays associated with decompressing information received from the exchange site 100. Link 4 represents other processing delays that may be inherent in exchange interface software provided by the exchange for use at the trader site 200. The exchange interface software allows the trader's equipment to interface with the exchange equipment The exchange may impose obligations requiring traders to use the exchange interface software in trading. The exchange interface software, for example, may process the received market data and supply the data to an interface of an automated trading application installed by the trader. For instance, the market data may be input to internal tables and/or may be converted to actual values. Links 5 and 6 represent delays associated with the distribution of information from the exchange interface software to an interface of the trading system application. The exchange site 100 typically broadcasts information concerning all traded items. Each trading application usually subscribes to several sources of data (e.g., market data and trade confirmations for several products). In some cases, the exchange interface software will receive and decode all information received from the exchange site 100, but only pass some of the information to the interface of the automated trading system. The exchange interface software spends some time in determining whether a particular piece of market information should be passed to the automated trading system. The exchange interface software and the trading system interface software communicate via a protocol. For example, the exchange interface software may notify the automated trading system via a callback function supplied by the latter, or by some other operating-system dependent mechanism (e.g., mailboxes on VMS). Choosing a platform that efficiently supports the protocol chosen can reduce this delay.

After receiving the current market information, the automated trading system decodes the information and, using a search protocol, searches a table of traded products, resulting in a delay indicated by link 7a. A hash table with an efficient hash key or a search tree may be used to reduce the delay associated with the processing associated with link 7a. The particular search protocol should be fine-tuned to the platform used for the automated trading system as performance may vary with the platform to the extent that a linear search may prove better than a hash table even for a surprisingly large number of products (over 100). The look-up time for hash tables is almost constant. For binary trees, the look-up time is proportional to the logarithm of N (in O(log N)), where N is the number of products traded. A linear search has a look-up time that is proportional to N (in O(N)). Of course, the actual times encountered in practice matter, so the look-up protocol should be tailored to the platform used.

Link 7b represents the delay in updating the option data table 430 and recalculating table 435, if necessary. Current market information received in link 7a may include new prices related to the underlying security. A new underlying security price may trigger the underlying security price values in option data table 430 to be updated. This, in turn, may trigger a recalculation of values contained in the theoretical price table 435. Of course, current market information in link 7a may also contain other variables that may effect the theoretical price table 435. In such cases, similar steps of updating option data table 430 and recalculating theoretical price table 435 may be necessary. If current market information received in link 7a does not change any value in option table 430 that effects theoretical price table 430, no actions are taken and the process continues to link 8, bypassing link 7b completely. Of course, values in option data table 430 may be updated from other sources besides exchange site 100. For example, trading station 230 may send a new assumed volatility for a particular option without backend computer 225 processing links 1-7a. In this case, option data table 430 and theoretical prices table 435 will be updated in link 7b and the process continues to link 8.

Link 8 represents the delay attributable to decision-making and safety checks. As noted above, decisions are made based on a numeric comparison between the current market price and the corresponding theoretical price. Safety checks account for most of the delay experienced in link 8. Safety checks may include, among other things: (1) price and quantity reasonability checks, (2) trade attempt frequency limitations, and (3) underlying bid and ask price checks.

Links 9-15 corresponds to the delay associated with composing an order and submitting the order to the exchange. In particular, link 9 reflects the time spent composing the order, which may require a format defined by the exchange. Link 10 corresponds to the time required for the automated trading system output interface to communicate the order to the exchange interface software. This may be done, for example, using a synchronous function call or an asynchronous call. In some embodiments, the tasks associated with links 9 and 10 may be performed at the same time. Links 11 and 12 correspond to the time expended while the exchange interface software receives the order, decides which module should be used to submit the order, interprets the order request, and performs a series of validations. If the order passes these tests, it is converted into the exchange format and passed to the exchange, as indicated by links 13-15.

Links 1 and 15 may include any delays occurring between the trader site 200 and the exchange site 100, including, for example, any delays attributable to an intermediary, such as a broker. As noted above, the delays attributable to links 1 and 15 may be reduced by locating the automated trading system close to the exchange site 100. If, for example, the exchange site for an option is located in a city distant from the exchange site for the underlying stock, the trader site may be located in between the two exchange sites to reduce transmission delays, or closer to the exchange site that is expected to trigger the most trading activity for the automated trading system and thus minimize the effect of transmission delays on automated trading. In addition, if routers and LANs are used at the trader site 200, the selection of high-speed equipment may reduce delays and/or priority schemes. The delay experienced in links 2-14 may be reduced, of course, by using a faster computer. However, the efficiency of the software and algorithms is also an important factor in reducing delay. Further, in some situations, it is possible to integrate the automated trading system software with the software that interfaces with the exchange site 100, which leads to reduced delay. In such a case, the automated trading system receiver and output interfaces may be the same as the exchange receiver and output interfaces.

Link 16 reflects the processing of the order at the exchange site 100. Following the exchange site 100 processing, a confirmation of the trade is returned to the trader if the trader's order is matched. Not all orders result in a match. There may be no sharing of lucrative trades with other traders who may have submitted similar matching orders that are received by the exchange even some microseconds later.

As noted above, the embodiment illustrated in FIG. 5 corresponds to an arrangement in which the interface software provided by the exchange and the automated trading system are resident on the backend computer 225. In arrangements in which the interface software and the automated trading system are resident on separate backend computers, the vertical dashed line 610 indicates the interface between the separate computers. The separate backend computers may be connected via network interface cards or a common hub. Additional delays may be experienced in the transmission and reception of between the backend computers as well as from LAN throughput and latency.

In arrangements in which there is no exchange-provided interface software running locally on backend computers 220 and 225, steps 24 and 10-14 may be performed by the automated trading software or eliminated completely. For example, steps 10 and 11 may not be needed since they are usually associated with communication between two applications, and not communication within a single application. Similarly, the trader may be able to choose not to perform the processing and pre-order validation performed in step 12 when using the proprietary trader system software. Whether or not compression per step 13 is performed depends on the communications protocols supported by the exchange. These protocols may be spelled out in an application programming interface (API) manual provided to the trader by the exchange.

Moreover, in arrangements in which an intermediary such as a broker or clearing agent is included in the communication routing between trader site 200 and exchange site 100, steps 2-6 and 10-14 may be performed by communication software provided by the intermediary, or software that uses API's provided by the intermediary and is developed by the trader or some third party vendor. In this case, the intermediary would thus be responsible for translating communications between its protocol and that of the exchange before routing messages between the exchange and the trader. This would of course be outside the control of the trader and would introduce additional delays in the total response.

Figure 6:
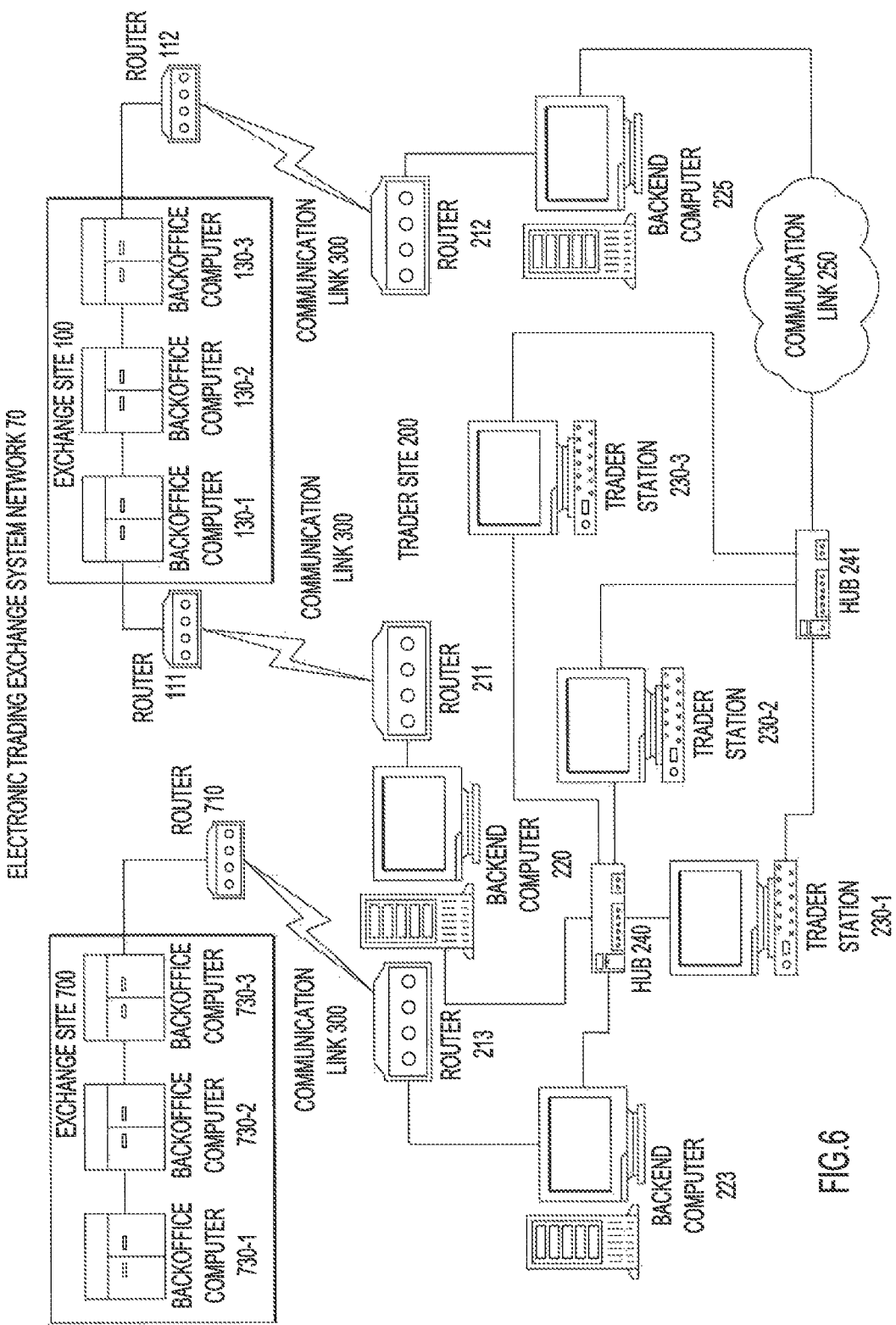
FIG. 6 illustrates a further embodiment of an electronic exchange system network in accordance with the present invention.

FIG. 6 provides a schematic of an embodiment of an electronic trading exchange system network 70 coupled to multiple trading sites. The electronic trading exchange system network 70 is similar to that shown as 10 in FIG. 1 and, for the sake of brevity, duplicative description will be omitted.

As shown in FIG. 6, exchange site 700 is coupled to trader site 200 by communication links 300. In one embodiment, the exchange site 700 may be designed as a local area network (LAN) and include, for example, one or more security routers and one or more back office computers, among other equipment. For purposes of illustration only, a single security router 710 and three back office computers 730-1, 730-2, 730-3 (referred to collectively as back office computers 730) are shown in FIG. 6. Security router 710 controls communications between the back office computers 730 and the communications link 300. Security router 710 transmits and receives communications over the communications link 300, as well as restricts communications from unauthorized sources. More particularly, the security router 710 may be used to isolate the equipment at the exchange site 700 from intrusion and facilitate communication with the back office computers 730. The back office computers 730 manage the trading of the various securities, currencies, commodities and/or other items traded on the exchange. In this regard, back office computers 730 may function similarly to the back office computers 130 of exchange site 100.

For purposes of illustration only, trading site 200 additionally includes a security router 213 and a backend computer 223 coupled to hub 240. The security router 213 and backend computer 223 may be located remotely from other equipment of the trader site 200. Security router 213 transfers trading information between the trading site 200 and the exchange site 700. As above, the security router 213 screens communications from unauthorized sources. Backend computer 223 may be configured as a communication server for the trader stations 230. Hub 240 handles communications between backend computer 223 and trader stations 230.

In the embodiment shown in FIG. 6, trader site 200 is connected to a first exchange site 100 and a second exchange site 700. Of course, other network arrangements may be used in connection with the present invention. Through the first exchange site 100, the trader site 200 may receive market information and trade securities, such as options, futures, and other derivatives; currencies, stocks, bonds, and other physicals like corn, metals, electricity, etc., and/or other items. Through the second exchange site 700, the trader site 200 may receive market information and/or trade securities and/or other items. Traders site 200 receives market information and trades securities or other items related to the securities or other items traded through the first exchange site 100.

The trader site 200 may be equipped with hedging capability that facilitates buying or selling securities and/or other items traded on the exchange to hedge at least some of the risk (for example, delta risk) associated with an automated trade for other securities or items. For example, trader site 200 may trade options for a particular stock through exchange site 100 and the particular stock through exchange site 700. In general, two types of orders may be submitted to an exchange to buy (sell) a security. A market order instructs the exchange to buy (sell) a specified quantity of the security at the going market price. A limit order instructs the exchange to buy (sell) up to a specific quantity of the security if the market price is equal or better than a specified value. A trader usually can be assured that (under most circumstances) a market order will be filled by the exchange, but cannot be certain of the price at which the order is filled. The actual price that the market order is filled depends on available price and depth of market. While the trader placing a limit order can be assured of a price, all or a portion of the limit order may never be filled if the market price never meets the limit order conditions.

The principles of a market order and a limit order are illustrated by the following examples.

| Market Order Price | Market Order Quantity to Sell | Bid Price | Bid Amount | Matched Against Order? |
|---|---|---|---|---|
| Best Available Market Prices | 1000 shares | $110/share | 400 shares | Yes |
| | | $100/share | 600 shares | Yes |
| | | $80/share | 2000 shares | No |

The above table assumes a market with current bids of $110/share for 400 shares, $100/share for 600 shares and $80/share for 2000 shares, as indicated above. A market order to sell 1000 shares will be executed by the exchange at an average price of $104/share. In other words, the 1000 share market order will be matched with 400 shares at $110/share and 600 shares at $100/share, for a net of 1000 shares at an average price of $104/share.

If the bid of $110/share for 400 shares is sold just before the market order is received, the following market is presented.

| Market Order Price | Market Order Quantity to Sell | Bid Price | Bid Amount | Matched Against Order? |
|---|---|---|---|---|
| Best Available | 1000 shares | ~~$110/share~~ | ~~400 shares~~ | Not Available |
| Market Prices | | $100/share | 600 shares | Yes |
| | | $80/share | 2000 shares | Yes |

Because 400 shares at $110/share is no longer available, the exchange will match the market order using 600 shares of the $100/share bid and 400 shares of the $80/share bid, resulting in an average price of $92/share.

We next consider a similar scenario using limit orders instead of market orders.

| Limit Order Price | Market Order Quantity to Sell | Bid Price | Bid Amount | Matched Against Order? |
|---|---|---|---|---|
| $100/share | 1000 shares | ~~$110/share~~ | ~~400 shares~~ | Not Available |
| | | $100/share | 600 shares | Yes |
| | | $80/share | 2000 shares | No |

Now assume that a limit order to sell 1000 shares at $100/share is submitted instead of the market order and the $110/share bid has already been matched. The exchange will match 600 shares of the limit order at $100/share and will not match the remaining 400 shares because the $80/share bid is too low. Accordingly, the remaining 400 shares of the limit order will stay in the exchange's book until a new matching order to buy at $100/share or higher is received by the exchange, which may never occur, or until it is cancelled.

As discussed above, order submission in the automated trading system depends, for example, on the price of the underlying security, which is liable to change frequently. Thus, if the automated trading system makes an option trade, the trader may wish to hedge the risk associated with underlying price movement. This risk, commonly called delta risk, may be quantified using mathematical models. These models may be similar to, or the same as, the models used for determining theoretical option prices using option pricing input variables (1)-(7) discussed above. The option lot size (shares per option contract) and number of option contracts traded are typically factored into the hedging decision. The option lot size is typically defined by the options exchange when the contract is created and changed only under special circumstances, such as capital adjustments. The number of options that the trader has bought or sold may be included in the confirmation notice transmitted from the options exchange. Accordingly, assuming a total delta hedge is desired, a trader may determine the quantity of the underlying security to be bought or sold after each option trade based on: (1) mathematical models, including price of the underlying security, (2) options lot size, and (3) number of options traded.

As noted above, the price of the underlying security may be defined in several different ways. A typical hedging response of an option trade will be to buy or sell the underlying security. Specifically, buying (selling) calls and selling (buying) puts will usually lead to selling (buying) the underlying for delta hedging. Since the trader will need to sell (buy) the underlying to hedge the delta risk, he may be most interested in the bid (ask) price of the underlying security. While delta risk is referred to specifically, it should be understood that the automated hedging feature might be used to hedge other known risks. For example, automated hedging may be used to hedge the vega risk, the risk of a position or trade due to price changes of the options arising from changes of an option's volatility.

From a trading perspective, the trader must define how and to what extent to delta hedge. Obviously, a trader must first decide whether he wants to delta hedge manually, semi-automatically, or fully automatically. In any case, he may consider two opposing dynamics: (1) speed of executing the underlying security orders, and (2) execution price of the underlying security orders. Typically, a trader may choose to hedge using market orders if she is most concerned about speed of execution, or limit orders if she is most concerned about the price at which the underlying orders are executed. As described above, entering a market order will (nearly) always result in the desired quantity being executed, but at potentially unfavorable or unexpected prices. Conversely, entering a limit order will always result in executed prices which meet certain criteria (i.e., greater than or equal to limit price if selling, and less than or equal to the limit price if buying), but only some or none of the desired quantity may actually be executed. Of course, other types of orders such as Fill Or Kill, and Immediate Or Cancel may be considered when designing an automated hedging future but for brevity, will not be discussed in detail here.

The trader may assess several qualitative factors in deciding whether to semi-automatically or fully automatically hedge and, if so, whether to use market orders or limit orders. Some of the qualitative factors include: (1) the quantity of delta hedge underlying trade relative to the depth of the entire underlying market, (2) volatility of the underlying market, (3) the size of the underlying bid-ask price spread relative to the price of the underlying, and (4) the amount of mental attention the trader can give toward the delta hedge trade. Different traders trading options on different underlying securities may opt for different hedging methods. Thus, in one embodiment of the automatic option trading system of the present invention, the trader may choose manual hedging, semi-automatic, or automatic hedging using market orders and/or limit orders.

The fully automatic hedging software may be resident on one or more of the trader stations 230, a backend computer 220, 223, 225, or other equipment of the trader site 200. One embodiment of the fully automated hedging systems will be described in connection with FIG. 6. Backend computer 220 receives option trade confirmations from exchange site 100 based on an order submitted automatically by backend computer 225. Alternatively, or in addition, backend computer 225 may receive option trade confirmations from the exchange site 100. Further, the option trade confirmations may correspond to orders submitted either automatically or manually by a trader. Moreover, the option trade confirmation may correspond to a quote submitted automatically or manually by the trader. Thus, backend computer 220 routes the trade confirmation to a trader station 230 that is associated with the automatic option trade made by the backend computer 225.

If the manual hedge feature has been selected, trader station 230 displays the appropriate hedge action based on factors previously entered by the trader. For example, the trader may see a message such as "buy 4500 shares" of the underlying security. The trader would have the responsibility of executing the hedging trade, if she desired. If the semi-automatic hedging using a limit order has been selected, trader station 230 would automatically display a dialogue box to the trader. The dialogue would include information (such as type of order, price, quantity, buy or sell) related to the potential hedging trade. If the trader is comfortable with these specifications, she may then submit this particular hedging order through actions on the keyboard, mouse, gamepad or other input device of trading station 230 (e.g., voice activation equipment). Alternatively, the trader could modify some or all of the specifications of the order before submitted the order. Of course, the trader may have the ability to cancel the dialogue box entirely if she wished not to hedge that particular option trade using the semi-automated hedging feature. If the automatic hedging using market orders feature has been selected, trader station 230 automatically submits a market order, for example to buy 4500 shares at the market prices, to exchange site 700 via backend computer 223. At the exchange site 700, the market order will (nearly) always be immediately filled by buying 4500 shares, albeit at a potentially unexpected or undesirable average price for those shares.

If automatic hedging using a limit order has been selected, trader station 230 automatically submits an order, for example to buy 4500 shares at a price of 68.05, to exchange site 700 via backend computer 223. The default limit price specified in the semi-automated and fully automated hedging orders may depend on the current underlying market and/or parameters pre-defined by the trader. For instance, the trader may define the price to use when buying the underlying security with semi- or fully automatic hedging as, perhaps, either (1) current ask price, since she is buying, (2) average of current bid and ask price, (3) last traded price, or (4) the ask price at which the automated option trade was triggered, regardless of the current underlying prices. Depending on the market conditions, exchange site 700 may not be able to match the limit order immediately, if ever. Exchanges typically enable the trader to modify or delete partially matched or completely unmatched limit orders. In some cases, the exchange site through which the underlying security is traded may depend on the option traded. For example, both futures of an equity index (e.g., Standard and Poor's 500) and options on the same equity index may be traded through exchange site 100. A stock may be traded through exchange site 700, but options for the stock may be traded through exchange site 100. In such a case, the system configurations at either the trader station 230 performing hedging or other equipment at trader site 200 must ensure that hedge orders are routed to the appropriate exchange.

While the above-embodiments have been described in terms of arrays or tables, it should be understood that data may include or be maintained in other organizational memory constructs consistent with the present invention, for example, linked lists, trees, heaps, hash lists, or some combination, or any other data structure or combinations of data structures useful in implementing a search algorithm. In addition, the trader site 200 is described as submitting orders to the exchange site 100 using the automated trading system. However, the trader site 200 may submit its "order" in the form of a quote to the exchange site, where the bid (ask) price of the quote corresponds to the theoretical buy (sell) price if, say, the trader wanted to buy (sell) the item.

It will be apparent to those skilled in the art that various modifications and variations can be made without departing from the scope or spirit of the invention. For example, the present invention may be applied in areas other than electronically-traded securities, for example, the purchase and/or sale of goods or services, contests, auctions, and other applications in which fast, accurate responses are desirable. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for implementing automated trading through an electronic option trading exchange system, comprising:
   a first computer in electronic communication with an electronic option trading exchange system, comprising a processor configured with logic for implementing an automated trading application and at least one other application through an operating system, wherein the operating system gives priority to the automated trading application over the at least one other application,
   the first computer (a) receiving electronic communications indicative of a current price for an option traded on the electronic option trading exchange system, (b) automatically determining, based on a theoretical price of the option, whether the current price for the option satisfies a price condition, wherein the theoretical price is based at least on price data of an underlying security of the option that is stored in a memory, (c) automatically checking whether one or more safety criteria for an option transaction are satisfied, and (d) automatically transmitting to the electronic option trading exchange system a response to the current price within 150 milliseconds of receiving the electronic communications when the price condition and the one or more safety criteria are satisfied, wherein the response includes an order or quote for the option capable of being matched to the current price.

2. The system of claim 1, wherein the automated trading application is run without debug messages.

3. The system of claim 1, wherein the first computer implements multiple other applications through an operating system, wherein the operating system gives priority to the automated trading application over the multiple other applications.

4. The system of claim 1, further comprising the first computer receiving electronic communications from an updating market feed, the electronic communications indicative of price information of the underlying security of the option, deriving the price data from the electronic communications from the market feed, and storing the price data in the memory.

5. The system of claim 4, further comprising the first computer calculating the theoretical price using at least the stored price data.

6. The system of claim 1, further comprising a second computer communicatively coupled to the first computer, the second computer receiving electronic communications from an updating market feed, the electronic communications indicative of price information of the underlying security of the option, and deriving the price data from the electronic communications from the market feed.

7. The system of claim 6, further comprising the second computer transmitting the price data to the first computer, and the first computer calculating the theoretical price using at least the transmitted price data.

8. The system of claim 6, further comprising the second computer storing the price data in the memory, and the first computer calculating the theoretical price using at least the stored price data.

9. The system of claim 6, further comprising the second computer calculating the theoretical price using at least the price data, and transmitting the theoretical price to the first computer.

10. The system of claim 7, further comprising the second computer calculating the theoretical price using at least the price data, and storing the theoretical price in the memory.

11. The system of claim 1, wherein the operating system is a Windows-based operating system.

12. The system of claim 1, wherein the operating system is a Linux operating system.

13. The system of claim 1, wherein the current price is a current bid price, and the price condition includes the current bid price being greater than or equal to the theoretical price of the option.

14. The system of claim 1, wherein the current price is a current offer price, and the price condition includes the current offer price being less than or equal to the theoretical price of the option.

15. The system of claim 1, wherein the one or more safety criteria include being able to send or receive data over one or more communication links of the electronic option trading exchange system.

16. The system of claim 1, wherein the one or more safety criteria include a trading status of the option or the underlying security of the option.

17. The system of claim 1, wherein the one or more safety criteria include a maximum quantity of the option.

18. The system of claim 1, wherein the one or more safety criteria include a maximum number of automated trading attempts during a predetermined time period.

19. The system of claim 1, wherein the one or more safety criteria include an automated trading frequency for the option.

20. The system of claim 1, wherein the one or more safety criteria include the delta of the option transaction.

21. The system of claim 1, wherein the one or more safety criteria include a price reasonability check.

22. The system of claim 1, wherein the one or more safety criteria include a check of a price of the underlying security of the option.

23. The system of claim 1, wherein the one or more safety criteria include the difference between a current bid and offer price of the underlying security of the option being less than a predetermined value.

24. The system of claim 1, wherein the one or more safety criteria include the rate of change of the price of the underlying security of the option being less than a predetermined value.

25. A system for implementing automated trading through an electronic option trading exchange system, comprising:
   a first computer in electronic communication with an electronic option trading exchange system, the first computer (a) receiving electronic communications indicative of a current price for an option traded on the electronic option trading exchange system; and
   a second computer communicatively coupled to the first computer, comprising a processor configured with logic for implementing an automated trading application and at least one other application through an operating system, wherein the operating system gives priority to the automated trading application over the at least one other application, the second computer (b) automatically determining, based on a theoretical price of the option, whether the current price for the option satisfies a price condition, wherein the theoretical price is based at least on price data of an underlying security of the option that is stored in a memory, and (c) automatically checking whether one or more safety criteria for an option transaction are satisfied, the first computer responding to the automatic determination of the second computer by (d) automatically transmitting to the electronic option trading exchange system a response to the current price within 150 milliseconds of receiving the electronic communications when the price condition and the one or more safety criteria are satisfied, wherein the response includes an order or quote for the option capable of being matched to the current price.

26. The system of claim 25, wherein the automated trading application is run without debug messages.

27. The system of claim 25, wherein the second computer implements multiple other applications through an operating system, wherein the operating system gives priority to the automated trading application over the multiple other applications.

28. The system of claim 25, further comprising the first computer receiving electronic communications from an updating market feed, the electronic communications indicative of price information of the underlying security of the option, wherein the price data is derived from the electronic communications from the market feed.

29. The system of claim 28, further comprising the first computer storing the price data in the memory, and the second computer calculating the theoretical price using at least the stored price data.

30. The system of claim 28, further comprising the first computer transmitting the price data to the second computer, and the second computer calculating the theoretical price using at least the price data.

31. The system of claim 25, further comprising the second computer receiving electronic communications from an updating market feed, the electronic communications indicative of price information of the underlying security of the option, deriving the price data from the electronic communications from the market feed, and storing the price data in the memory.

32. The system of claim 31, further comprising the second computer calculating the theoretical price using at least the stored price data.

33. The system of claim 31, further comprising the second computer calculating the theoretical price using at least the price data, and storing the theoretical price in the memory.

34. The system of claim 25, wherein the operating system is a Windows-based operating system.

35. The system of claim 25, wherein the operating system is a Linux operating system.

36. The system of claim 25, wherein the current price is a current bid price, and the price condition includes the current bid price being greater than or equal to the theoretical price of the option.

37. The system of claim 25, wherein the current price is a current offer price, and the price condition includes the current offer price being less than or equal to the theoretical price of the option.

38. The system of claim 25, wherein the one or more safety criteria include being able to send or receive data over one or more communication links of the electronic option trading exchange system.

39. The system of claim 25, wherein the one or more safety criteria include a trading status of the option or the underlying security of the option.

40. The system of claim 25, wherein the one or more safety criteria include a maximum quantity of the option.

41. The system of claim 25, wherein the one or more safety criteria include a maximum number of automated trading attempts during a predetermined time period.

42. The system of claim 25, wherein the one or more safety criteria include an automated trading frequency for the option.

43. The system of claim 25, wherein the one or more safety criteria include the delta of the option transaction.

44. The system of claim 25, wherein the one or more safety criteria include a price reasonability check.

45. The system of claim 25, wherein the one or more safety criteria include a check of a price of the underlying security of the option.

46. The system of claim 25, wherein the one or more safety criteria include the difference between a current bid and offer price of the underlying security of the option being less than a predetermined value.

47. The system of claim 25, wherein the one or more safety criteria include the rate of change of the price of the underlying security of the option being less than a predetermined value.

48. The system of claim 25, wherein the first computer is located near the electronic option trading exchange system.

49. The system of claim 25, wherein the first computer is located closer to the electronic option trading exchange system than the second computer.

50. The system of claim 25, wherein the first computer is located substantially closer than the second computer to the electronic option trading exchange system.

51. The system of claim 25, wherein the first computer is located in the same city as the electronic option trading exchange system.

52. The system of claim 25, wherein the first computer is located in a different city than the electronic option trading exchange system.

53. The system of claim 25, wherein the second computer controls the automated trading of the option performed by the first computer.

* * * * *